United States Patent
Pandya et al.

(10) Patent No.: US 8,807,251 B2
(45) Date of Patent: Aug. 19, 2014

(54) ELECTRIC MOTOR AND BRAKE ASSEMBLY

(75) Inventors: Nirav Pandya, North Olmsted, OH (US); Thomas Tuckowski, Strongsville, OH (US); John Jindra, Elyria, OH (US); Robert Bekoscke, Medina, OH (US); George H. Waterman, Plymouth, MI (US); Thomas Strothmann, Bramsche (DE)

(73) Assignee: Invacare Corporation, Elyria, OH (US)

( * ) Notice: Subject to any disclaimer, the term of this patent is extended or adjusted under 35 U.S.C. 154(b) by 198 days.

(21) Appl. No.: 13/160,931

(22) Filed: Jun. 15, 2011

(65) Prior Publication Data

US 2012/0018234 A1    Jan. 26, 2012

Related U.S. Application Data

(60) Provisional application No. 61/354,846, filed on Jun. 15, 2010, provisional application No. 61/412,041, filed on Nov. 10, 2010.

(51) Int. Cl.
*A61G 5/04* (2013.01)
*B60K 7/00* (2006.01)

(52) U.S. Cl.
CPC ............ *B60K 7/0007* (2013.01); *B60Y 2200/84* (2013.01)
USPC ............................................. 180/55; 301/6.5

(58) Field of Classification Search
CPC ............... B60K 2007/0038; B60K 2007/0092; B60Y 2200/84
USPC ................. 180/65.51, 65.6, 65.7, 55; 301/6.5
See application file for complete search history.

(56) References Cited

U.S. PATENT DOCUMENTS

| 2,505,770 A | 12/1945 | Hill |
| 2,506,146 A | 5/1950 | Gladish |
| 3,323,032 A | 5/1967 | Agarwal |

(Continued)

FOREIGN PATENT DOCUMENTS

| DE | 1142406 | 1/1963 |
| DE | 197 39 001 | 10/1998 |

(Continued)

OTHER PUBLICATIONS

International Search Report and Written Opinion from application No. PCT/US2011/040476 dated Oct. 24, 2011.

(Continued)

*Primary Examiner* — J. Allen Shriver, II
*Assistant Examiner* — Brian Cassidy
(74) *Attorney, Agent, or Firm* — Calfee, Halter & Griswold LLP

(57) ABSTRACT

A motor and brake assembly includes a mounting member. A stator winding assembly, a brake assembly, a hub, and a rotor magnet assembly. The stator winding assembly is mounted to the mounting member. The brake assembly is operably connected to the mounting member. The hub is rotatably coupled to the mounting member. The rotor magnet assembly is mounted to an inside of a radially outer wall of the hub. The brake assembly is operable to move a component of the brake assembly between an engaged position where the component engages the inside of the radially outer hub wall and a disengaged position where the component is spaced apart from the inside of the radially outer hub wall.

23 Claims, 88 Drawing Sheets

(56) References Cited

U.S. PATENT DOCUMENTS

| | | |
|---|---|---|
| 3,579,066 A | 5/1971 | Bearfield et al. |
| 3,703,654 A | 11/1972 | Karubian |
| 3,760,909 A | 9/1973 | Grove |
| 3,812,928 A | 5/1974 | Rockwell et al. |
| 3,870,120 A | 3/1975 | Blinkilde |
| 4,022,301 A | 5/1977 | Hansen |
| 4,059,779 A | 11/1977 | Wistinghausen |
| 4,071,121 A | 1/1978 | Daniel |
| 4,216,839 A | 8/1980 | Gould et al. |
| 4,223,255 A | 9/1980 | Goldman et al. |
| 4,528,534 A * | 7/1985 | Read .................. 335/262 |
| 4,719,378 A | 1/1988 | Katsuma et al. |
| 4,730,136 A | 3/1988 | Muller |
| 4,758,768 A | 7/1988 | Hendricks et al. |
| 4,774,428 A | 9/1988 | Konecny |
| 4,938,321 A | 7/1990 | Kelley et al. |
| 4,947,069 A | 8/1990 | Grant |
| 5,014,800 A | 5/1991 | Kawamoto |
| 5,087,845 A | 2/1992 | Behrens et al. |
| 5,164,622 A | 11/1992 | Kordik |
| 5,183,133 A | 2/1993 | Roy et al. |
| 5,199,520 A | 4/1993 | Chen |
| 5,246,082 A | 9/1993 | Alber |
| 5,274,290 A | 12/1993 | Fischer |
| 5,343,128 A | 8/1994 | Beltrame et al. |
| 5,347,189 A | 9/1994 | Chuta et al. |
| 5,355,039 A | 10/1994 | Couture |
| 5,366,037 A | 11/1994 | Richey |
| 5,369,324 A | 11/1994 | Saether |
| 5,382,853 A | 1/1995 | von der Heide et al. |
| 5,438,228 A | 8/1995 | Couture et al. |
| 5,442,250 A | 8/1995 | Stridsberg |
| 5,443,132 A * | 8/1995 | Arnold .................. 188/138 |
| 5,450,915 A | 9/1995 | Li |
| 5,461,741 A | 10/1995 | Graebe |
| 5,465,802 A | 11/1995 | Yang |
| 5,540,297 A | 7/1996 | Meier |
| 5,575,348 A | 11/1996 | Goertzen et al. |
| 5,600,191 A | 2/1997 | Yang |
| 5,613,257 A | 3/1997 | Graebe |
| 5,677,605 A | 10/1997 | Cambier et al. |
| 5,691,584 A * | 11/1997 | Toida et al. ............. 310/67 R |
| 5,719,655 A | 2/1998 | Peschel et al. |
| 5,796,192 A | 8/1998 | Riepl |
| 5,920,136 A | 7/1999 | Schmid |
| 5,936,320 A | 8/1999 | Takeda et al. |
| 5,949,165 A | 9/1999 | Sakuragi |
| 5,949,168 A | 9/1999 | Dieckmann et al. |
| 5,975,225 A | 11/1999 | Kamen et al. |
| 5,982,063 A | 11/1999 | Lutz et al. |
| 6,002,192 A | 12/1999 | Krivospitski et al. |
| 6,057,617 A | 5/2000 | Schmid |
| 6,100,615 A | 8/2000 | Birkestrand |
| 6,125,975 A | 10/2000 | Seeto et al. |
| 6,135,259 A * | 10/2000 | Forster .................. 192/221.1 |
| 6,155,367 A | 12/2000 | Alber |
| 6,731,034 B1 | 5/2004 | Habele et al. |
| 6,744,162 B2 | 6/2004 | Pierre et al. |
| 6,765,327 B2 | 7/2004 | Hashimoto et al. |
| 6,768,932 B2 | 7/2004 | Claypole et al. |
| 6,806,602 B2 | 10/2004 | Hilzinger et al. |
| 6,892,841 B2 | 5/2005 | Makuta et al. |
| 7,059,437 B2 * | 6/2006 | Heinen .................. 180/65.51 |
| 7,140,475 B1 | 11/2006 | Appelqvist |
| 7,245,052 B2 | 7/2007 | Stubner |
| 7,530,416 B2 * | 5/2009 | Suzuki .................. 180/65.51 |
| 7,538,461 B2 | 5/2009 | McMillan et al. |
| 7,612,477 B2 | 11/2009 | Abe et al. |
| 7,932,652 B2 * | 4/2011 | DeVeny et al. ......... 310/75 C |
| 7,938,211 B2 * | 5/2011 | Yoshino et al. ......... 180/65.51 |
| 8,459,386 B2 * | 6/2013 | Pickholz .................. 180/65.51 |
| 2004/0239196 A1 | 12/2004 | Miura et al. |
| 2008/0053719 A1* | 3/2008 | Yoshino et al. .................. 180/55 |
| 2008/0078631 A1 | 4/2008 | Erlston et al. |
| 2008/0164774 A1 | 7/2008 | Wang |
| 2009/0127950 A1 | 5/2009 | Eckert |
| 2009/0318266 A1 | 12/2009 | Meller et al. |
| 2011/0000724 A1* | 1/2011 | Heinen .................. 180/65.51 |
| 2013/0207446 A1* | 8/2013 | Marro et al. ............ 301/6.5 |

FOREIGN PATENT DOCUMENTS

| | | |
|---|---|---|
| EP | 0291219 | 11/1988 |
| EP | 0410047 | 1/1991 |
| EP | 699550 | 6/1997 |
| FR | 2738147 | 3/1997 |
| GB | 1248494 | 11/1969 |
| GB | 2334493 | 8/1999 |
| GB | 2345586 | 7/2000 |
| JP | 60-55840 | 4/1985 |
| NL | 7 604 773 | 11/1976 |
| WO | 9005515 | 5/1990 |
| WO | 9622895 | 8/1996 |
| WO | 97/19505 | 5/1997 |
| WO | 9931792 | 6/1999 |
| WO | 2011/159773 | 12/2011 |

OTHER PUBLICATIONS

International Preliminary Report on Patentability for PCT/US2011/040476 dated Dec. 19, 2012.

Communication sending Extended European Search Report for EP Application No. 11796348.8 (PCT/US2011/04076) dated Oct. 1, 2013.

Communication re EP Application No. 11796348.8 (PCT/US2011/04076) dated Oct. 18, 2013 (received Nov. 28, 2013).

Office Action in CA Application No. 2,802,730 dated Dec. 10, 2013.

First Exam Report from NZ 605,742 dated Aug. 22, 2013 (received Sep. 5, 2013).

* cited by examiner

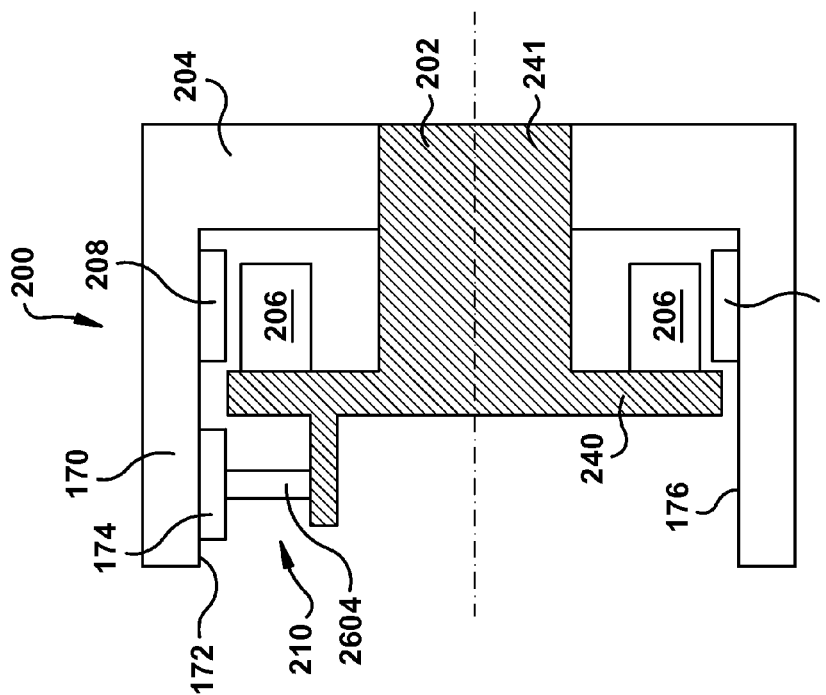
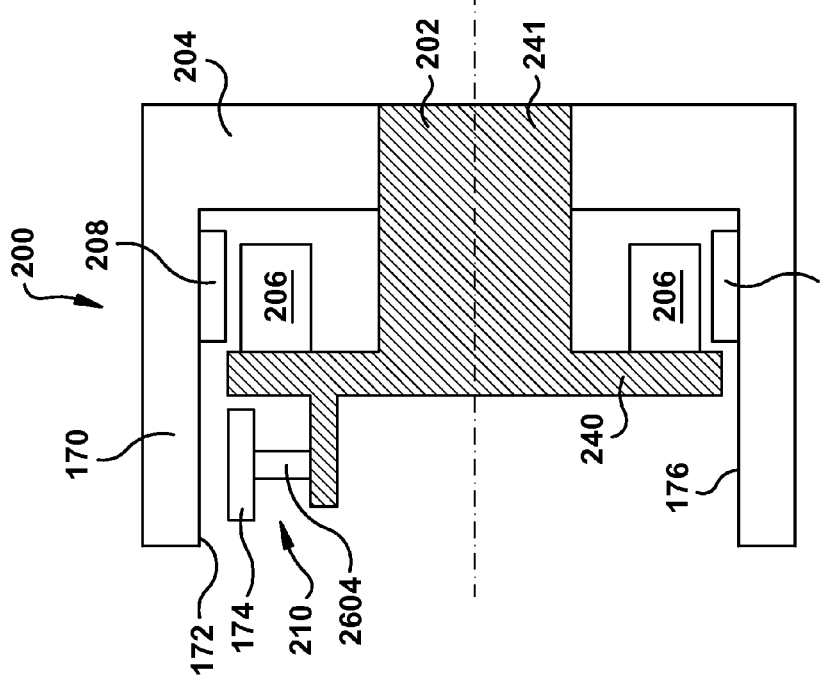
Fig. 1C
Fig. 1B

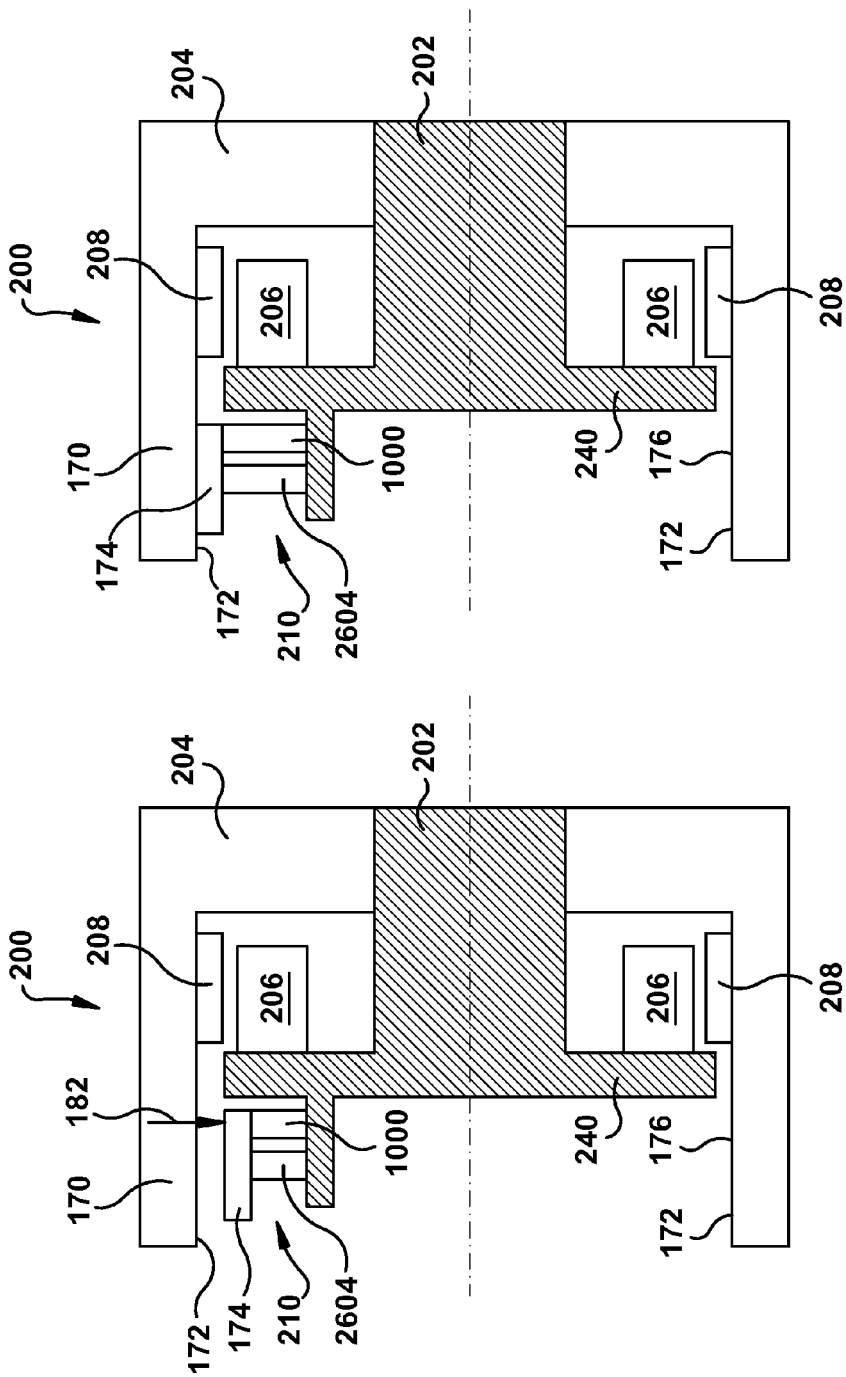

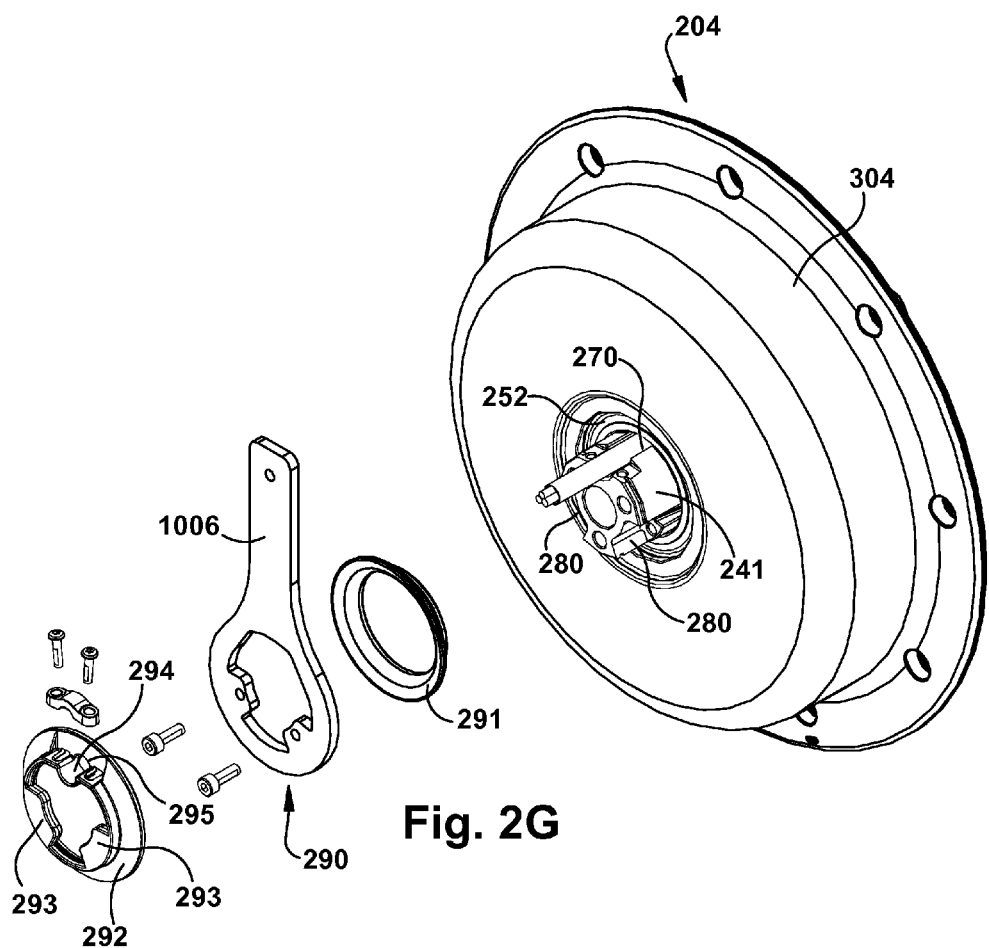

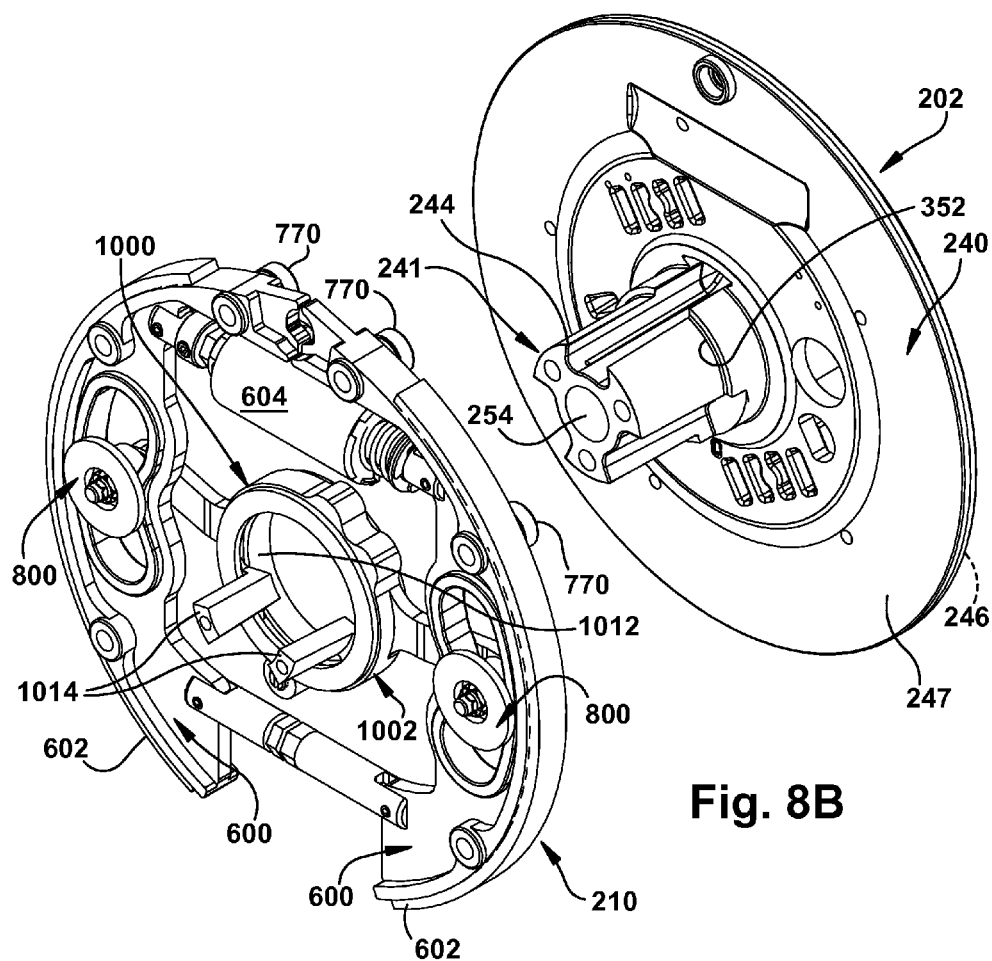

ELECTRIC MOTOR AND BRAKE ASSEMBLY

CROSS-REFERENCE TO RELATED APPLICATIONS

The present application claims priority to Provisional Application Ser. No. 61/354,846 filed Jun. 15, 2010 and Provisional Application Ser. No. 61/412,041 filed Nov. 10, 2010, the disclosures of which are incorporated herein by reference in their entirety.

BACKGROUND

Electric motor and brake assemblies can be used in a wide variety of different conveyances. In one exemplary embodiment, the electric motors are used to drive wheelchairs and similar conveyances. Wheelchairs and similar conveyances are an important means of transportation for a significant portion of society. Powered wheelchairs provide an important degree of independence for those they assist.

SUMMARY

The present application discloses exemplary embodiments of motor and brake assemblies and components for motor and/or brake assemblies. In one exemplary embodiment, a motor and brake assembly includes a mounting member. A stator winding assembly, a brake assembly, a hub, and a rotor magnet assembly. The stator winding assembly is mounted to the mounting member. The brake assembly is operably connected to the mounting member. The hub is rotatably coupled to the mounting member. The rotor magnet assembly is mounted to an inside of a radially outer wall of the hub. The brake assembly is operable to move a component of the brake assembly between an engaged position where the component engages the inside of the radially outer hub wall and a disengaged position where the component is spaced apart from the inside of the radially outer hub wall.

In one exemplary embodiment, a release actuator is coupled to the brake assembly. The release actuator is moveable between a release position or condition and a normal operation position or condition. When the release actuator is moved to the release position or condition, the release actuator moves the component of the brake assembly away from said inside of the radially outer hub wall and prevents the component of the brake assembly from moving to the engaged position. When the release actuator is in the normal operating position, the service actuator is able to move said component from the disengaged position to said engaged position.

In one exemplary embodiment, an actuator for a brake assembly includes an electromagnet, a first shaft, and a second shaft. The first shaft includes a frusto-conical recess that includes an inner tapered surface and a flat inner wall. The second shaft includes a male frusto-conical end portion that includes an outer tapered surface and a flat end wall. Application of an electromagnetic field by the electromagnet relatively moves the first and second shafts from an extended position to a retracted position. When the first and second shafts are in the retracted position, the flat end wall of the second shaft is in engagement with the flat inner wall of the first shaft.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

FIG. 1B is a schematic illustration, in section, of an exemplary embodiment of a hub motor and brake assembly;

FIG. 1C is an illustration similar to FIG. 1B with the brake assembly in an engaged position;

FIG. 1F is a schematic illustration, in section, of an exemplary embodiment of a hub motor and brake assembly that includes a brake assembly release actuator;

FIG. 1G is an illustration similar to FIG. 1F with the brake assembly in an engaged position;

FIG. 2G is an exploded perspective view of the sealing arrangement shown in FIG. 2F;

FIG. 8B is an exploded perspective view of an exemplary embodiment of a brake assembly;

DETAILED DESCRIPTION

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members or elements.

Figure 1:
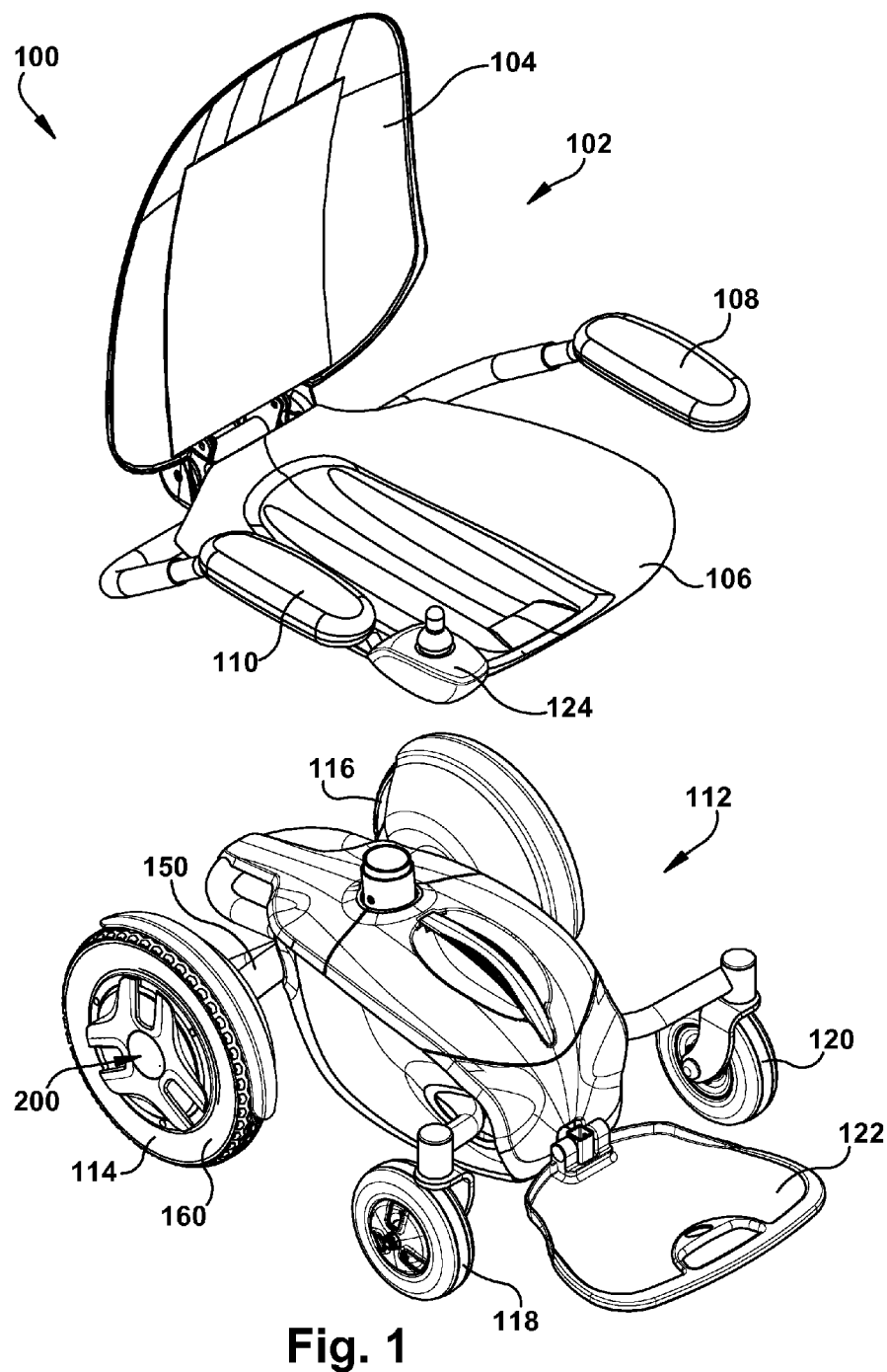
FIG. 1 is a perspective view of an exemplary embodiment of a wheelchair, with a seat assembly separated from a chassis assembly.

Referring to FIG. 1, a conveyance such as a wheelchair 100 is illustrated. The wheelchair 100 includes a seat assembly 102 and a chassis 112. The chassis 112 includes drive wheels 114 and 116 connected thereto for propulsion of wheelchair 100. Drive wheels 114 and 116 may be driven by a plurality of types of drive assemblies 200 including, for example, electric motor and gear combinations or gearless brushless motors such as wheel hub motors. Casters 118 and 120 are connected to the chassis 112 for providing forward support of wheelchair 100. One or more rear anti-tip wheels may also be included. A footplate 122 is connected to the front portion of chassis 112 to support the feet of a user. A joystick 124 is provided to allow a user to control the drive system of wheelchair 100.

Referring to FIG. 1B, in one exemplary embodiment, the drive assemblies 200 are hub motors with internal brakes. The hub motors with internal brakes include a mounting member 202, a stator winding assembly 206, a rotor magnet assembly 208, a brake assembly 210, and a hub 204 or rotor housing. The stator winding assembly 206 is mounted to the mounting member 202. The brake assembly is operably connected to the mounting member 202. The hub 204 is rotatably coupled to the mounting member 202. The hub 204 includes a radially outer wall 170. The rotor magnet assembly 208 is mounted to an inside 172 of the radially outer wall 170 of the hub 204. The brake assembly 206 is operable to move a component 174 of the brake assembly between an engaged position (FIG. 1C) where the component 174 engages the inside 172 of the radially outer hub wall and a disengaged position (FIG. 1B) where the component is spaced apart from the inside 172 of the radially outer hub wall.

The inside 172 of the radially outer hub wall 170 may be an inner surface 176 of the radially outer wall 170 itself (FIGS. 1B and 1C) or the inside 172 may be a lining 178 (FIGS. 1D and 1E), coating, etc. on or attached to the inner surface 176 of the radially outer wall 170. In other embodiments, the component 174 may engage another portion of the hub 204 when the brake assembly 206 is engaged.

The mounting member 202 may take a wide variety of different forms. In one exemplary embodiment, the mounting member 202 is a circular plate that includes a central post 241 that is rotatably mounted to the hub 204 and a circular (or other shape) plate 240. In the example illustrated by FIG. 1B, the stator winding assembly 206 is mounted to one side of the plate and the brake assembly 210 is operably connected on the other side of the plate, such that the plate substantially isolates the stator winding assembly from the brake assembly. However, in another exemplary embodiment, the stator winding assembly 206 and the brake assembly are both be disposed on the same side of the plate 240

In an exemplary embodiment, an actuator 2604 is coupled to the brake assembly 210 for moving the brake assembly between the engaged position and the disengaged position. The actuator 2604 can take a wide variety of different forms. The actuator may be a mechanical, manual, electrical, pneumatic, hydraulic, or hybrid actuator. In one exemplary embodiment, the actuator 2604 is an electromagnetic actuator.

Referring to FIGS. 1F and 1G, in one exemplary embodiment, both a service actuator 2604 and a release actuator 1000 are included. The service actuator 2604 is coupled to the brake assembly 210 for normal operation of the brakes (i.e. the service actuator moves the component 174 of the brake assembly between the engaged position and the disengaged position). In an exemplary embodiment, the release actuator 1000 is moveable or changeable between a release position or condition and a normal operation position or condition. When the release actuator 1000 is in the release position or condition, the release actuator 1000 moves the component 174 of the brake assembly to away from the inside 172 of the radially outer hub wall 170 as indicated by arrow 182 and prevents the component 174 of the brake assembly 210 from moving to the engaged position. When the release actuator 1000 is in the normal operating position or condition, the service actuator 2604 is able to move the component 174 from the disengaged position to the engaged position.

The release actuator 1000 can take a wide variety of different forms. The actuator may be a mechanical, manual, electrical, pneumatic, hydraulic, or hybrid actuator. In the examples that follow in this application, the release actuator 1000 is a manual mechanism that engages the brake shoes to move the brakes to the released position and maintain the brakes in the released position. However, the release actuator may be powered and may be coupled to the brake assembly in any manner. For example, the release actuator 1000 may comprise a switch or other input device that controls a powered actuator, such as an electrical, pneumatic, or hydraulic actuator, to move the brakes to the released position and maintain the brakes in the released position.

Figure 2A:
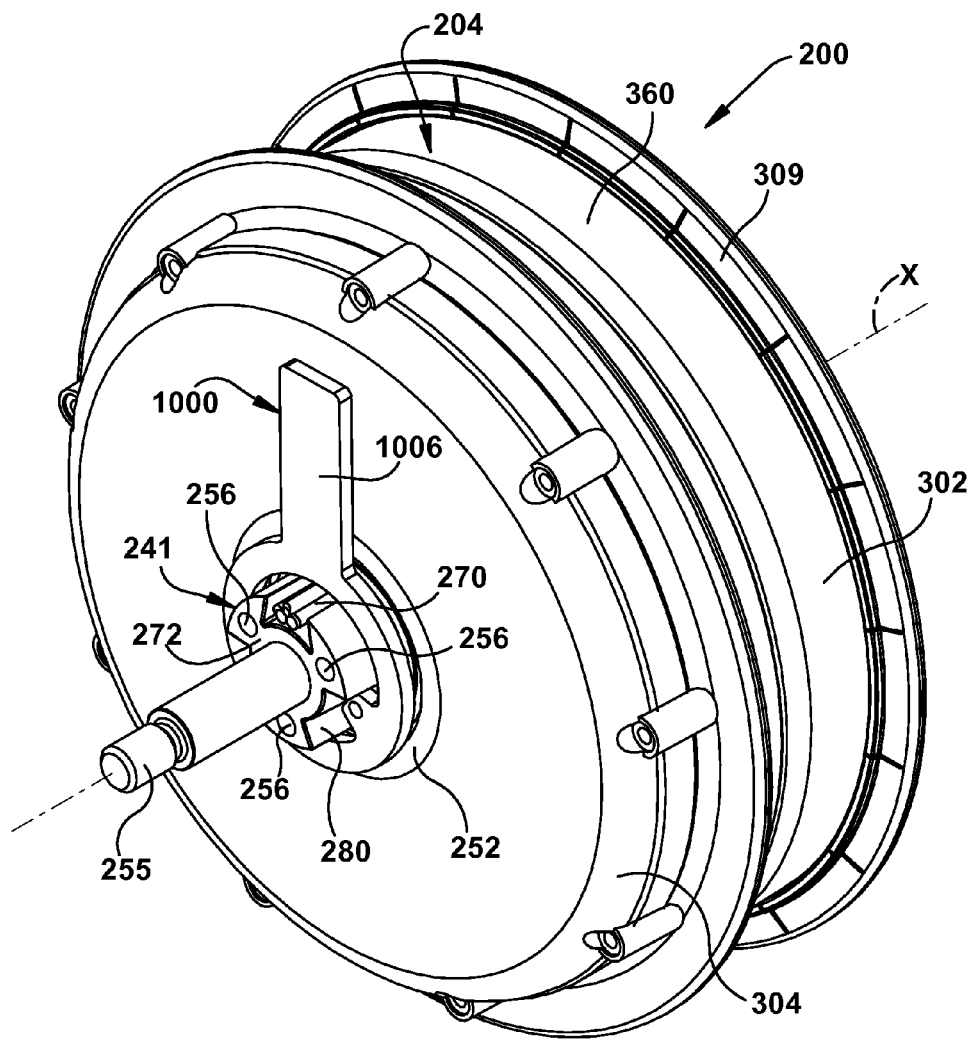
FIG. 2A is a perspective view of an exemplary embodiment of a hub motor and brake assembly.
Figure 2B:
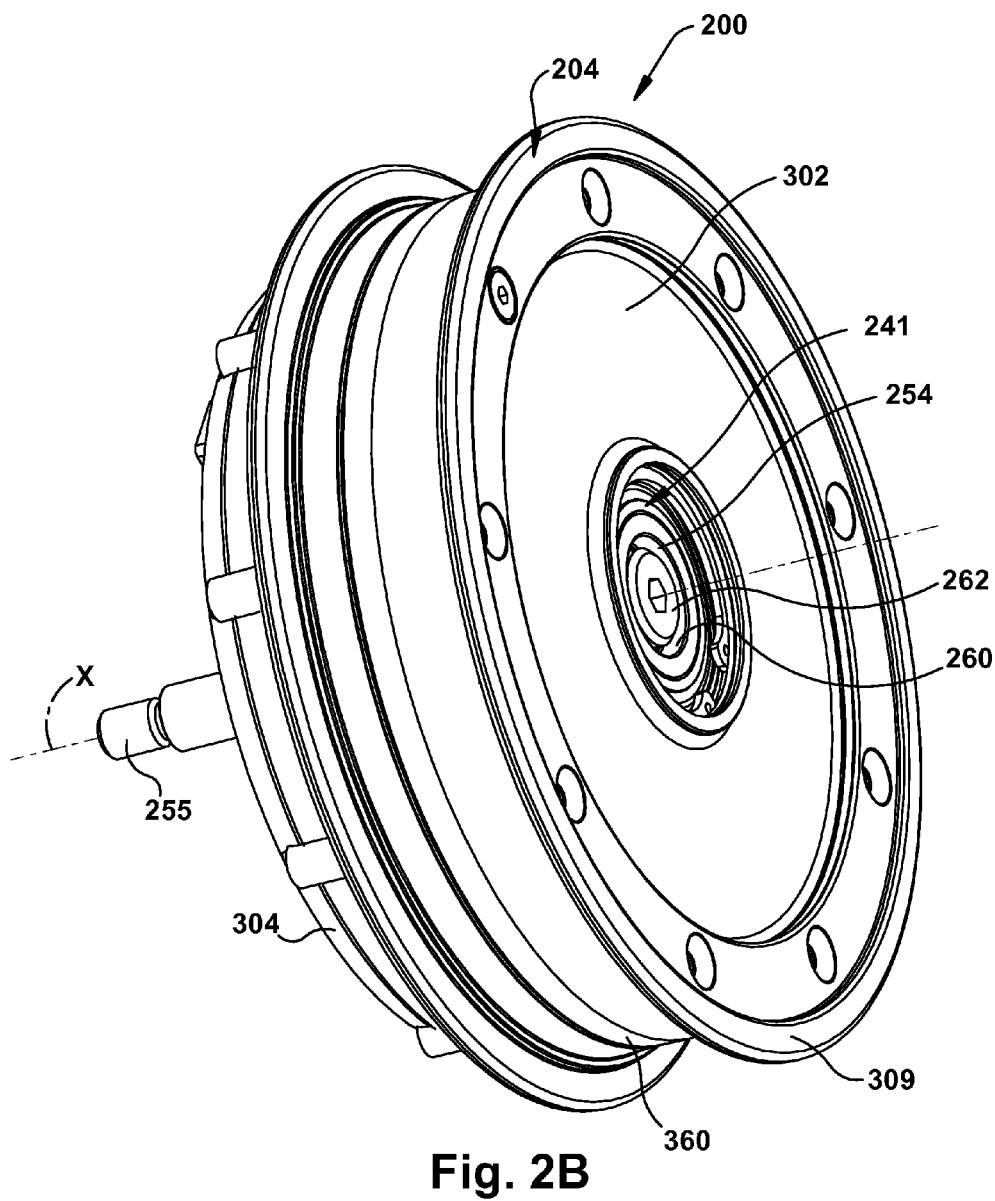
FIG. 2B is a second perspective view of the hub motor and brake assembly shown in FIG. 2A.
Figure 2C:
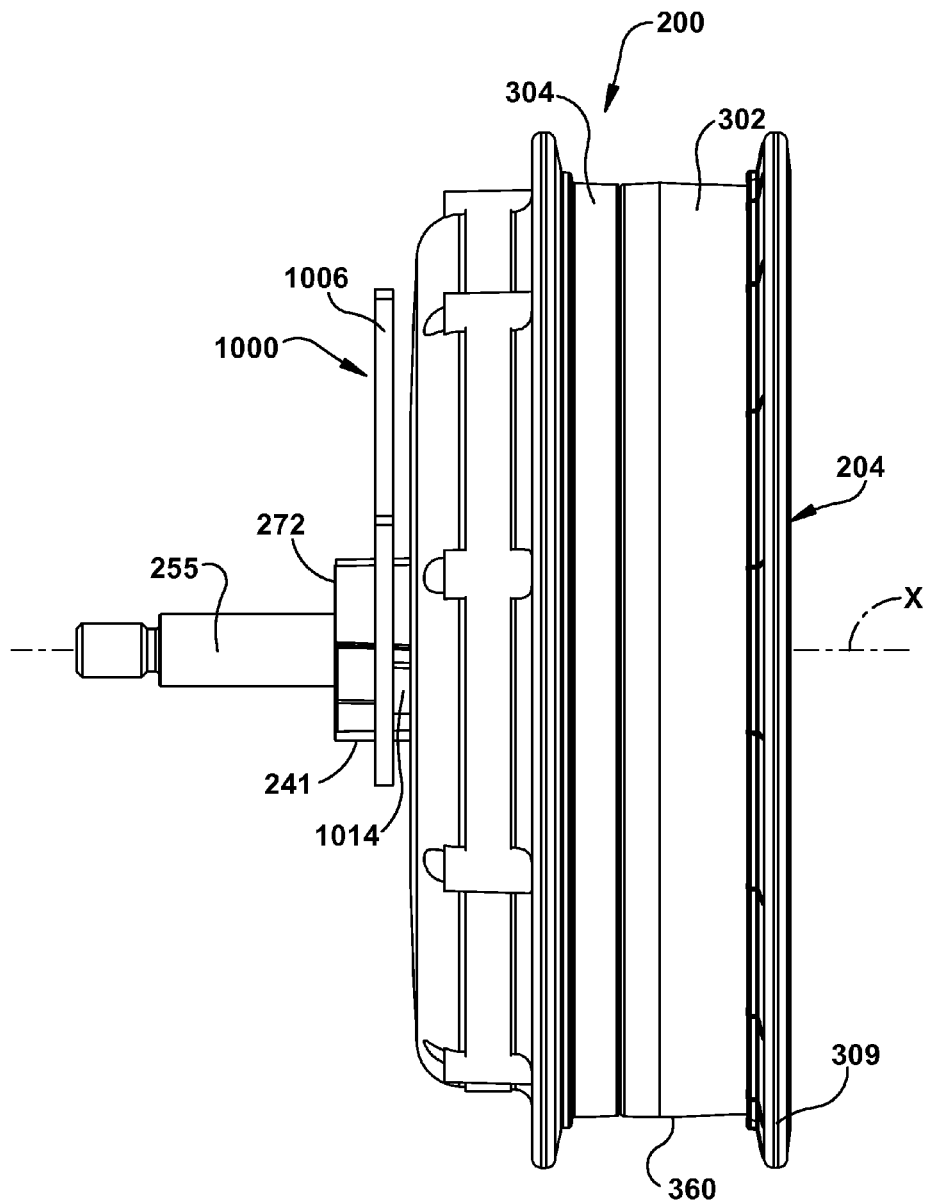
FIG. 2C is a side elevational view of the hub motor and brake assembly shown in FIG. 2A.
Figure 2D:
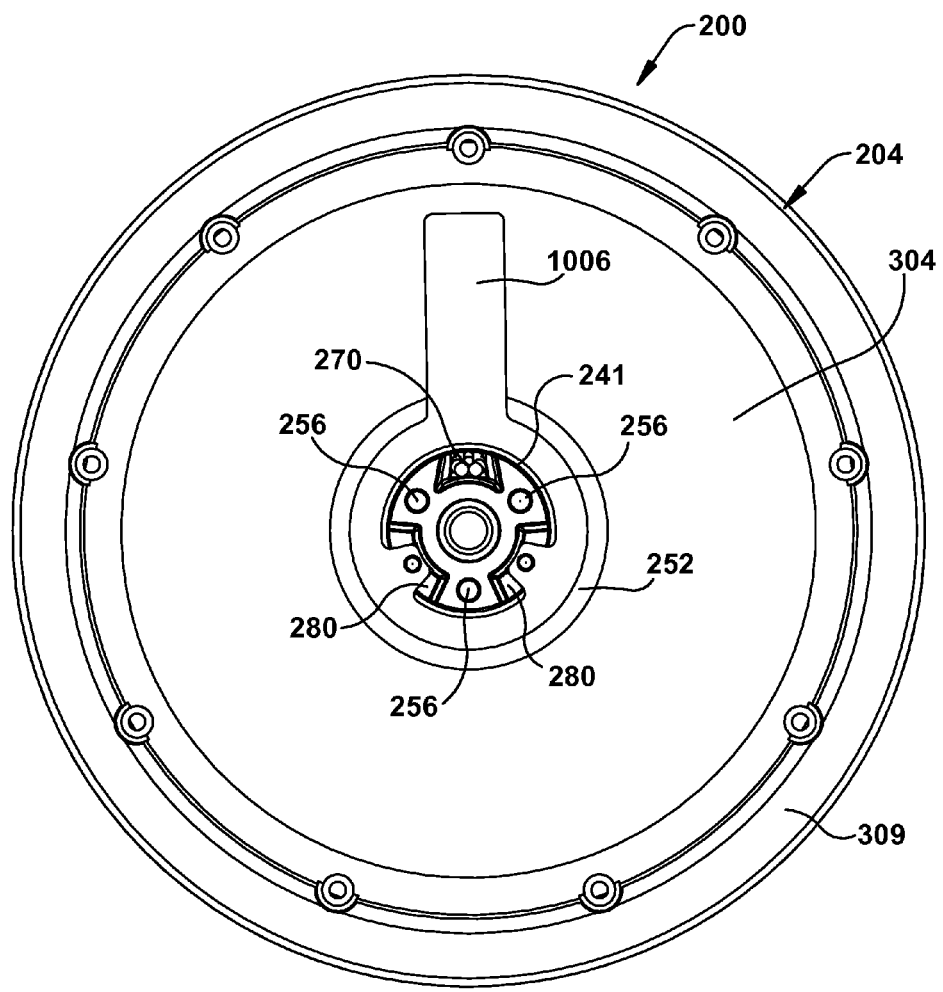
FIG. 2D is a rear view of the hub motor and brake assembly shown in FIG. 2A.
Figure 2E:
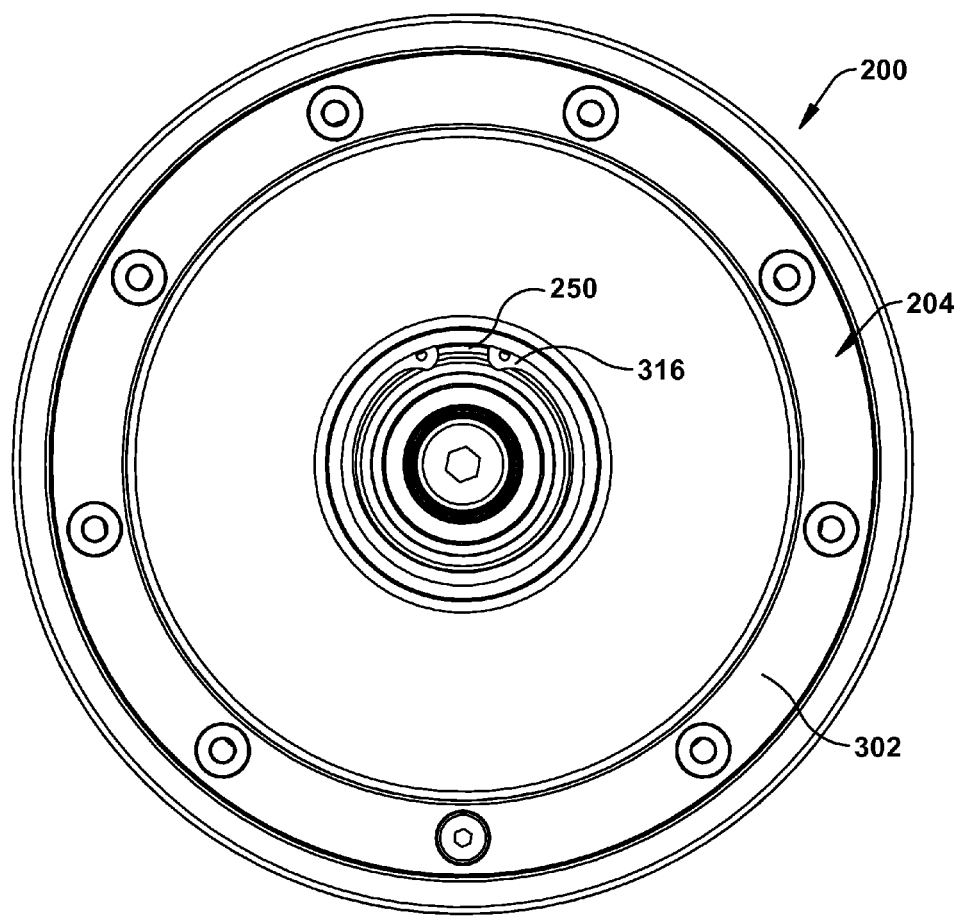
FIG. 2E is a front view of the hub motor and brake assembly shown in FIG. 2A.
Figure 3A:
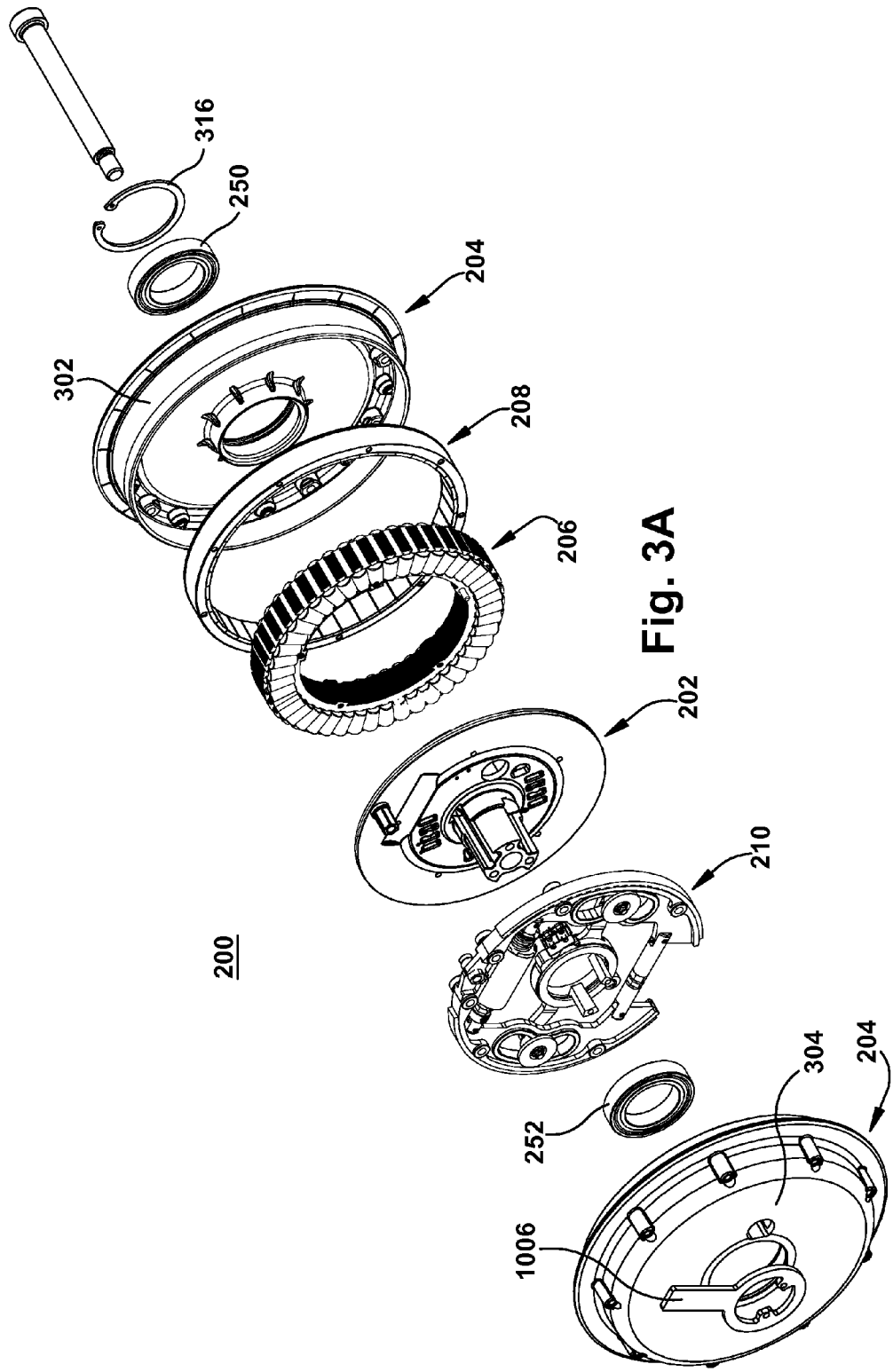
FIG. 3A is an exploded perspective view showing components of the hub motor and brake assembly shown in FIG. 2A.
Figure 3B:
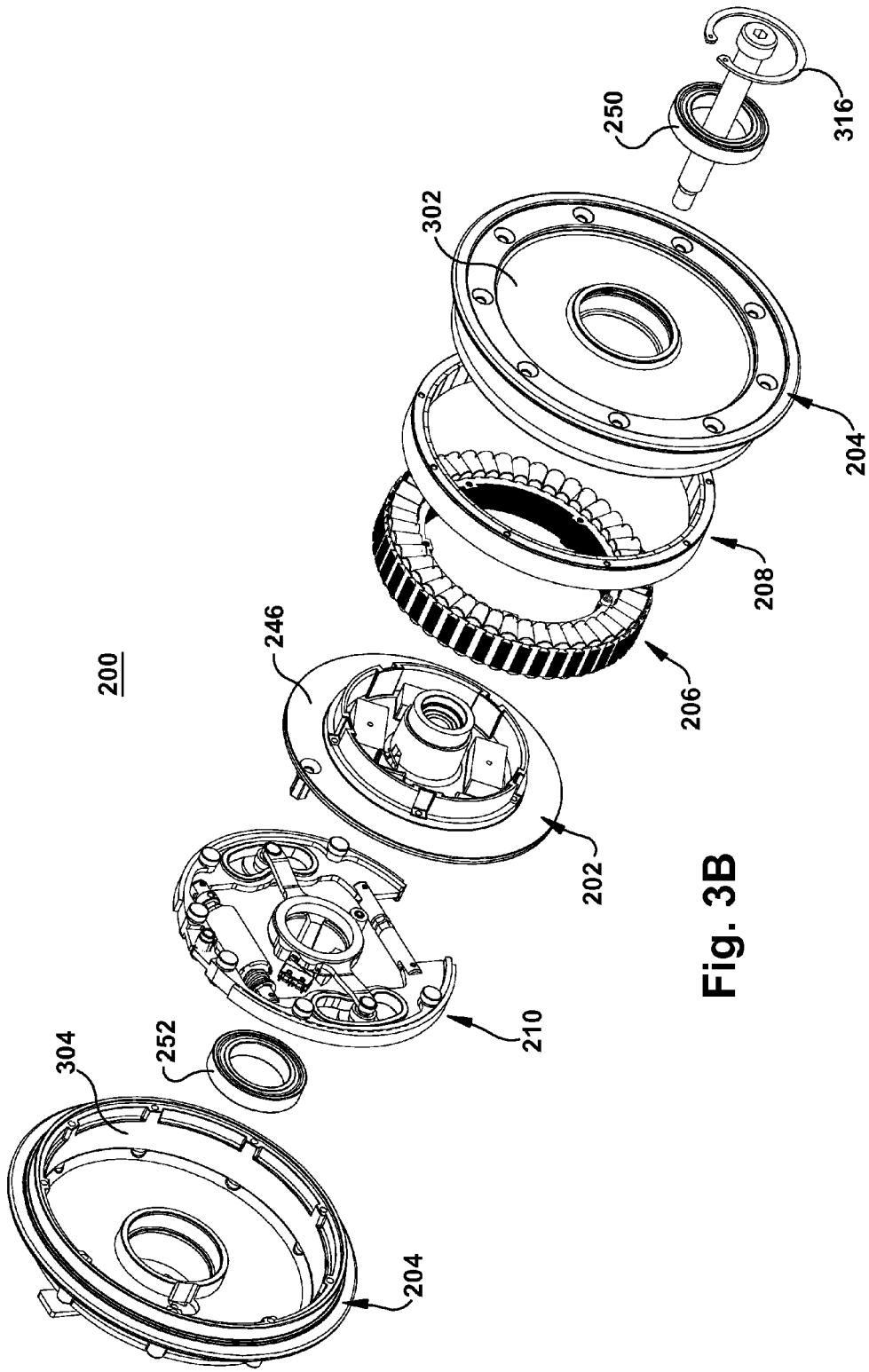
FIG. 3B is an exploded perspective view showing components of the hub motor and brake assembly shown in FIG. 2A.
Figure 7A:
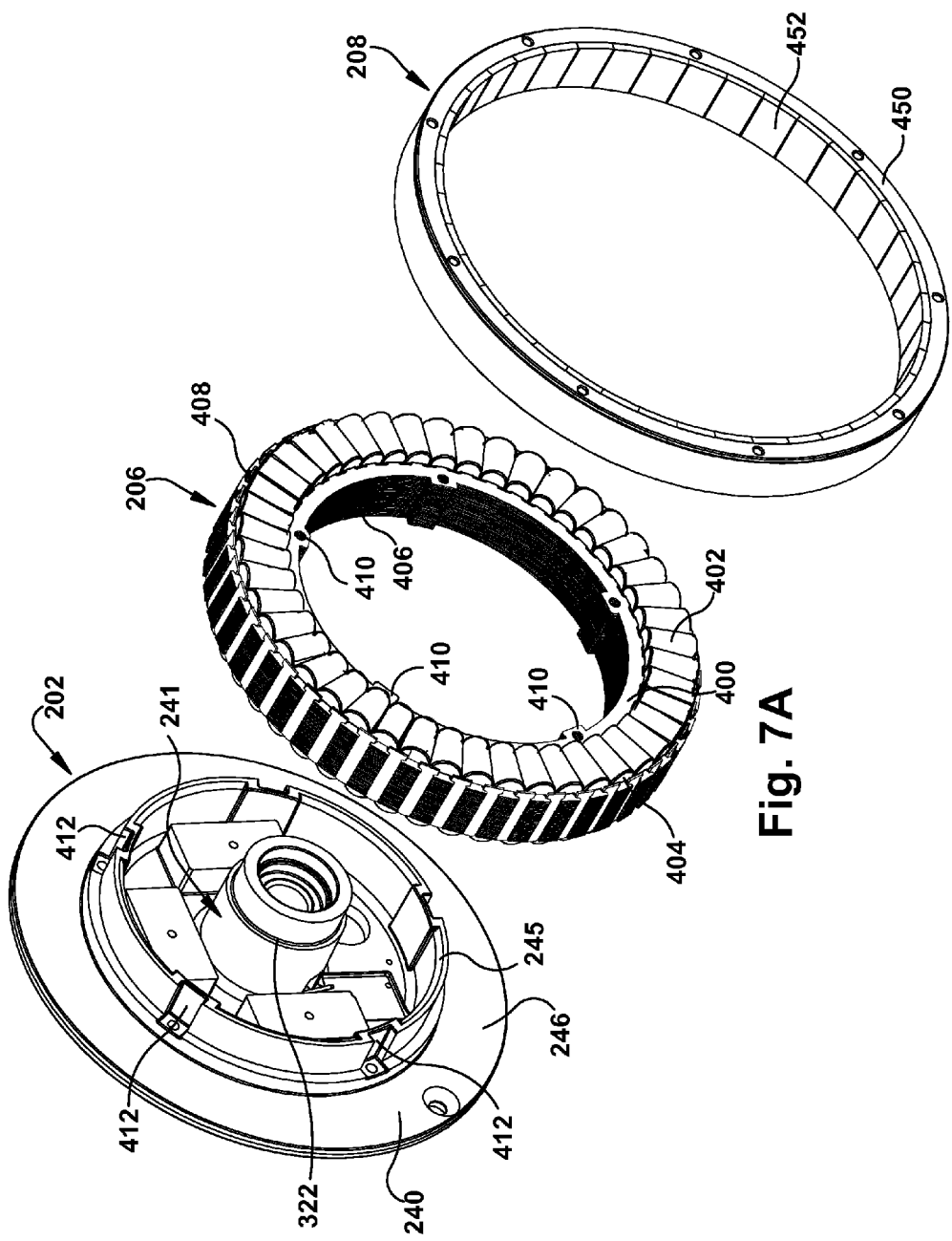
FIG. 7A is an exploded perspective view showing an exemplary embodiment of a mounting plate, an exemplary embodiment of a stator armature, and an exemplary embodiment of a rotor magnet ring assembly.
Figure 7B:
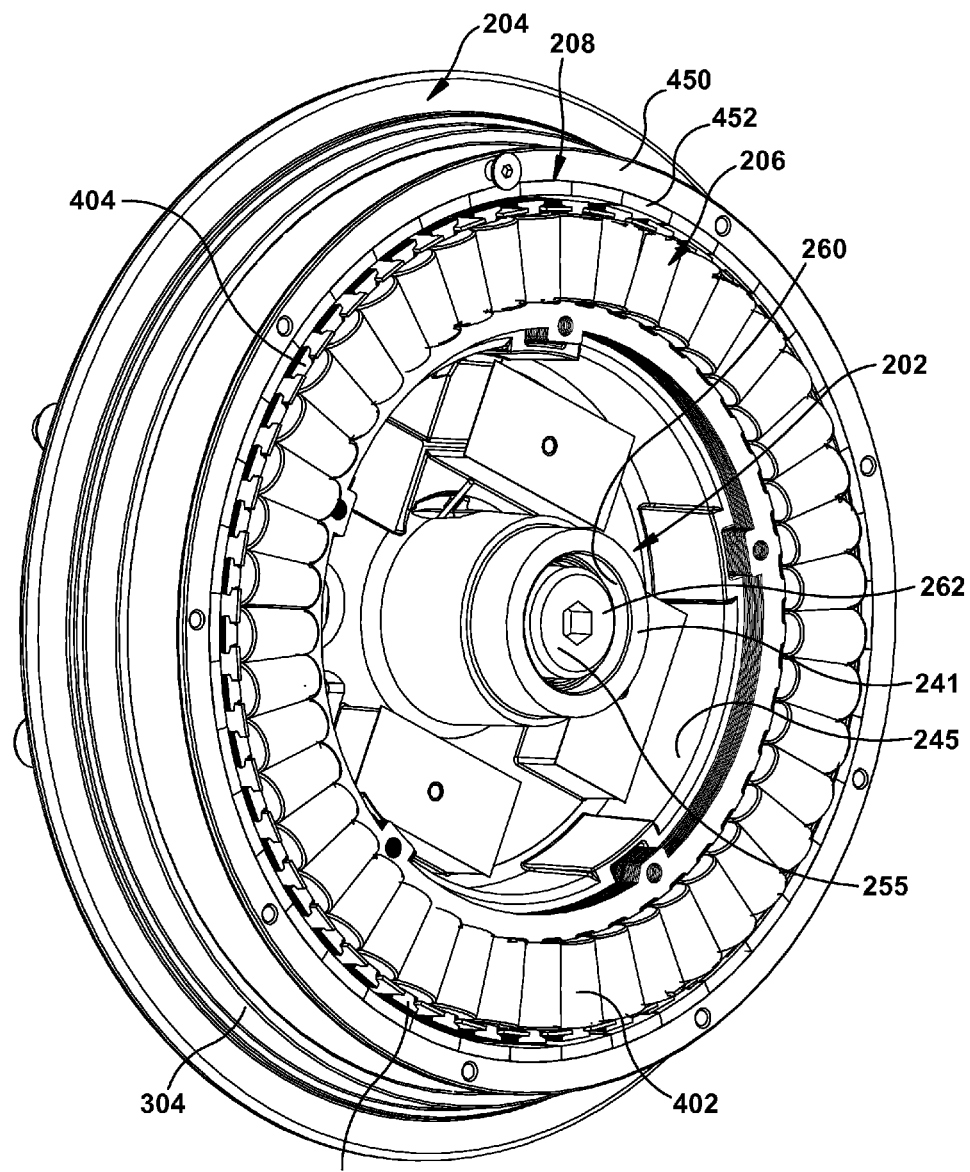
FIG. 7B is a perspective view of the hub motor and brake assembly shown in FIG. 2A with a portion of a rotor housing assembly and other components removed.
Figure 7C:
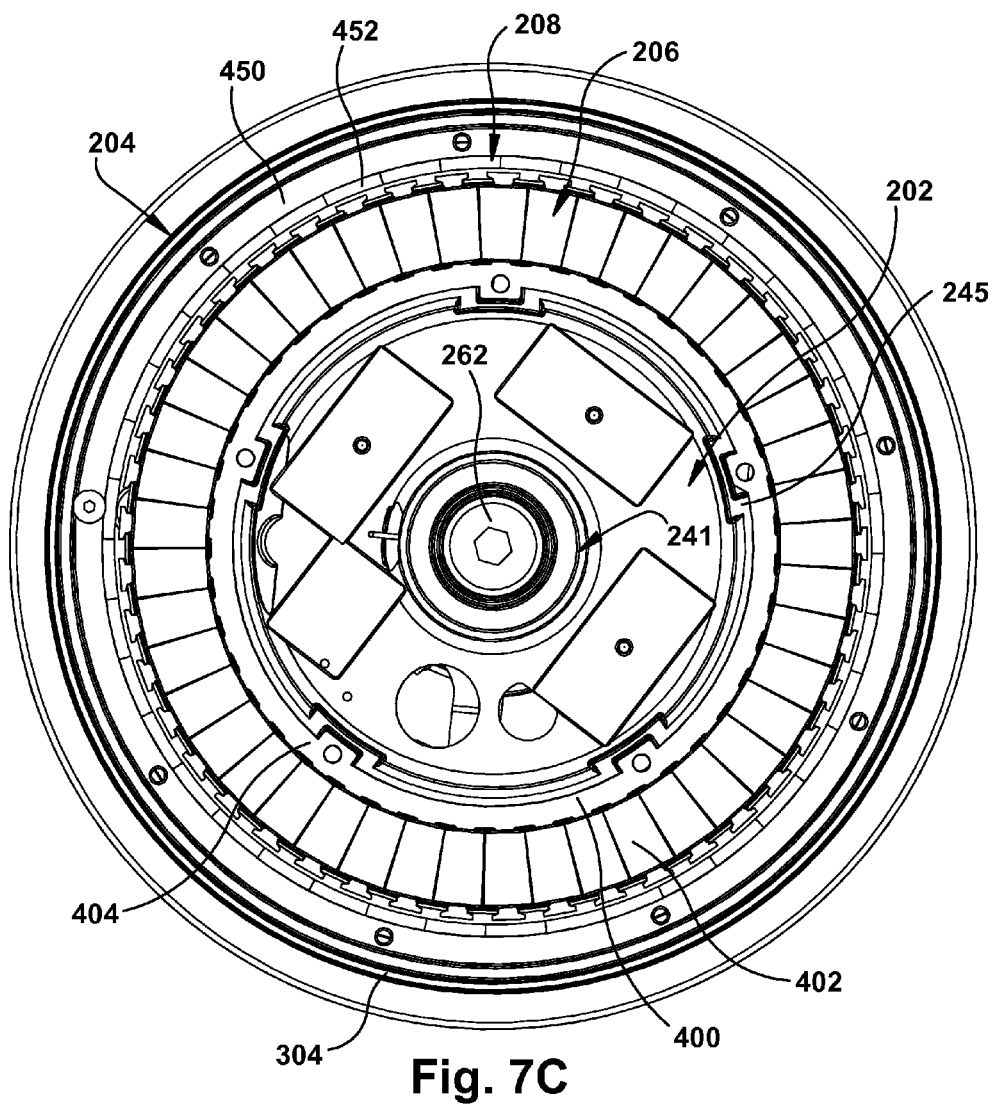
FIG. 7C is a front view of the hub motor and brake assembly shown in FIG. 2A with a portion of a rotor housing assembly and other components removed.

FIGS. 2A-2E, 3A and 3B illustrate one exemplary embodiment of a drive assembly 200 that is a hub motor with internal brakes. Referring to FIGS. 3A and 3B, the illustrated drive assembly includes a mounting plate 202, a rotor housing assembly 204, a stator armature assembly 206, a rotor magnet ring assembly 208, and a brake assembly 210. Referring to FIGS. 7B and 7C, in one exemplary embodiment, the rotor housing assembly 204 is rotatably connected to the mounting plate 202, with the stator armature assembly 206 fixed with respect to the mounting plate and the rotor magnet ring assembly 208 fixed with respect to the rotor housing assembly 204. As such, when the stator armature assembly 206 is energized, the rotor magnet ring assembly 208 and attached rotor housing assembly 204 is driven to rotate around the stator armature assembly 206 and mounting plate 202. As will be explained in more detail below, when disengaged (See FIG. 13), the brake assembly 210 allows rotation of the rotor housing assembly 204 around the mounting plate 202. When engaged (See FIG. 14), the brake assembly 210 resists rotation of the rotor housing assembly 204 around the mounting plate 202.

Figure 4A:
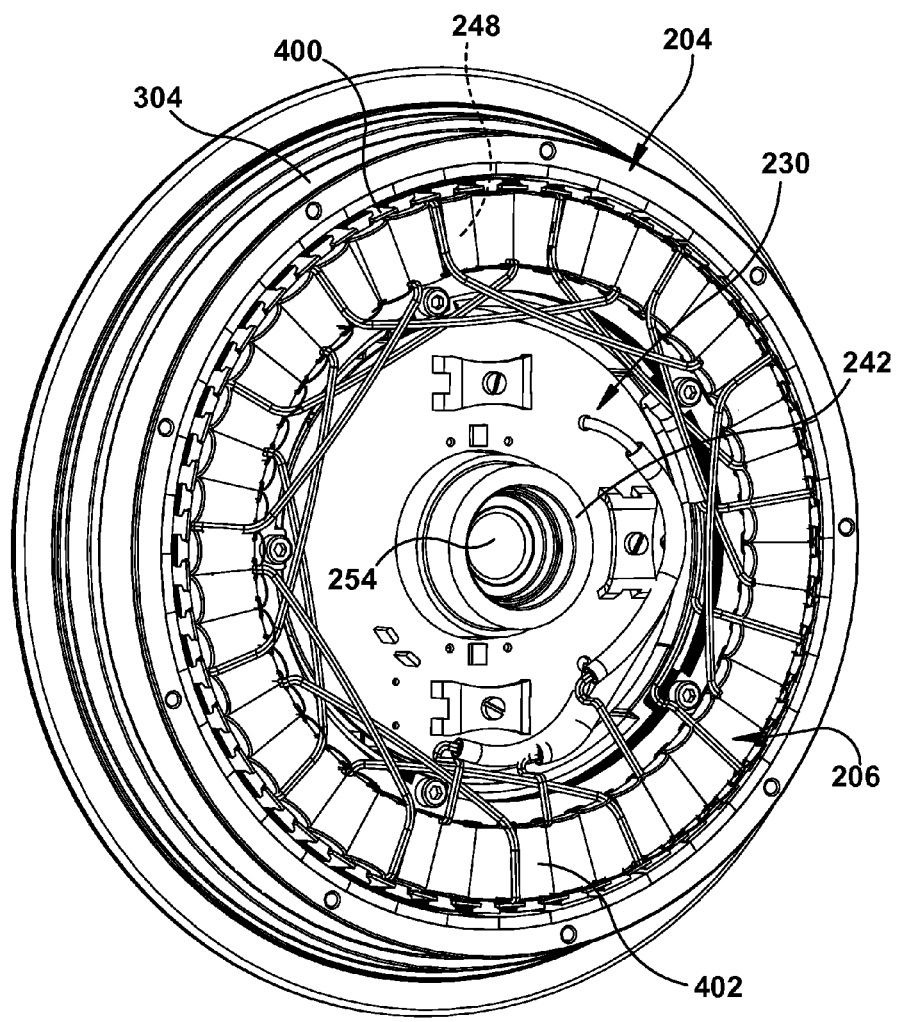
FIG. 4A is a perspective view of the hub motor and brake assembly shown in FIG. 2A with a portion of a rotor housing assembly removed.
Figure 4B:
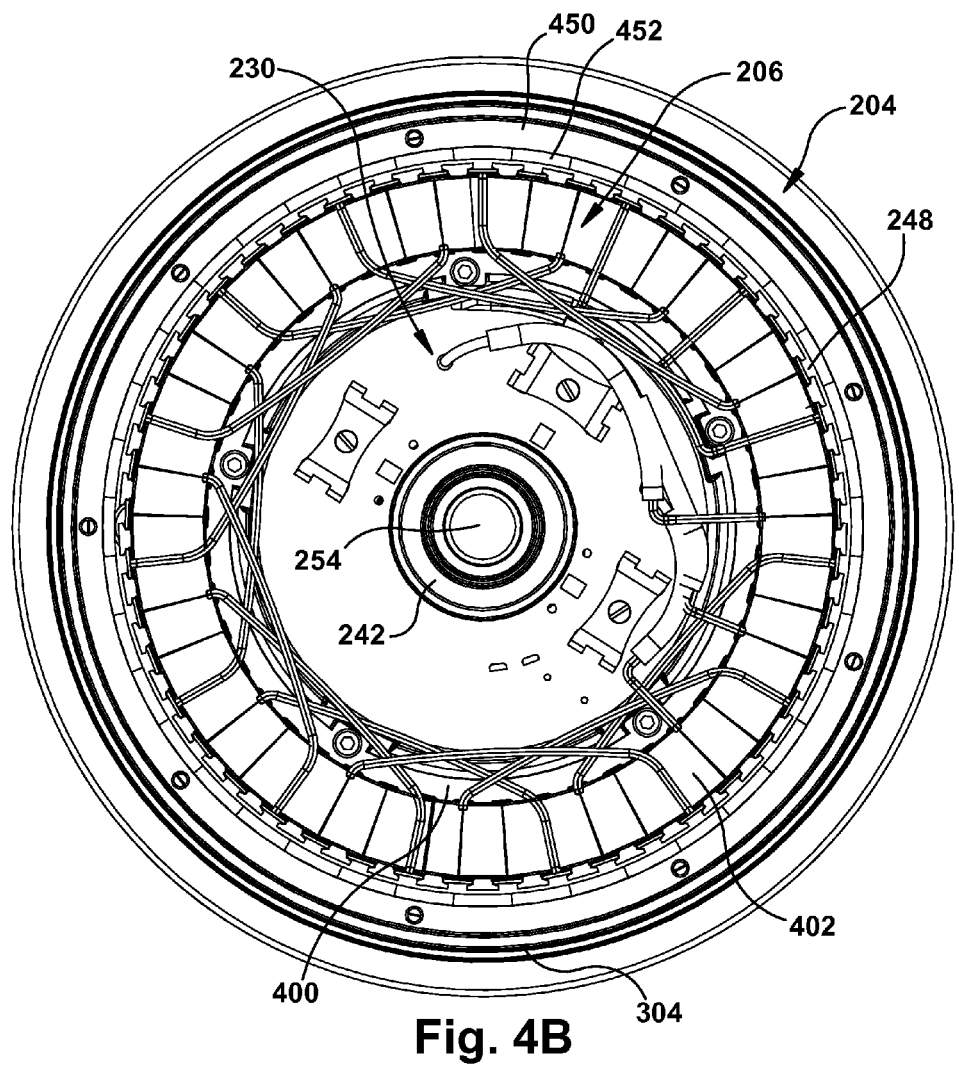
FIG. 4B is a front view of the hub motor and brake assembly shown in FIG. 2A with a portion of a rotor housing assembly removed.

Referring to FIGS. 4A and 4B, in one exemplary embodiment, the drive assembly 200 includes drive circuitry 230 that is optionally mounted inside the rotor housing assembly 204. In other embodiments, the drive circuitry 230 may be remote from the drive assembly 200, or is disposed in a housing of the drive assembly that is outside the rotor housing assembly 204. The drive circuitry 230 can take a wide variety of different forms. For example, the drive circuitry 230 can comprise any circuit that controls the power applied to the stator armature assembly 206 and/or the brake assembly 210.

Figure 5A:
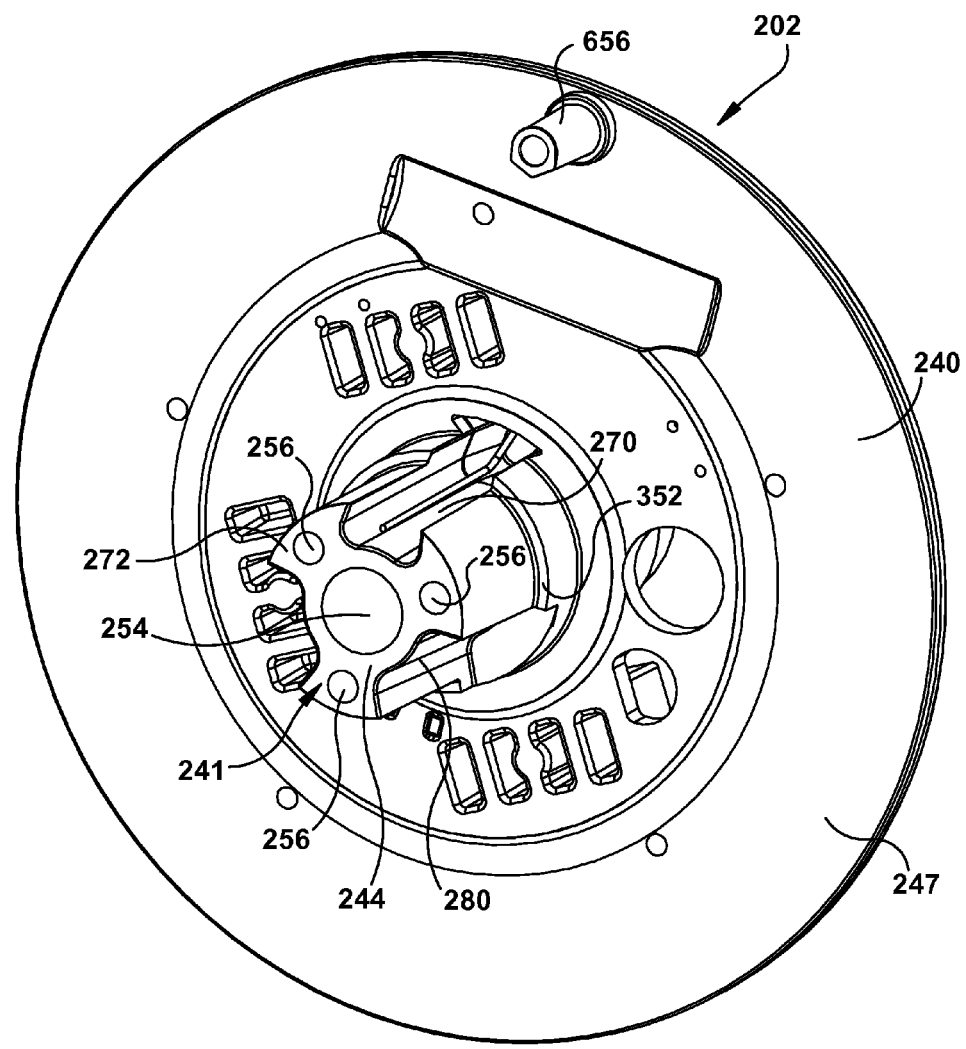
FIG. 5A is a perspective view of an exemplary embodiment of a mounting plate for a hub motor and/or brake assembly.
Figure 5B:
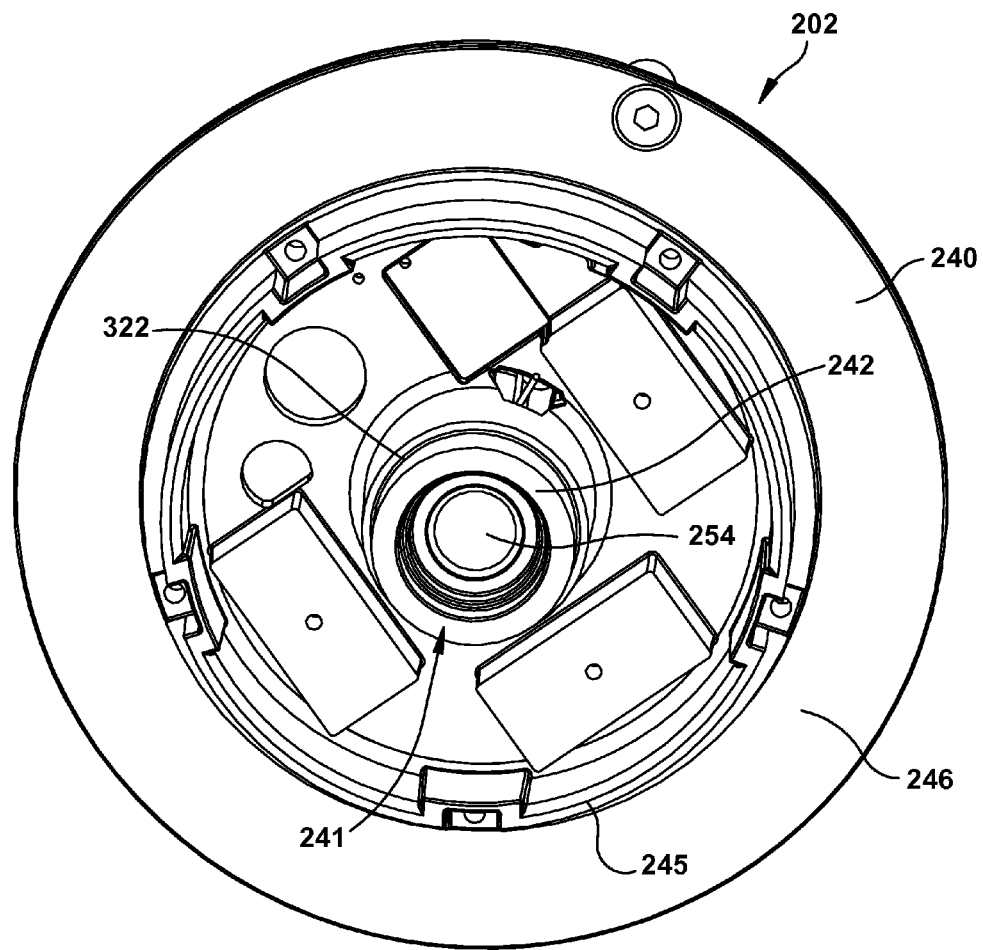
FIG. 5B is a second perspective view of the mounting plate shown in FIG. 5A.
Figure 5C:
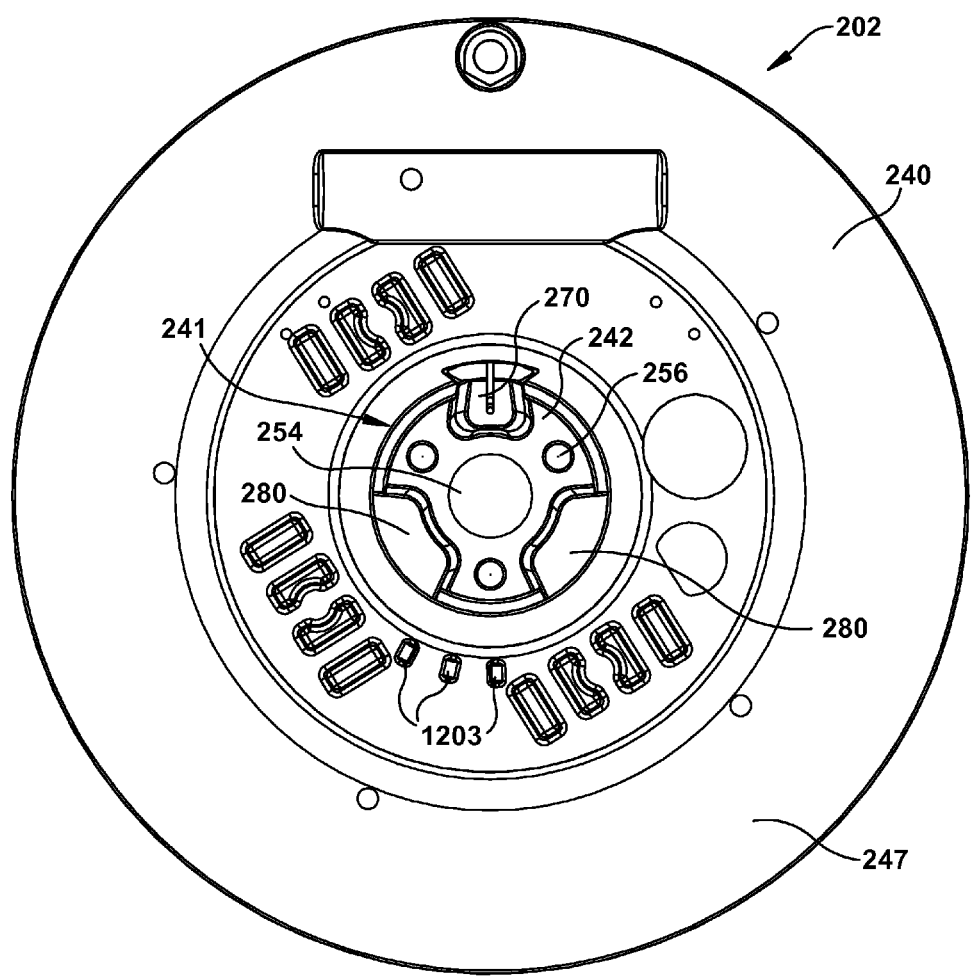
FIG. 5C is a rear view of the mounting plate shown in FIG. 5A.
Figure 5D:
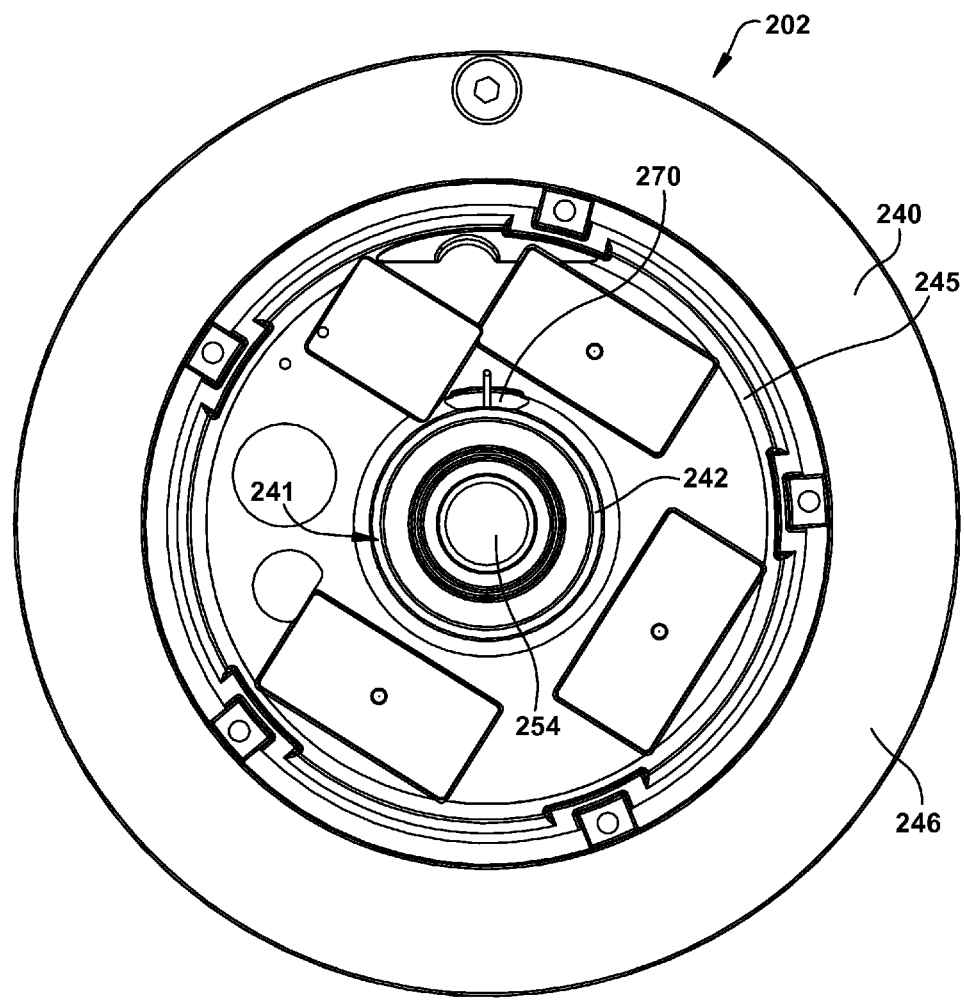
FIG. 5D is a front view of the mounting plate shown in FIG. 5A.

The mounting plate 202 can take a wide variety of different forms. The mounting plate 202 is illustrated as a single component, but it (and other components described in this application) can be multiple components that are fixed together or otherwise coupled. In the illustrated embodiment, the mounting plate 202 is configured to support or mount the stator armature assembly 206 and the brake assembly 210. Referring to FIGS. 5A-5D, the illustrated mounting plate 202 includes a wall portion 240, a central post 241 having a stator side portion 242 and a brake side portion 244, and a stator support wall 245. The central wall portion 240 includes a stator side 246. Referring to FIGS. 7A and 7B, the stator armature assembly 206 is mounted upon the stator side 246 around the stator support wall 245. Referring to FIG. 5B, the stator side portion 242 of the central post and the stator support wall 245 form an annular space 248. Referring to FIGS. 4A and 4B, in the illustrated embodiment, the drive circuitry 230 is mounted to the stator side 246 of the central wall portion 240 in the annular space. The drive circuitry 230 may be mounted on an annular circuit board that includes a central opening that fits around the stator side portion of the central post 241. However, the drive circuitry may have any physical configuration. In one exemplary embodiment, the mounting plate 202 is optionally made from a thermally conductive material, such as aluminum, and is used as a heat sink for one or more of the components of the drive circuitry 230.

Figure 1A:
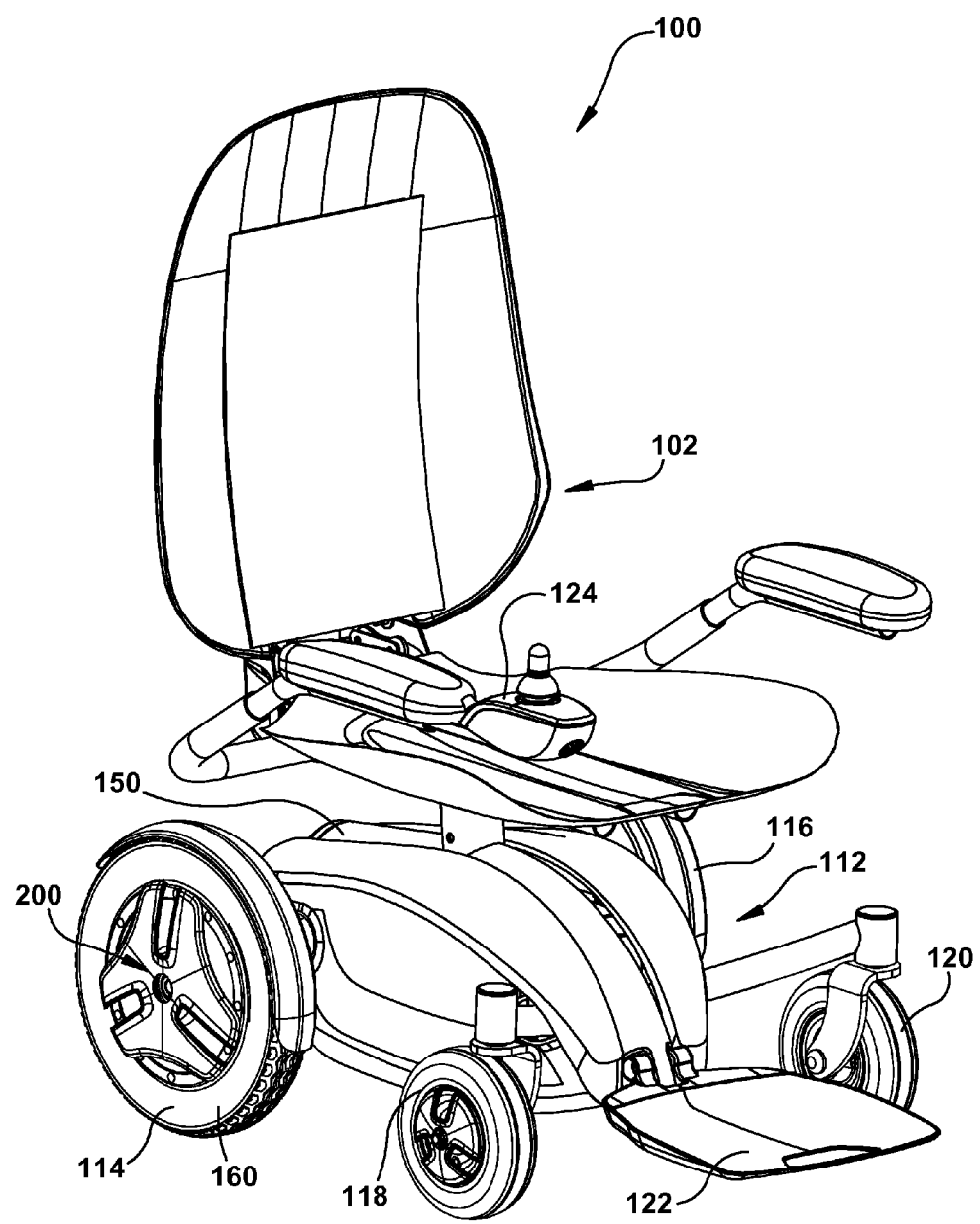
FIG. 1A is a perspective view of an exemplary embodiment of a wheelchair.
Figures 1D, 1E:
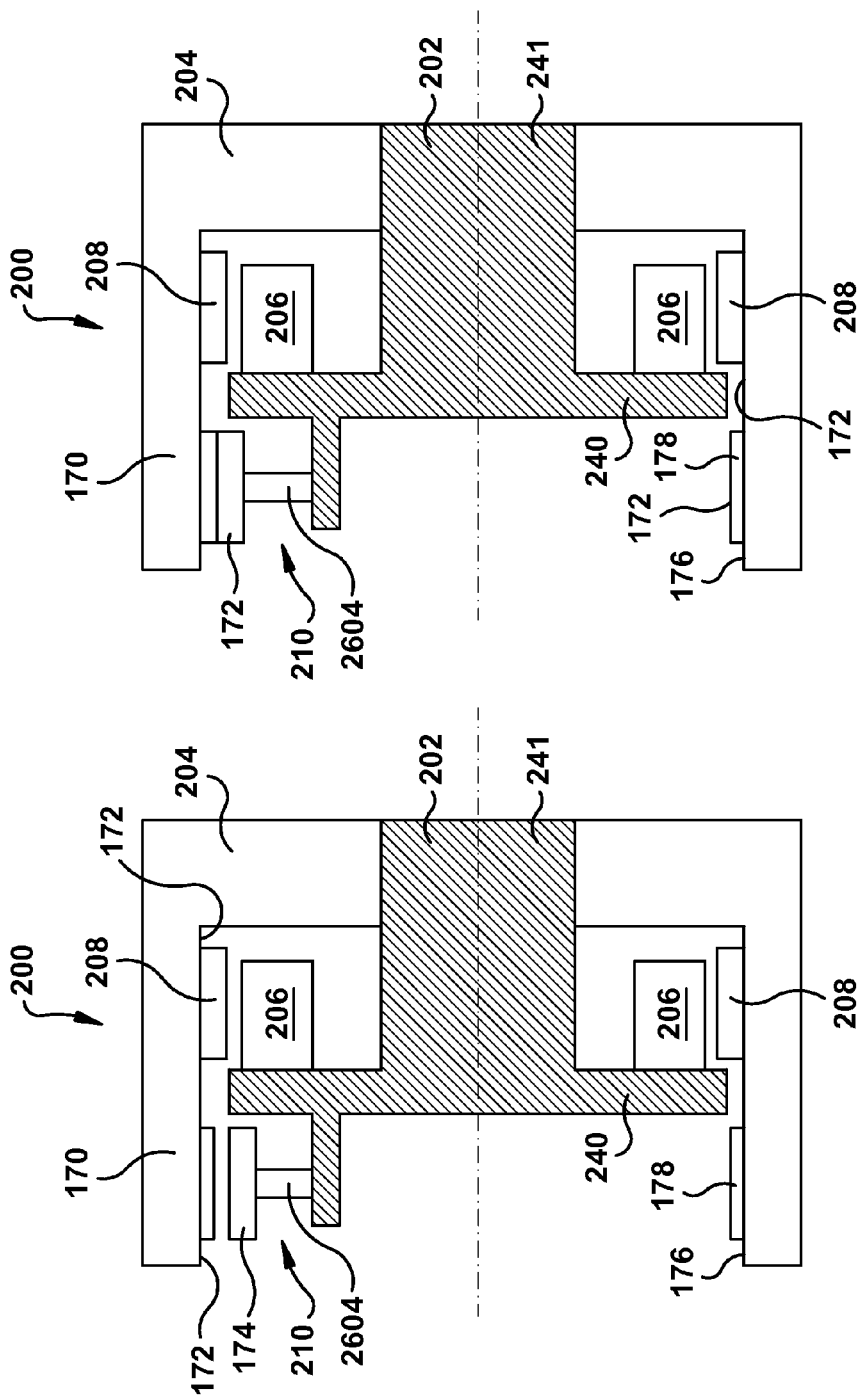
FIG. 1D is an illustration similar to FIG. 1B where the brake assembly includes a brake lining.
FIG. 1E is an illustration similar to FIG. 1D with the brake assembly in an engaged position.
Figure 6A:
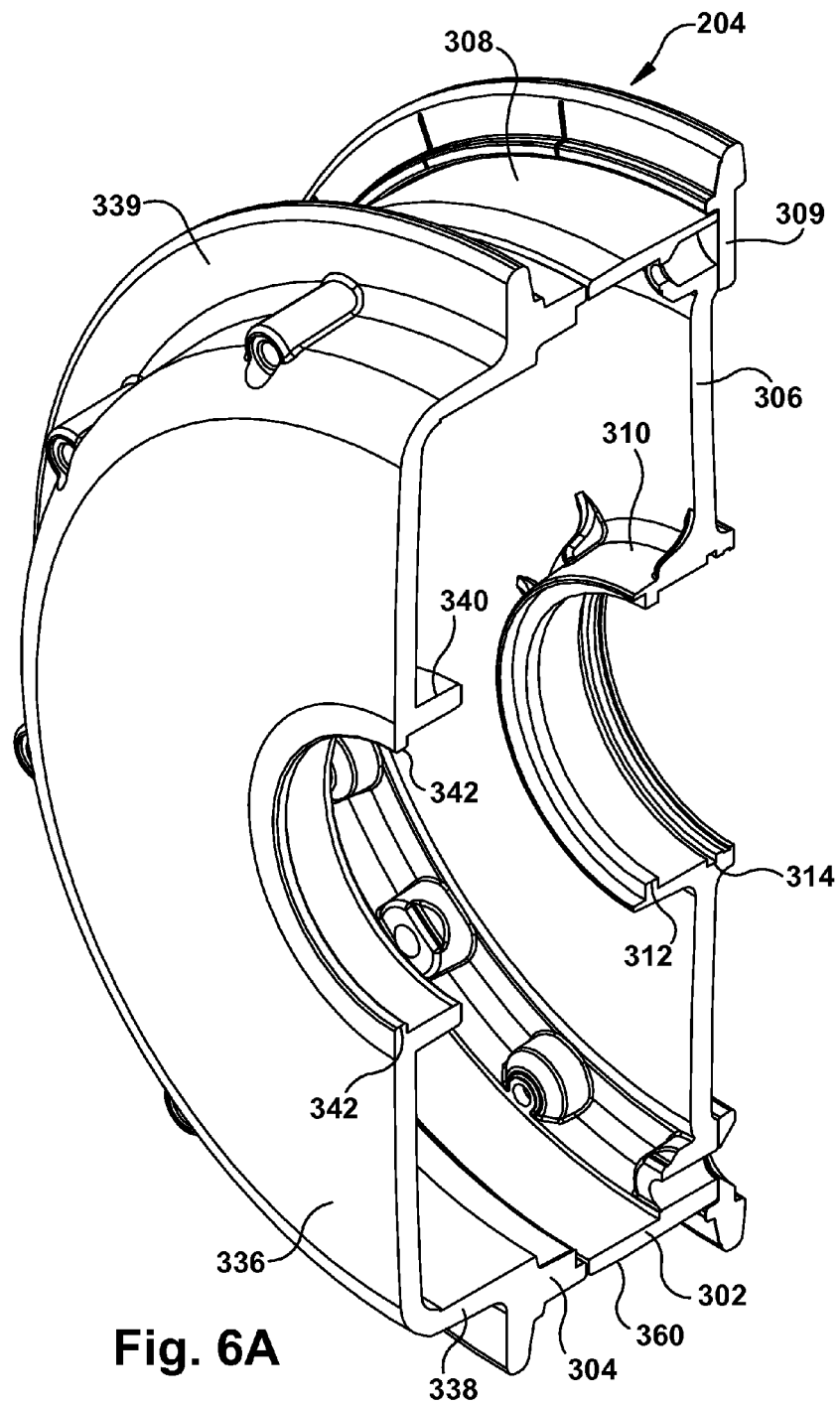
FIG. 6A is a sectioned perspective view of an exemplary embodiment of a rotor housing assembly.
Figure 6B:
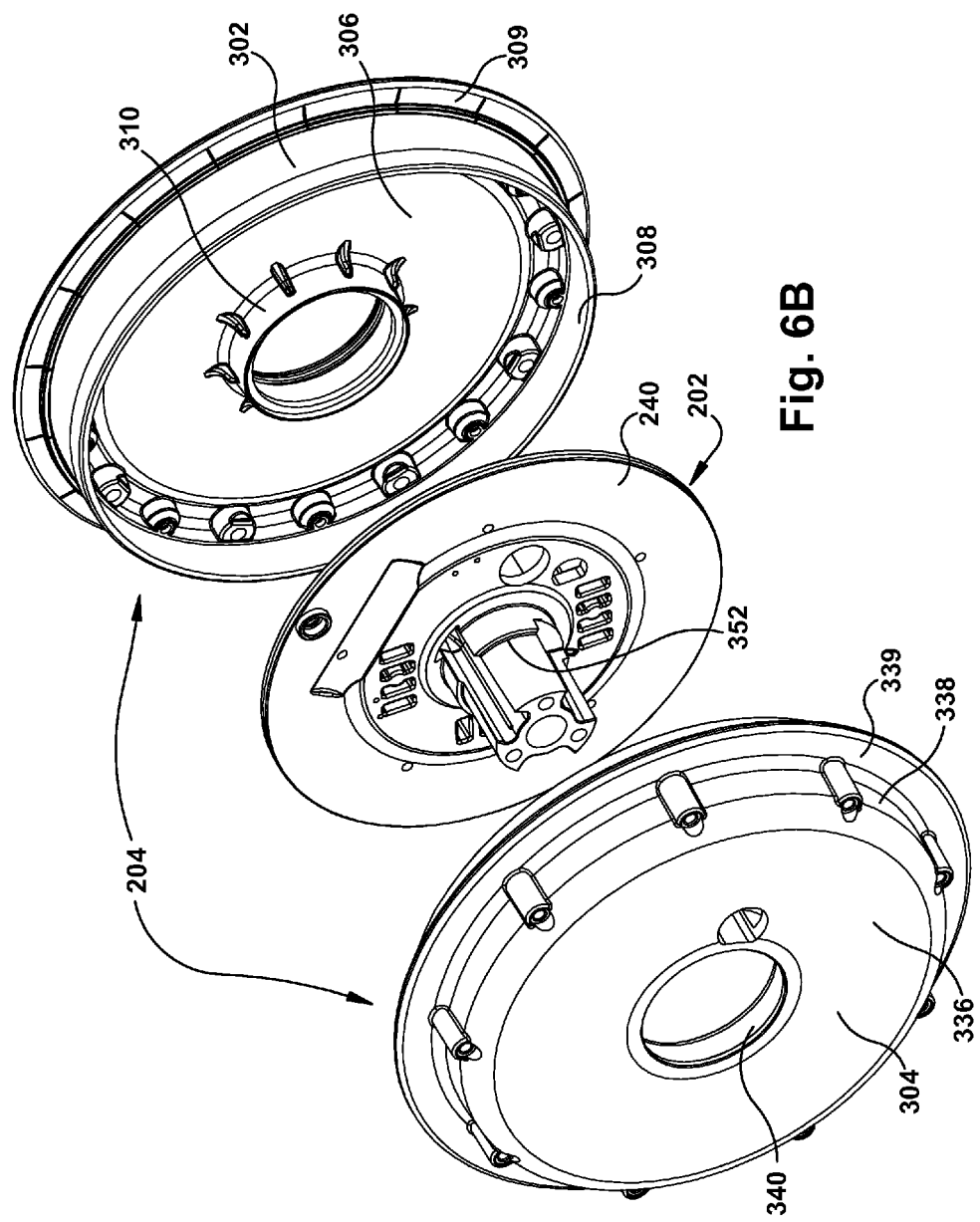
FIG. 6B is an exploded perspective view of an exemplary embodiment of a rotor housing and mounting plate assembly.
Figure 6C:
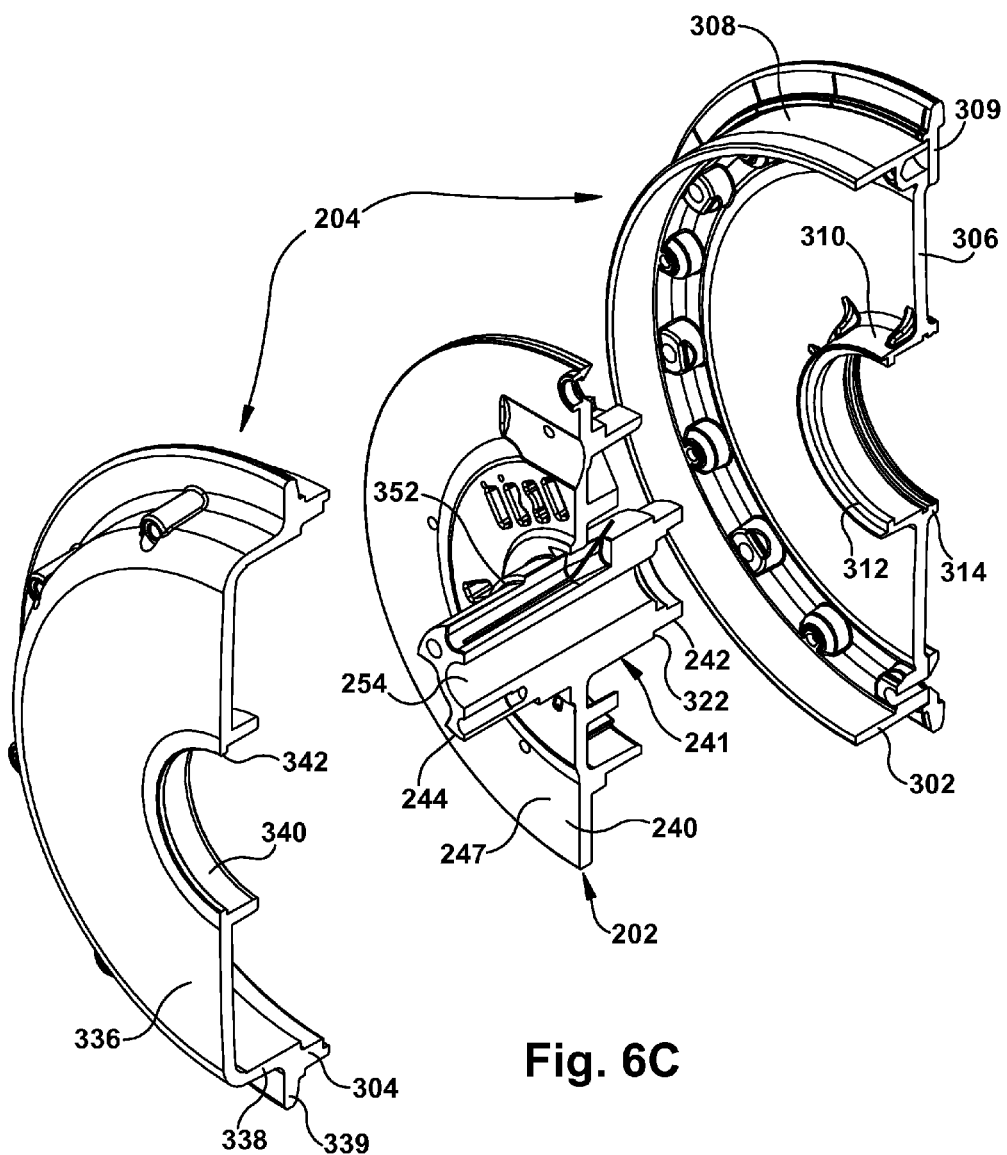
FIG. 6C is a sectioned exploded perspective view the rotor housing and mounting plate assembly shown in FIG. 6B.

Referring to FIGS. 3A, 3B and 6C, the illustrated central post 241 is generally cylindrical to allow the mounting plate 202 to be rotatably coupled to the rotor housing assembly 204 by first and second bearings 250, 252. The central post 241 includes an opening 254 that accepts a fastener 255 for mounting the drive assembly to a frame 150 of the chassis 112 (FIGS. 1 and 1A). Referring to FIG. 2B, the opening 254 may include a counterbore 260 and a head 262 of the fastener does not extend axially past an outer side wall 264 of the rotor housing assembly 204. A cap may be placed over the fastener 255 in the counterbore 260 to conceal the fastener. In the illustrated embodiment, the opening 254 is centered in the post 241, but may be offset from a central axis X of the post in other embodiments.

Referring to FIG. 2A, the illustrated post 241 also includes one or more alignment features 256 that mate with corresponding features included on the frame 150 (FIG. 1) to set the rotational position of the mounting plate 202 (and attached components) relative to the frame 150. The alignment features 256 and corresponding alignment features of the frame may take a wide variety of different forms. For example, the alignment features 256 may be projections and/or recesses that mate with respective recesses and/or projections to set the position of the base member 202. In the illustrated embodiment, the alignment features 256 comprise counterbores that mate with projections, such as pins, included on the frame 150. The alignment features 256 facilitate quick alignment and connection of each drive assembly to the frame 150 with a single fastener 255. The fastener may take a wide variety of different forms and any conventional fastener can be used. In one embodiment, a single threaded fastener or a quick release fastener is used and the entire drive assembly can be quickly mounted to the frame 150 or removed from the frame with the single threaded fastener or the single quick release fastener.

Referring to FIG. 2A, in one exemplary embodiment, the central post 241 includes a wireway 270. The wireway 270 can take a wide variety of different forms. The illustrated wireway 270 is a slot that extends from the drive circuitry 230 to the end 272 of the central post 241 that is outside the rotor housing assembly 204. Wires or other types of communication lines that couple the drive circuitry 230 to a joystick (or other type of user interface) and/or other control circuitry are routed through the wireway 270. A protective sheath may be disposed over the wires in the wireway 270. The wireway 270 and the protective sheath may be complimentary in shape, such that the protective sheath can simply slide over the wires and snap into the wireway 270. In an exemplary embodiment, the wireway 270 is positioned to be at the top dead-center (or bottom dead-center) when the drive assembly is mounted to the wheelchair 100 (or other vehicle). This positioning places the wires at the same location on each side of the wheelchair 100 (or other vehicle). As such, the same drive assembly can easily be used on either side of the wheelchair 100 (or other vehicle).

Referring to FIG. 2D, in one exemplary embodiment, the central post 241 includes one or more brake control passages 280. The brake control passages 280 can take a wide variety of different forms. For example, the brake control passage 280 may be any opening, channel, bore, etc. that provides access to the brake assembly 210 from the end 272 of the central post 241. The illustrated brake control passage 280 comprises a pair of generally rectangular slots that extend from the brake assembly 210 to the end 272 of the central post 241. As will be described in more detail below, components of a manual brake disengagement mechanism 1000 (or other type of user interface) extend through the brake control passage 280.

Figure 6D:
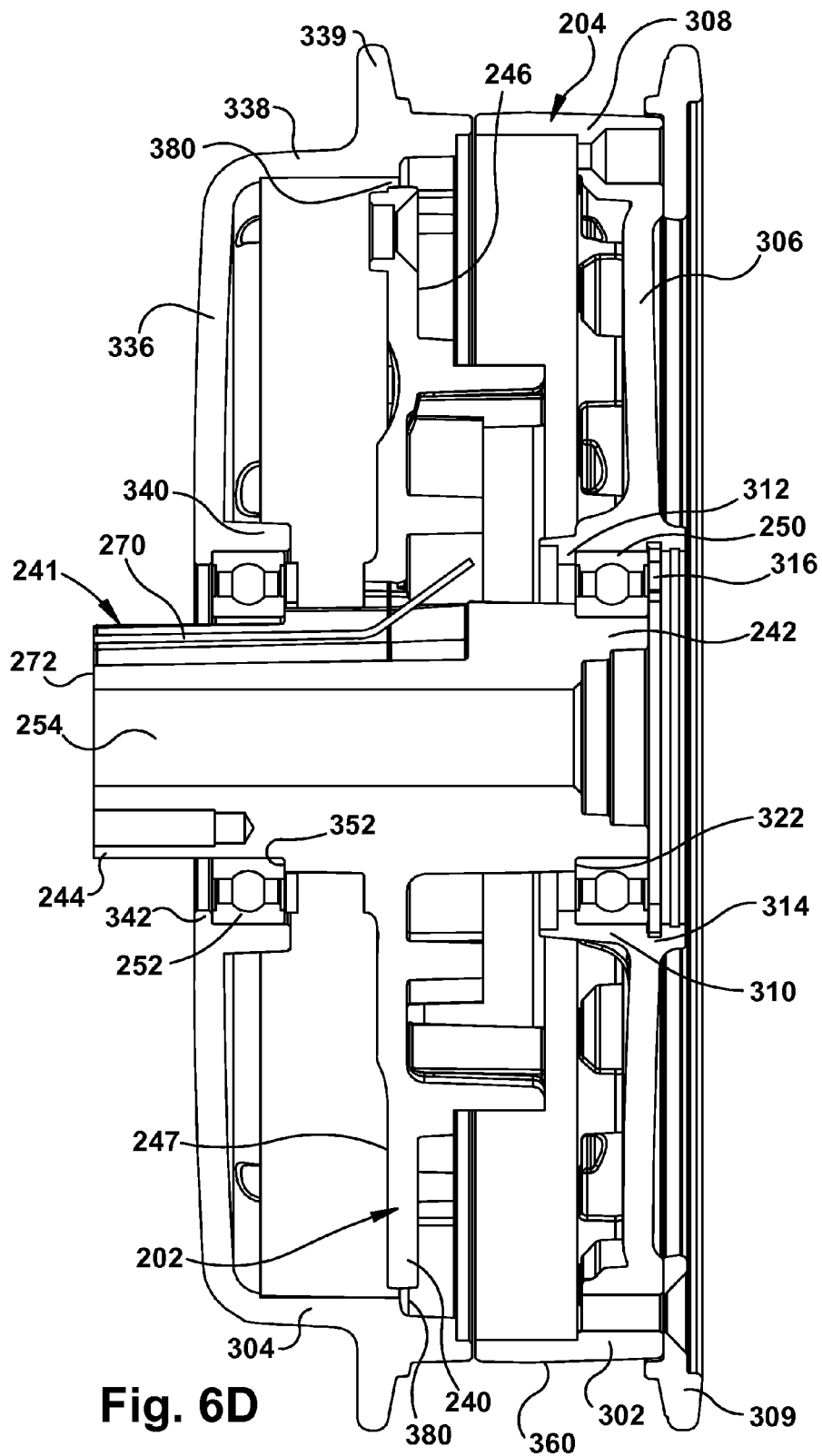
FIG. 6D is a sectioned view of an exemplary embodiment of a rotor housing and mounting plate assembly.

The rotor housing assembly 204 can take a wide variety of different forms. For example, any arrangement that can be rotatably mounted around the mounting plate 202 and that can support a tire 160 (FIGS. 1 and 1A) can be used. In the embodiment illustrated by FIGS. 6A-6D, the rotor housing assembly 204 has a clam-shell configuration that includes an outer cover 302 and an inner cover 304. The illustrated outer cover 302 includes a disk shaped end face 306, a radially outer wall 308, and a radially inner bearing wall 310. Referring to FIGS. 6B-6D, the outer cover 302 fits over the stator armature assembly 206 (removed in FIG. 6D to simplify the drawing) and mounting plate 202 and is rotatably connected to the stator side portion 242 of the central post by the bearing 250 (FIG. 6D). The bearing 250 may be coupled to the outer cover 302 and to the stator side portion 242 of the central post 241 in a wide variety of different ways. For example, in the illustrated embodiment, the bearing 250 may be press fit into the radially inner wall 310 against a bearing support flange 312 (FIG. 6D) that extends radially inward from the radially inner wall 310, past an annular groove 314 that extends radially outward from the radially inner wall 310. A snap ring 316 snaps into the annular groove 314 to secure the bearing 350 to the outer cover 302. The bearing 250 may also be press fit around the stator side portion 242 of the post 241 against a bearing support flange 322 (FIG. 6D) of the post 241. However, any manner of coupling the outer cover 302 and to the stator side portion 242 of the central post 241 may be employed. In the illustrated embodiment, a rim 309 is connected to the outer cover 302 by a plurality of fasteners. However, the rim 309 may be integrally formed with the outer cover 302.

Referring to FIGS. 6A-6D, the illustrated inner cover 304 includes a disk shaped end face 336, a radially outer wall 338, a rim 339 extending radially outward from the wall, and a radially inner bearing wall 340. The rim 339, like the other components described in this application, may be made from a single piece, or multiple pieces. The inner cover 304 fits over the brake assembly 210 and mounting plate 202 and is rotatably coupled to the brake side portion 244 of the central post 241 by the bearing 252 (FIG. 6D). The bearing 252 may be coupled to the inner cover 304 and to the brake side portion 244 of the central post 241 in a wide variety of different ways. In the illustrated embodiment, the bearing 252 is press fit into the radially inner wall 340 against a bearing support flange 342 (FIG. 6D) that extends radially inward from the radially inner wall 340. The bearing 250 may also be press fit around the brake side portion 244 of the post 241 against a bearing support flange 352 of the post 241 (FIG. 6D). However, any manner of coupling the inner cover 304 and to the brake side portion 244 of the central post 241 may be employed.

Referring to FIG. 6D, a small gap 380 is provided between the outer circumference of the mounting plate 202 and the rotor housing assembly 204, such that the rotor housing assembly 204 can freely rotate around the mounting plate 202.

In an exemplary embodiment, the outer cover 302 is secured to the and the inner cover 304 to complete the rotor housing assembly 204. This connection may be achieved in a wide variety of different ways. In the illustrated embodiment, the outer cover 302 is secured to the inner cover 304 by a plurality of fasteners. However, any manner of connection may be used. In the illustrated embodiment, an annular recess 360 is defined between the two rims 309, 339. In an exemplary embodiment, a tire 160 (FIGS. 1 and 1A) is mounted in the recess 360 between the two rims 309, 339 in a known manner. One or both of the rims 309, 339 may be integrally formed with the outer cover 302 and/or the inner cover 304 or one or both of the rims may be separately attached to and removable from the outer cover 302 and/or the inner cover 304. By removably attaching one of the rims 309, 339 to the inner cover 304 and/or the outer cover 302, a solid tire can easily be changed, without requiring significant disassembly of the drive assembly 200.

The stator armature assembly 206 may take a wide variety of different forms. Any conventional stator armature assembly may be used. In the embodiment illustrated by FIG. 7A, the stator armature assembly 206 includes a core 400 and a plurality of windings 402. The illustrated core 400 comprises a plurality of annular plates 404 that are stacked. The plates each include an annular central opening 406 and a plurality of radially outwardly extending legs 408. Mounting tabs 410 extend radially inward from the opening 406. The stacked legs 408 form winding posts. The windings 402 are wound around the posts. Insulators may be provided around the adjacent wires of each pair of adjacent windings to insulate the windings from the core 400. The illustrated stator armature assembly 206 is fixed to the base member 202 around the stator support wall 245. In the embodiment illustrated by FIG. 7A, the mounting tabs 410 are secured in recesses 412 in the outer surface of the outer wall 245. Referring to FIGS. 4A and 4B, the windings 402 of the stator armature assembly 206 are electrically connected to and are selectively powered by the drive electronics 230.

The rotor magnet ring assembly 208 may take a wide variety of different forms. Any conventional rotor configuration may be employed. In the embodiment illustrated by FIG. 7A, the rotor magnet ring assembly 208 includes an annular support ring 450 and a plurality of permanent magnets 452 attached to an inner wall of the support ring. The illustrated rotor magnet ring assembly 208 is fixed to the rotor housing assembly 204 around the stator armature assembly 206.

The brake assembly 210 can take a wide variety of different forms. For example, the brake assembly 210 may be a drum brake assembly, a disc brake assembly, a strap brake assembly, a cam brake assembly, etc. Any arrangement capable of arresting relative rotation between the mounting plate 202 and the rotor housing assembly 204 can be used. In the embodiment illustrated by FIGS. 8A-8D, the brake assembly 210 has a drum brake configuration and is positioned on a brake side 247 of the central portion 240 of the base member 202.

The illustrated brake assembly 210 includes a pair of brake shoes 600, a pair of brake pads 602, and a brake actuator 604. The brake actuator 604 selectively moves the brake shoes 600 and associated pads into (FIG. 14) and out of (FIG. 13) engagement with an inner surface 608 of the rotor housing assembly 204 (or alternatively with a lining secured to the inner surface of the rotor housing assembly).

Figure 9A:
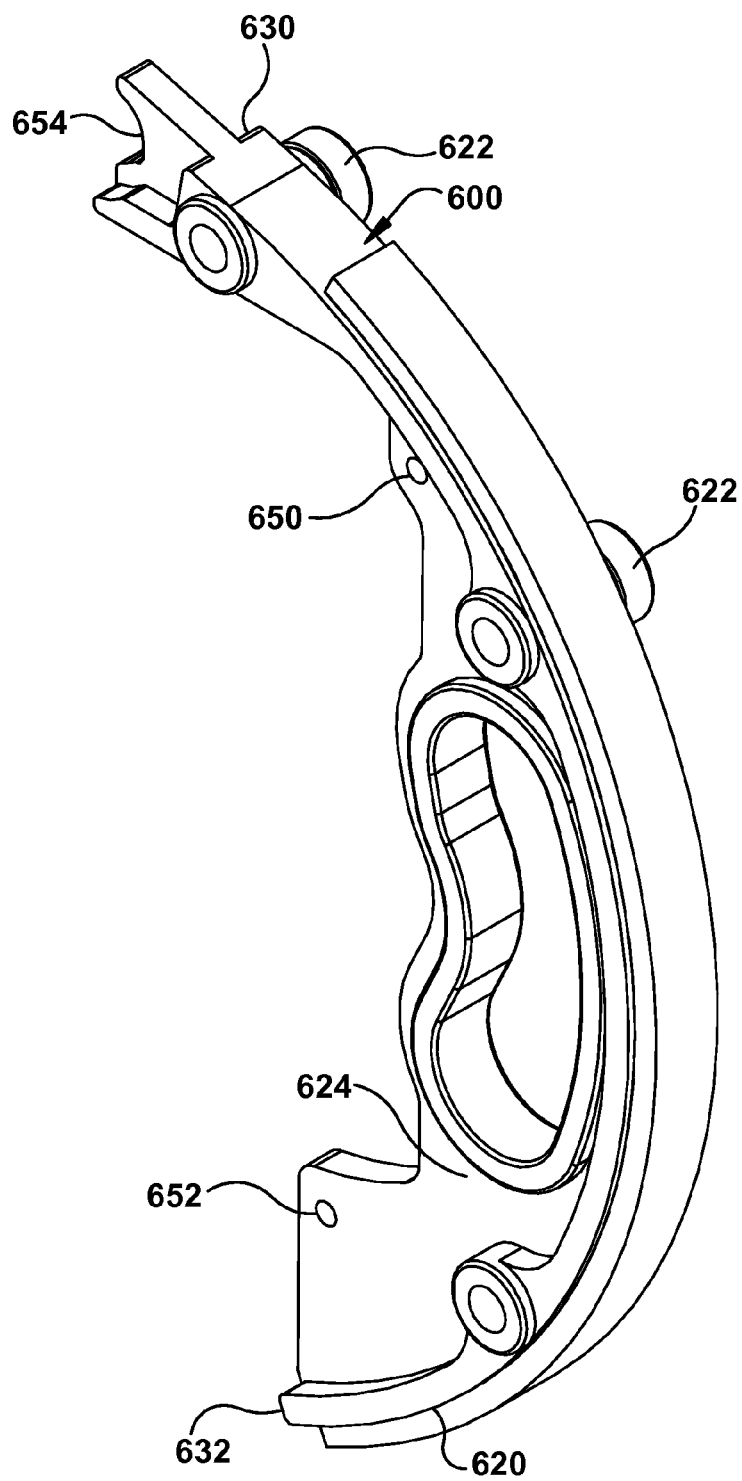
FIG. 9A is a perspective view of an exemplary embodiment of a brake shoe assembly.
Figure 9B:
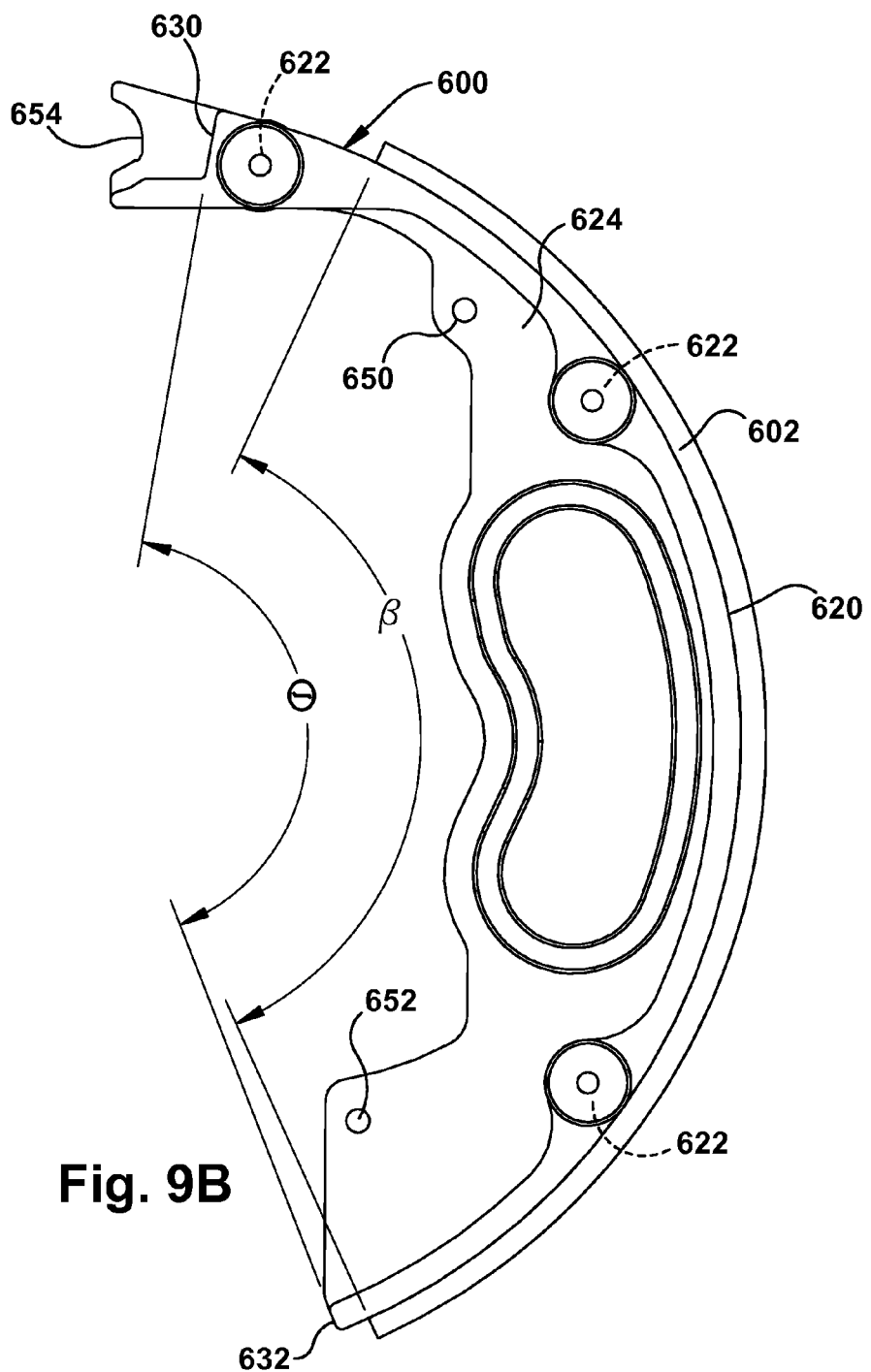
FIG. 9B is a front view of the brake shoe assembly shown in FIG. 9A.
Figure 9C:
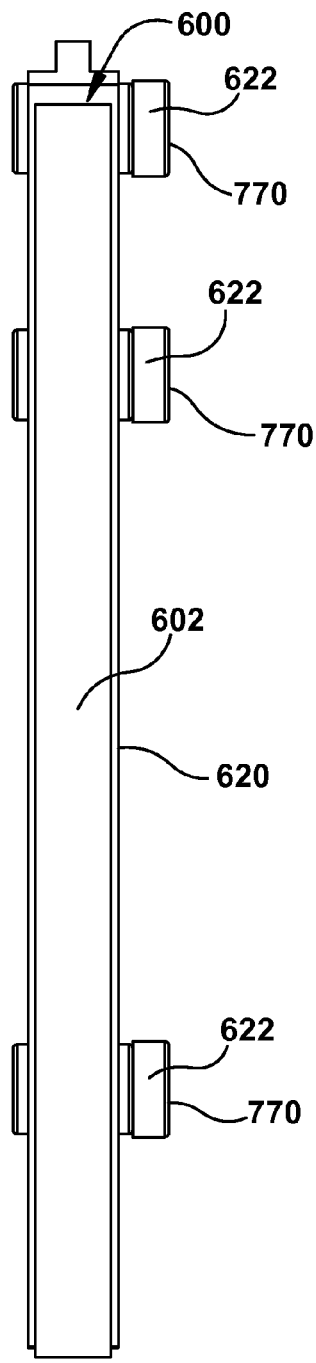
FIG. 9C is a side view of the brake shoe assembly shown in FIG. 9A.
Figure 13:
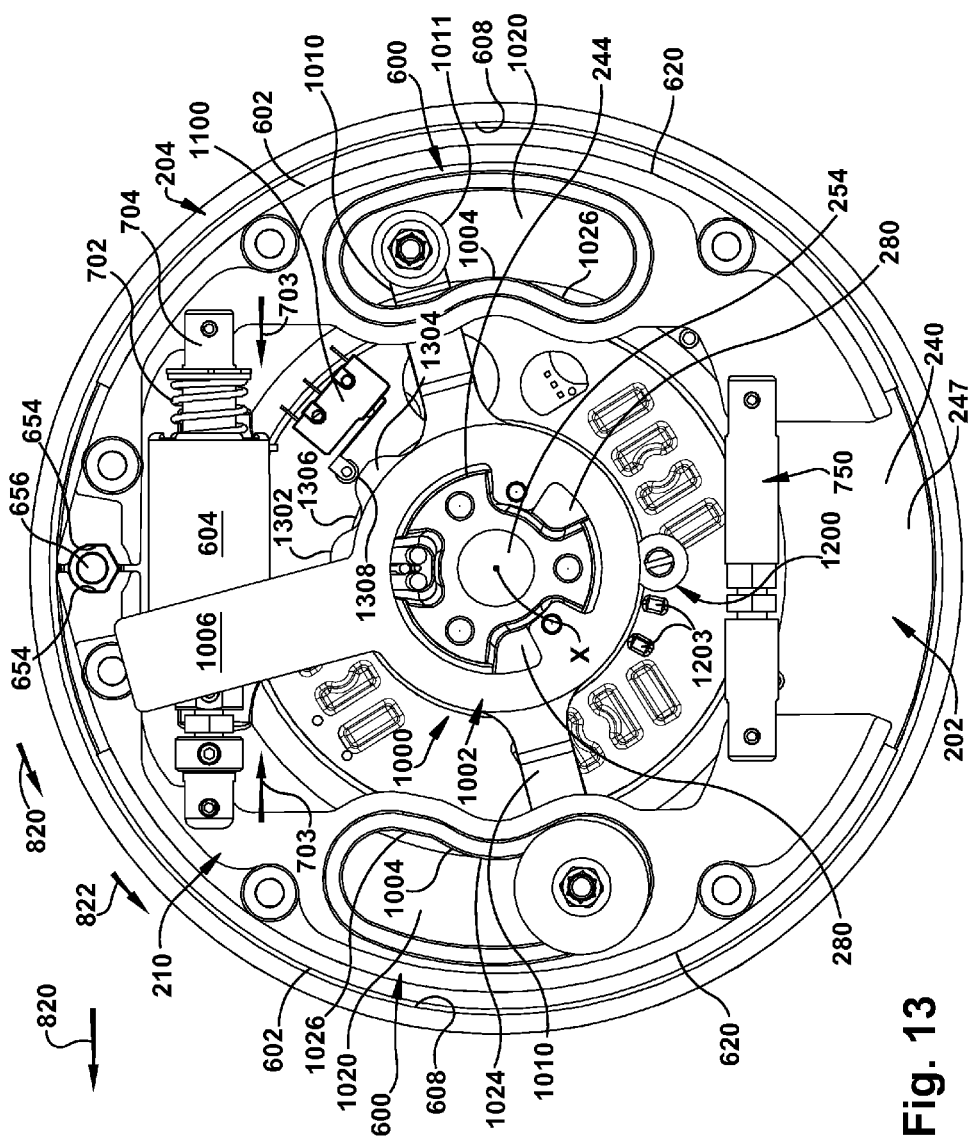
FIG. 13 is an elevational view of an exemplary embodiment of a brake assembly in a position where the brakes are released by an actuator.

The brake shoes 600 can take a wide variety of different forms. Any brake shoe configuration capable of pressing brake pads into contact with the surface 608 can be used. In the illustrated embodiment, the brake shoes 600 are mirror images of one another. As such, only one brake shoe 600 will be described in detail. Referring to FIGS. 9A-9C, each brake shoe 600 has an outer pad mounting surface 620, a plurality of glides 622, and an actuator mounting portion 624 that extends radially inward from the pad mounting surface 620. The outer pad mounting surface 620 is generally the shape of a cylindrical segment and is positioned to be parallel to the cylindrical inner surface 608 of the rotor housing assembly 204 when the brakes are disengaged (FIG. 13). In the illustrated embodiment, the pad mounting surfaces 624 extend along a substantial portion of the cylindrical inner surface of the rotor housing assembly 204. For example, an angle θ between ends 630, 632 of the pad mounting surfaces 624 may be 150° or more (See FIG. 9B).

The actuator mounting portion 624 includes an actuator mounting aperture 650 and a link mounting aperture 652. A pin clamping surface 654 is defined at an end of the actuator mounting portion 624. The pin clamping surface 654 is shaped to engage a pin 656 that is attached to the mounting plate. The pin clamping surface 654 and the pin 656 may take a wide variety of different forms. In one embodiment, the pin clamping surface is round and mates with a round pin that is fixed to the plate. When the brakes are disengaged in this embodiment, the brake shoes could possibly swing about the pin as indicated by arrows 658 (in FIG. 8A the round pin is not shown). For example, this swinging might occur as the vehicle travels up or down a hill or accelerates/decelerates. This swinging from a circular pin could potentially cause some dragging of the brakes.

Figure 10A:
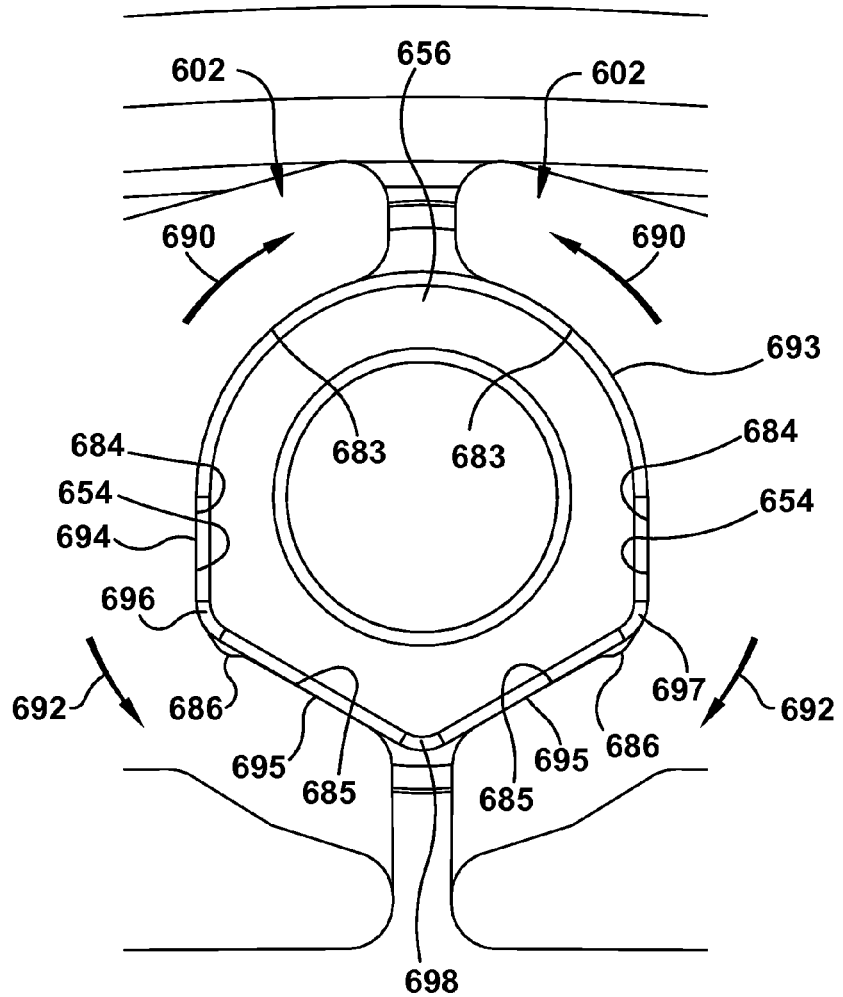
FIG. 10A is an enlarged portion of FIG. 8A, as indicated in FIG. 8A.

Referring to FIG. 10A, in one exemplary embodiment, the pin clamping surface 654 and the pin 656 are shaped to allow each brake shoe 600 that is pressed against the pin to rotate somewhat in the direction indicated by arrow 690 when the brakes are engaged and to prevent rotation of each engaged shoe 600 (one when brakes actuated, two when brakes disengaged) in the direction indicated by arrow 692. This can be accomplished in a variety of different ways. In the illustrated embodiment, the pin 656 includes a rounded surface 693, a pair of flat surfaces 694 that extend from the rounded surface, and a pair of flat surfaces 695, that extend from the flat surfaces 694 at first and second corners 696, 697 and meet at a third corner 698. This configuration may resemble the shape of a hex-nut with one side rounded off. However, other shapes may be adopted. The illustrated clamping surface 654 includes a curved surface 683 that overlies the rounded surface 693, a flat surface 684 that engages flat surface 694, a flat surface 685 that engages flat surface 695, and a relief 686 at the intersection of the flat surfaces 684, 685. The illustrated reliefs 686 are below the corners 696, 697 in the orientation illustrated by FIG. 10A. However, the reliefs 686 can be configured in a wide variety of different ways.

If a moment is applied to either of the brake shoes 600 in the direction indicated by arrows 692 in FIG. 10A while the surface 654 of the shoes are pressed against the pin 656, rotation of the shoe(s) in the direction indicated by arrow 692 is prevented by engagement between flat surfaces 684/694 and the engagement between flat surfaces 685/695. As such, when both clamping surfaces 654 are pressed against the pin 656, the shoes 600 cannot swing or rotate about the pin 656, because the pressing of the surface 654 of one shoe against the pin 656 prevents swinging of the assembly in one direction and the pressing of the surface 654 of the other shoe against the pin prevents swinging of the assembly in the other direction. As such, when both shoes are pressed against the pin, neither shoe can swing about the pin.

Figure 10B:
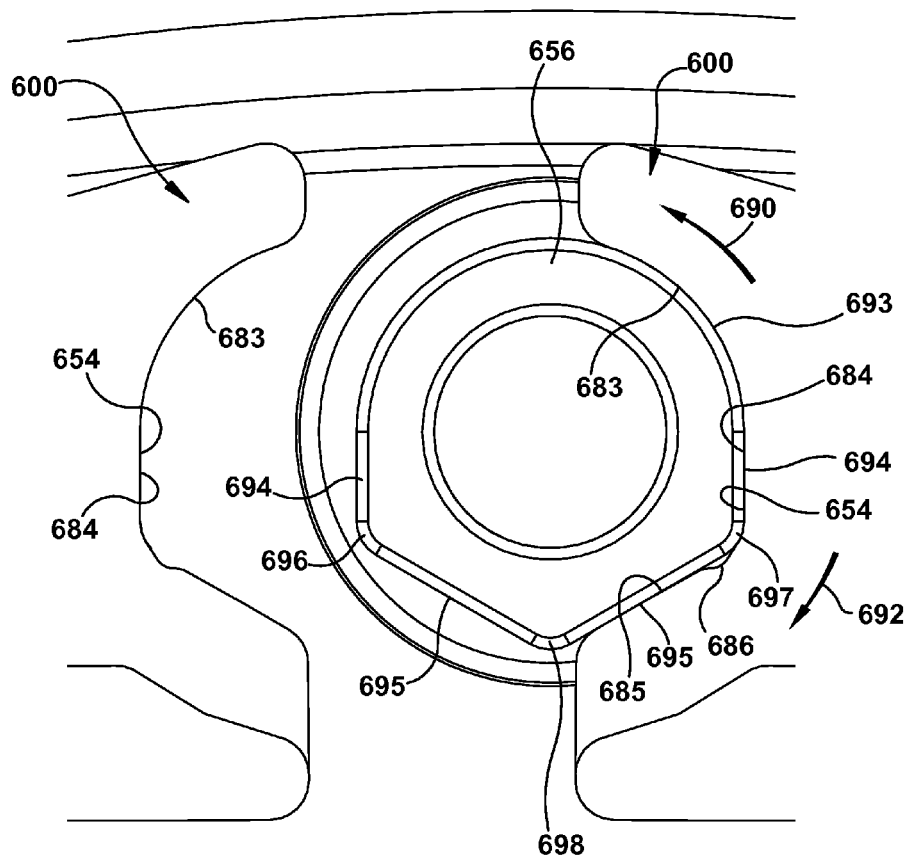
FIG. 10B is a view similar to the view of FIG. 10A showing the brake shoes in a position where the brake pads are engaged with the rotor housing assembly.

Referring to FIG. 10B, when the brakes are engaged (See FIG. 14), the shoe shown on the left in FIG. 10B moves away from the pin 656. This allows the shoe 600 shown on the right to pivot about the pin in the direction indicated by arrow 690. The curved surface 683 slides along the rounded surface 693. The relief 686 allows the pivoting, without binding against the corner 697 of the pin 656. In this manner, the pin 656 and engagement surfaces 654 allow some pivoting of the shoe engaged with the pin during brake actuation, but prevents swinging of the brake shoes 600 about the pin 656 when the brakes are disengaged.

There may be situations where resisting pivoting of the shoes that is engaged with the pin during brake actuation is desirable. In these situations, it may be beneficial to have the pin clamping surface 654 shaped to mate more precisely with a complimentary shaped pin 656. For example, a hexagonally shaped pin and a clamping surface that has three surfaces that engage three sides of the hexagonally shaped pin may be used. However, any shape (square, triangular, star shaped, etc) may be selected for the pin 656. Any arrangement that limits rotation of the shoes with respect to the pin 656 when the brakes are disengaged can be used.

By preventing the brake shoes 602 from rotating with respect to the pin 654 when the brakes are disengaged, the brakes are prevented from dragging when the vehicle travels up or down a hill and/or when the vehicle accelerates or decelerates. That is, the brake shoes 602 are prevented from swinging about the pin 654 such that one of the brake pads contacts the rotor housing assembly 204 when the vehicle travels up or down a hill and/or when the vehicle accelerates or decelerates.

The brake pads 602 may take a wide variety of different forms and the pads can be made from a variety of different types of materials. The brake pads may be made from relatively soft materials, such as rubber, rubber compounds, cork, mixtures of rubber and cork, and/or harder materials, such as metals, graphite, ceramics, etc. The pads 602 may be molded on to the brake shoes or connected to the brake shoes in a conventional manner. Any brake pad configuration that can engage and slow rotation of the rotor housing assembly 204 can be used. In the illustrated embodiment, the brake pads 602 are mirror images of one another. However, in other embodiments, the brake pads 602 may have different sizes and shapes. Each brake pad 602 is mounted to the pad mounting surface 620 of a brake shoe. The brake pad 602 has the shape of a cylindrical segment. In the embodiment illustrated by FIGS. 9A-9C, the brake pads 602 extend along a substantial portion of the cylindrical inner surface of the rotor housing assembly 204. For example, an angle $\beta$ between ends 680, 682 of the pads 602 may be 150° or more (See FIG. 9B).

Figure 8A:
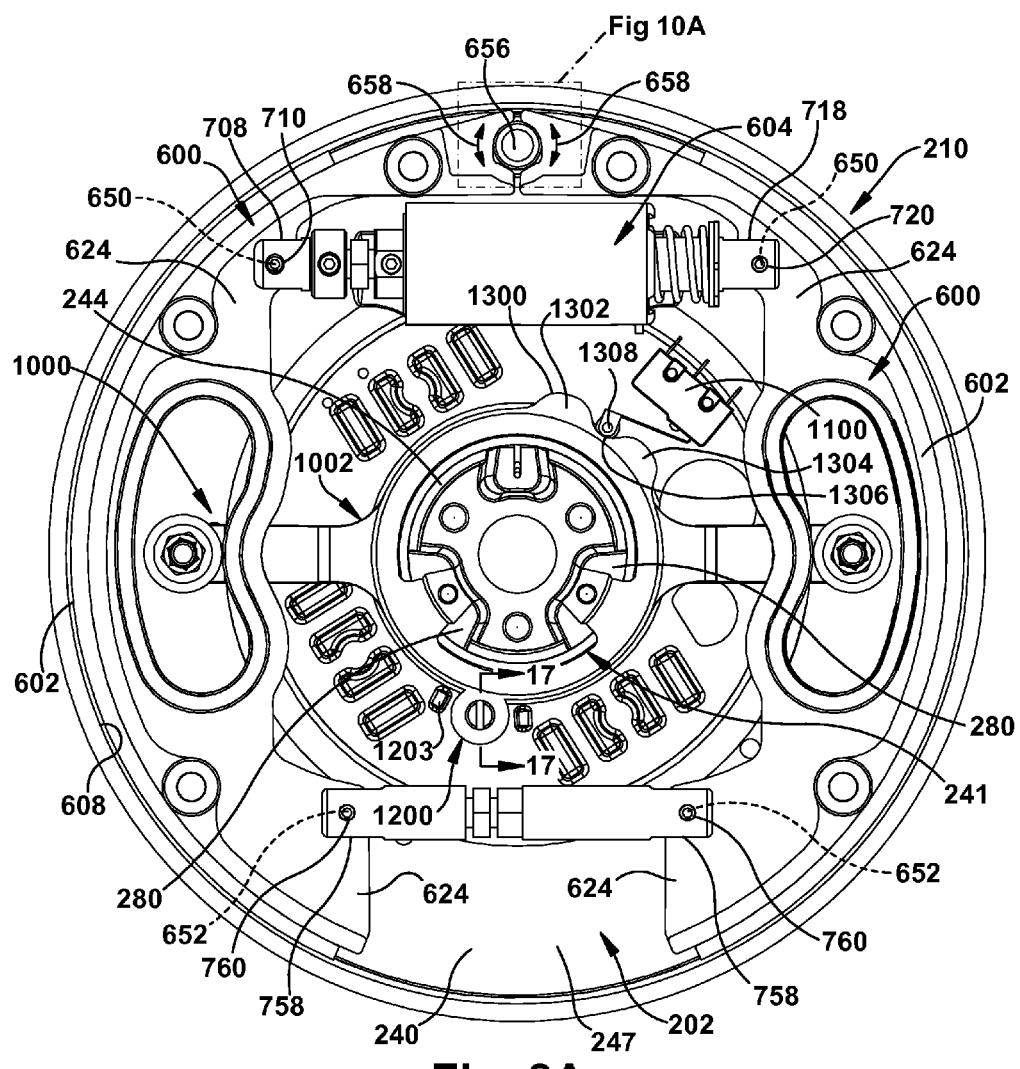
FIG. 8A is an elevational view of an exemplary embodiment of a brake assembly.
Figure 8C:
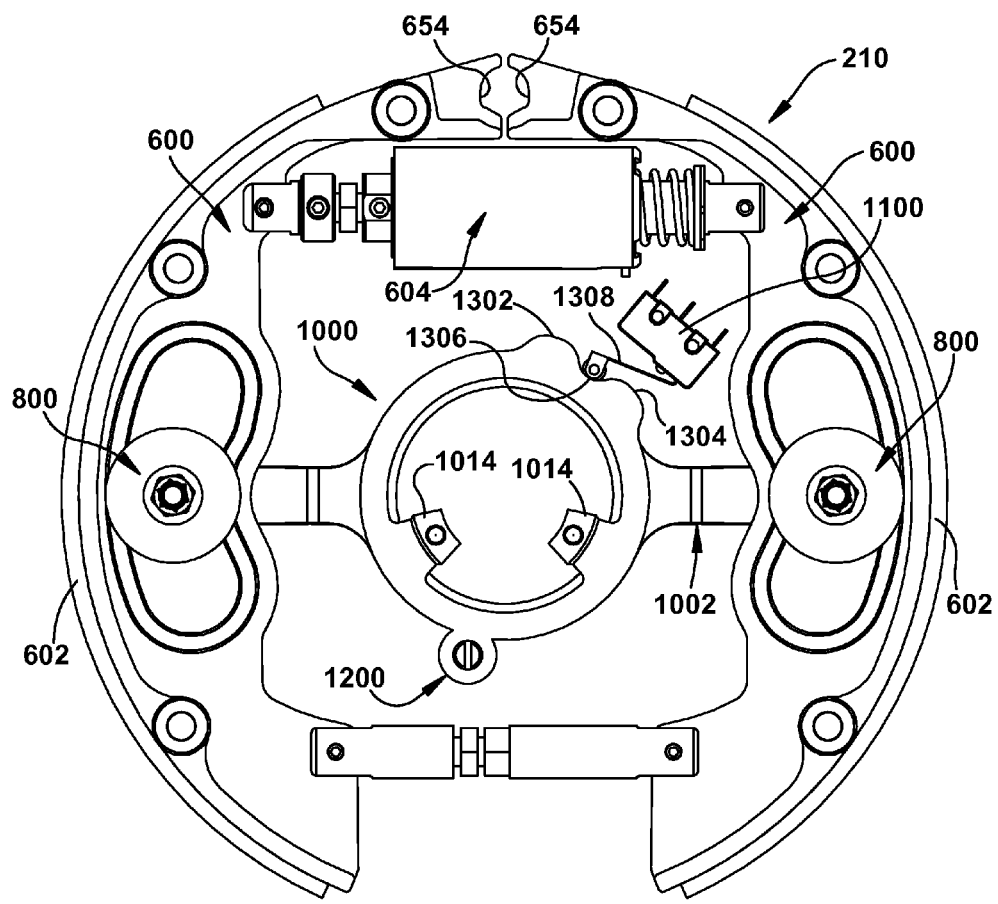
FIG. 8C is an elevational view of an exemplary embodiment of a brake assembly.
Figure 8D:
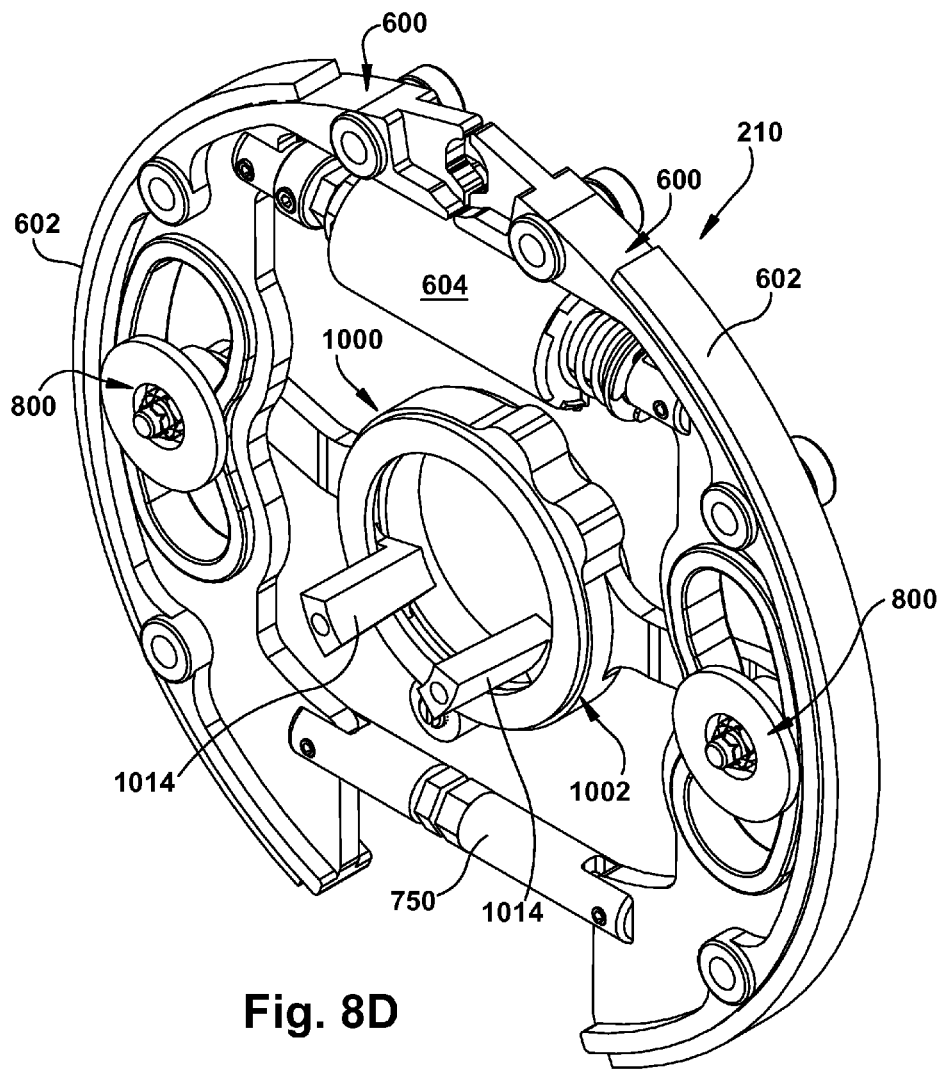
FIG. 8D is a perspective view of an exemplary embodiment of a brake assembly.
Figure 11:
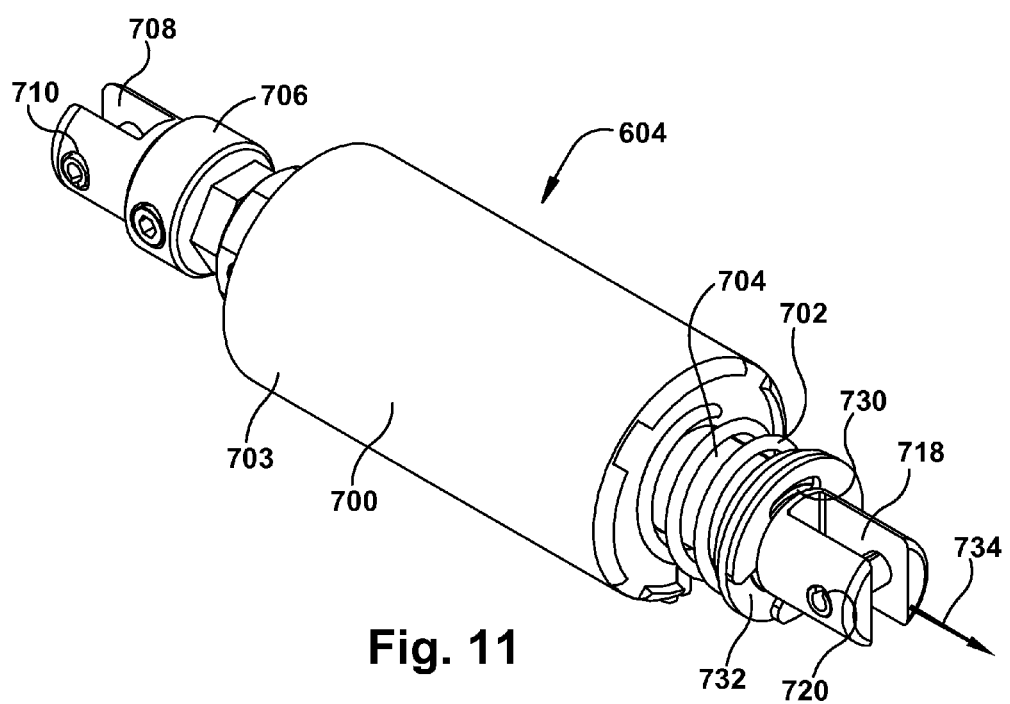
FIG. 11 is a perspective view of an exemplary embodiment of an actuator.

The brake actuator 604 can take a wide variety of different forms. The brake actuator 604 can be electrically powered, pneumatically powered, hydraulically powered, etc. The brake actuator 604 can be a linear actuator, rotary actuator, etc. The brake actuator 604 can be any mechanism capable of moving brake pads into and out of contact with a moving surface. Referring to FIG. 11, the illustrated brake actuator 604 comprises an electrically powered linear actuator 700 and a spring 702. A wide variety of different electrically powered linear actuators can be used. The illustrated electrically powered linear actuator 700 includes a body 703 that accepts a shaft 704. A mounting member 706 is fixed to the body 703 at the end that is opposite the shaft 704. The mounting member 706 is illustrated as being adjustable in length, but may be a member having a fixed length. The mounting member 706 has a slot 708 at its end and has a bore 710 that intersects the slot 708. Referring to FIG. 8A, the slot 708 is placed over the actuator mounting portion 624 and a fastener is placed through the bore 710 of the mounting member 706 and through the actuator mounting aperture 650 to connect one end of the actuator 700 to one of the shoes 600.

The shaft 704 has a slot 718 at its end and has a bore 720 that intersects the slot 718. Referring to FIG. 8A, the slot 718 is placed over the actuator mounting portion 624 and a fastener is placed through the bore 720 of the shaft 704 and through the actuator mounting aperture 650 to connect the other end of the actuator 700 to the other shoe 600.

Figure 14:
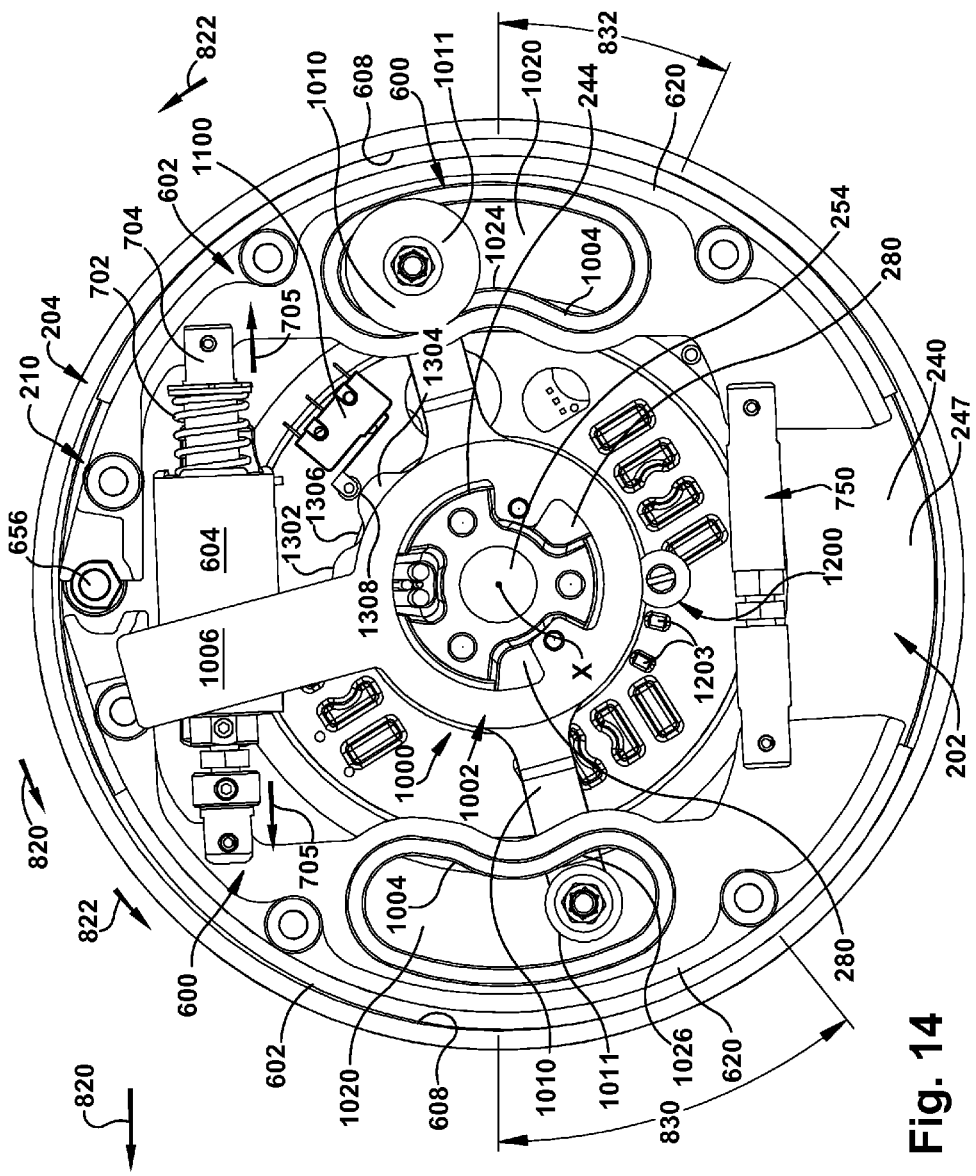
FIG. 14 is an elevational view of an exemplary embodiment of a brake assembly in a position where the brakes are applied by an actuator.
Figure 14B:
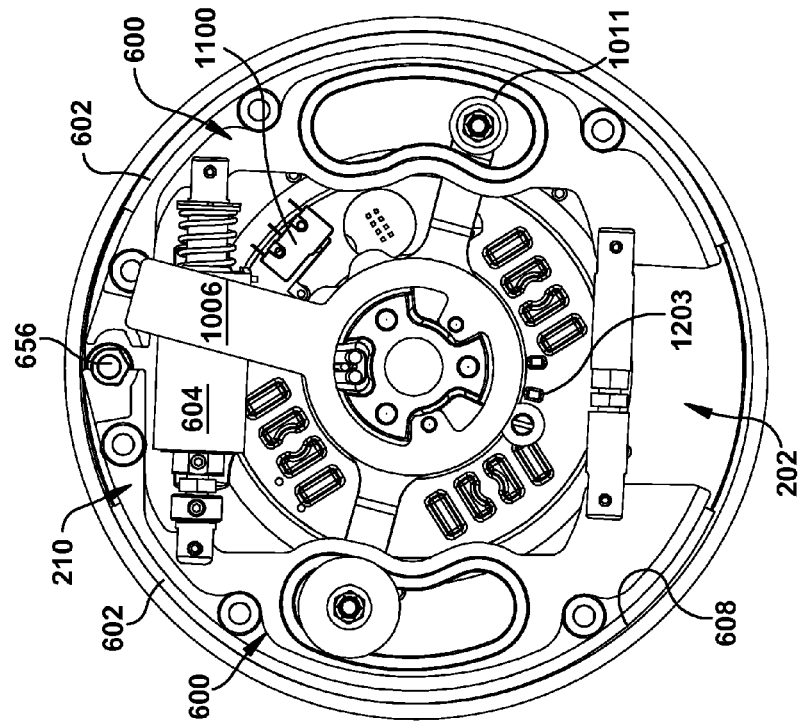
FIGS. 14A and 14B are elevational views of the brake assembly shown in FIG. 14 with a brake release mechanism in a two different positions that allow normal operation of the brakes.
Figure 14A:
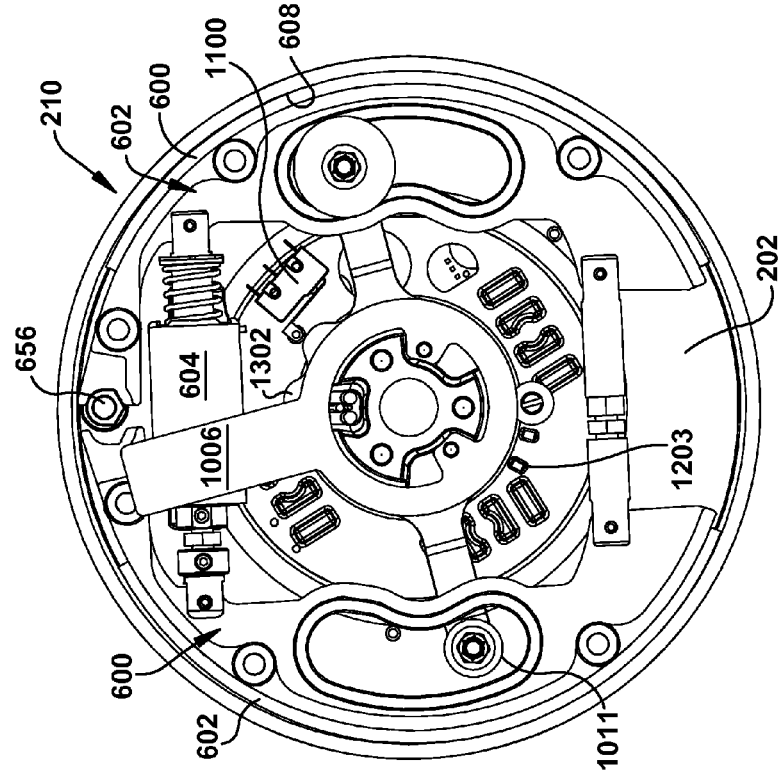

The spring 702 can take a wide variety of different forms. Any spring capable of biasing the brakes to an engaged position or to a released position can be used. In the illustrated embodiment, the spring 702 is a compression spring that is disposed around the shaft 704 and acts against the actuator body 703. The illustrated shaft 704 has an annular groove 730 that accepts a snap ring 732 or another fastening arrangement can be used. The spring 702 is captured between the body 703 and the snap ring 732. As such, the spring 702 biases the shaft 704 as indicated by arrow 734 to a normally extended position. Referring to FIG. 14, the spring 702 biases the brakes into a normally engaged position. Referring to FIG. 13, when the actuator 700 is energized, the shaft 704 is pulled into the body 703 against the biasing force of the spring 702 to move the brakes to a released position.

Figure 12:
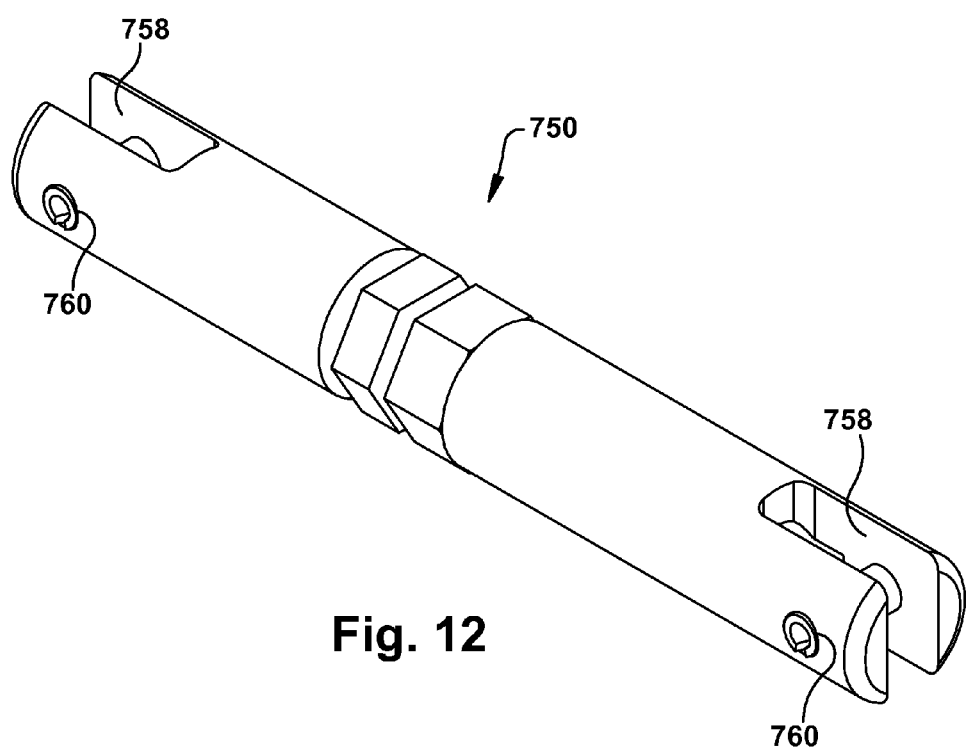
FIG. 12 is a perspective view of an exemplary embodiment of a brake link.

In the illustrated embodiment, the brake assembly 210 also includes a brake link 750 (See FIG. 12). The brake link 750 is illustrated as being adjustable in length, but may be a member having a fixed length. The brake link 750 has slots 758 at its ends and has bore 760 that intersect the slots 758. Referring to FIG. 8A, the slots 758 are placed over the actuator mounting portion 624 and fasteners are placed through the bores 760 and through the brake link mounting aperture 652 to connect the ends of the brake link to the shoes 600.

The brake shoe glides 622 can take a wide variety of different forms. Referring to FIG. 8B, the glides 622 are configured to allow the brake shoes 600 to smoothly move back and forth between the engaged and released positions. In the illustrated embodiment, the glides comprise cylindrical bosses with flat engagement surfaces 770. The glides 622 slide against the brake side 247 of the central wall portion 240 of the mounting plate 202. The glides 622 and/or the central wall portion 240 of the mounting plate 202 can be configured to reduce friction between the glides 622 and the mounting plate 202. This reduction in friction can be accomplished in a wide variety of different ways. For example, the glides 622 can be made from a low-friction material, such as nylon, Teflon, silicone, etc., surfaces or portions of surfaces of the glides 622 and/or the brake side 247 of the central wall portion 240 of the mounting plate 202 can be coated with a low friction material, such as nylon, Teflon, silicone, etc. and/or an anti-friction grease can be applied between the contacting surfaces.

In one exemplary embodiment, the brake assembly 210 includes a retaining mechanism 800 (See FIG. 8B) that prevents the brake shoes 600 from moving too far axially away from the wall portion 240 of the mounting plate 202. For example, the retaining mechanism 800 prevents the brake shoes 600 from moving away from the wall portion 240 into contact with the rotor housing assembly 204. In one embodiment, the retaining mechanism 800 keeps the glides 622 near the wall portion 240 of the mounting plate 202 or in contact with the wall portion 240 of the mounting plate 202. The retaining mechanism 800 can take a wide variety of different forms. For example, the retaining mechanism may comprise one or more springs that bias the brake shoes 600 toward the wall portion 240 of the mounting plate 202, one or more stops that limit the movement of the brake shoes 600 away from the wall portion 240, etc. Any mechanism that prevents the brake shoes 600 from moving axially outward and into contact with the rotor housing assembly 204 or a component that rotates with the rotor housing assembly may be used. In the illustrated embodiment, the retaining mechanism 800 comprises washers that are connected in a spaced apart relationship to the wall portion 240 by a brake release mechanism 1000 (described in detail below). The brake shoes 600 are positioned between the wall portion 240 and the washers to limit the axial movement of the brake shoes 600 away from the wall portion 240. A clearance may be provided between the brake shoes 600 and the washers of the retaining mechanism 800, such that the brake shoes and glides float between the washers and the brake side 247 of the mounting plate 202.

FIGS. 13 and 14 illustrate normal operation of the brake assembly 210. That is, FIGS. 13 and 14 illustrate operation of the brake assembly 210 by the actuator 700. FIG. 13 illustrates the brake assembly 210 in a released or disengaged condition. For example, when a user of the wheelchair 100 presses on the joystick 124, the actuator 700 is energized and the shaft 704 is retracted against the biasing force of the spring 702. The actuator 700 pulls the brake pads together as indicated by arrows 703 in FIG. 13 and the pin clamping surfaces 654 are brought into engagement with the pin 656. When the pin clamping surfaces 654 engage the pin 656, the brake pads 602 are spaced apart from the inner wall (or brake lining) 608 of the rotor housing assembly 204. When the brake assembly 210 is in the disengaged position shown in FIG. 13, the wheelchair begins to move in the direction selected by operating the joystick 124 (FIG. 1). In the example illustrated by FIGS. 13 and 14, arrow 820 represents the direction of movement of the wheelchair 100 and arrow 822 represents the corresponding direction of rotation of the rotor housing assembly 204 around the mounting plate 202 for movement in this direction.

FIG. 14 illustrates the brake assembly 210 in an engaged position. For example, when the user of the wheelchair 100 releases the joystick 124 (FIG. 1), the actuator 700 is de-energized and the shaft 704 is extended by the biasing force of the spring 702. In some embodiments, this de-energizing is delayed. For example, the de-energizing may be delayed when the motor is operated to provide regenerative braking until the wheelchair slows to a predetermined speed or stops. The brake assembly 210 can be used in applications where regenerative braking is performed and applications where there is no regenerative braking.

When the actuator is de-energized, the spring 702 pushes the brake pads apart as indicated by arrows 705 in FIG. 14 and into contact with the rotor housing assembly 204. When the rotor housing assembly 204 is rotating in the direction indicated by arrow 822, the clamping surface 654 of the brake shoe shown on the right in FIG. 14 substantially remains in engagement with the pin 656. The brake shoe 600 shown on the left in FIG. 14 rotates about the connection to the brake link 750 and the pad 602 is brought into contact with the rotor housing assembly 204. As a result of the engagement with the pin 656 by the brake shoe 600 shown on the right and the pivoting of the brake shoe shown on the left, primary braking occurs in the area labeled with the reference number 830 and secondary braking occurs in the area labeled with the reference number 832 (the actual braking areas may be more or less, depending on the brake force applied, the amount of wear of the pad, tolerances, etc). When the wheelchair 100 is stopped, the brake assembly 210 remains engaged until the actuator 700 is energized again or the brakes are disengaged by a manual brake disengagement mechanism 1000 (described in detail below).

One feature of the exemplary brake assembly shown in FIGS. 13 and 14 is that the brake shoes 600 and brake pads 602 are mirror images of one another and the brake pads 602 are sized such that the drive assembly 200 can be used on either side of the wheelchair 100 (or other vehicle), without changing the performance of the brakes. This ambidextrous nature of the brake assembly 210 is achieved by the use of brake pads 602 that are large enough to engage at the primary braking region 830 and the secondary braking region 832, regardless of which side of the vehicle the brakes are positioned on (i.e. regardless of the direction of rotation of the rotor housing assembly 204). As was described above, the brake pads 602 may be sized to have a 150° sweep angle $\beta$ or more. However, a significantly smaller sweep angle $\beta$ may be selected, while still engaging at the primary braking region 830 and the secondary braking region 832, regardless of which side of the vehicle the brakes are positioned on. For example, the sweep angle $\beta$ may be as small as 60° while still retaining the ambidextrous nature of the brakes. Other pad configurations, with smaller sweep angles $\beta$ (such as 45° or less) can be employed, but the brake assembly would be "handed" (i.e. different brake assemblies would be used on the opposite sides of the vehicle).

Another feature that contributes to the ambidextrous nature of the brake assembly is that the action of the brake shoes (i.e. one brake shoe 600 engages the pin 656, while the other brake shoe pivots) automatically reverses, simply by placing the drive assembly on the opposite side of the vehicle. No adjustment to the brake assembly 210 is required to used the drive assembly on either side of the vehicle.

Referring to FIG. 13, as was alluded to above, the drive assembly 200 may include a brake release assembly 1000. The brake release assembly 1000 disclosed herein may be used on a wide variety of different types of vehicles. Also, the brake release assembly 1000 may be used with a wide variety of different types of braking systems and motors and is not limited in application to the braking system and/or motor configurations disclosed in this application. Similarly, the braking mechanisms disclosed by this application may be used with a variety of different types and configurations of motors and do not necessarily require a brake release assembly. Further, the motor configurations disclosed by this application can be used with a wide variety of different types and configurations of brake assemblies or some applications may not require the inclusion of a brake assembly.

When the drive assembly 200 is used on a powered wheelchair 100 (FIG. 1), it may be advantageous to include a brake release assembly 1000. For example, should a person wish to manually push the wheelchair 100 having a brake system as described above, normally engaged brakes need to be released before the person could push the wheelchair. While provisions can be made to release the brakes electrically (i.e. by providing a switch that energizes the actuator 700), a manual brake override is preferred, since it is operable even though power may not be available to the actuator 700.

Figure 15:
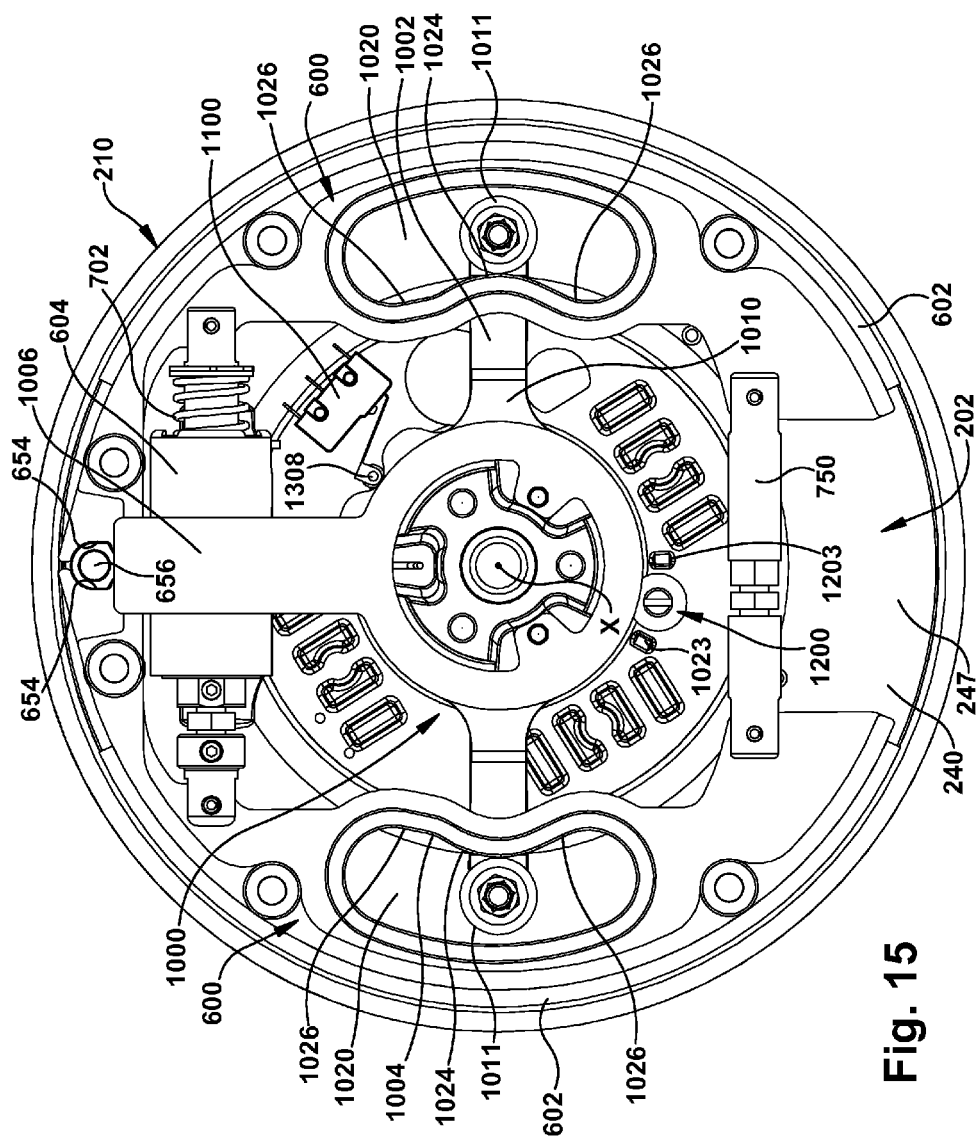
FIG. 15 is an elevational view of an exemplary embodiment of a brake assembly in a position where the brakes are released by a manual brake release mechanism.
Figure 15A:
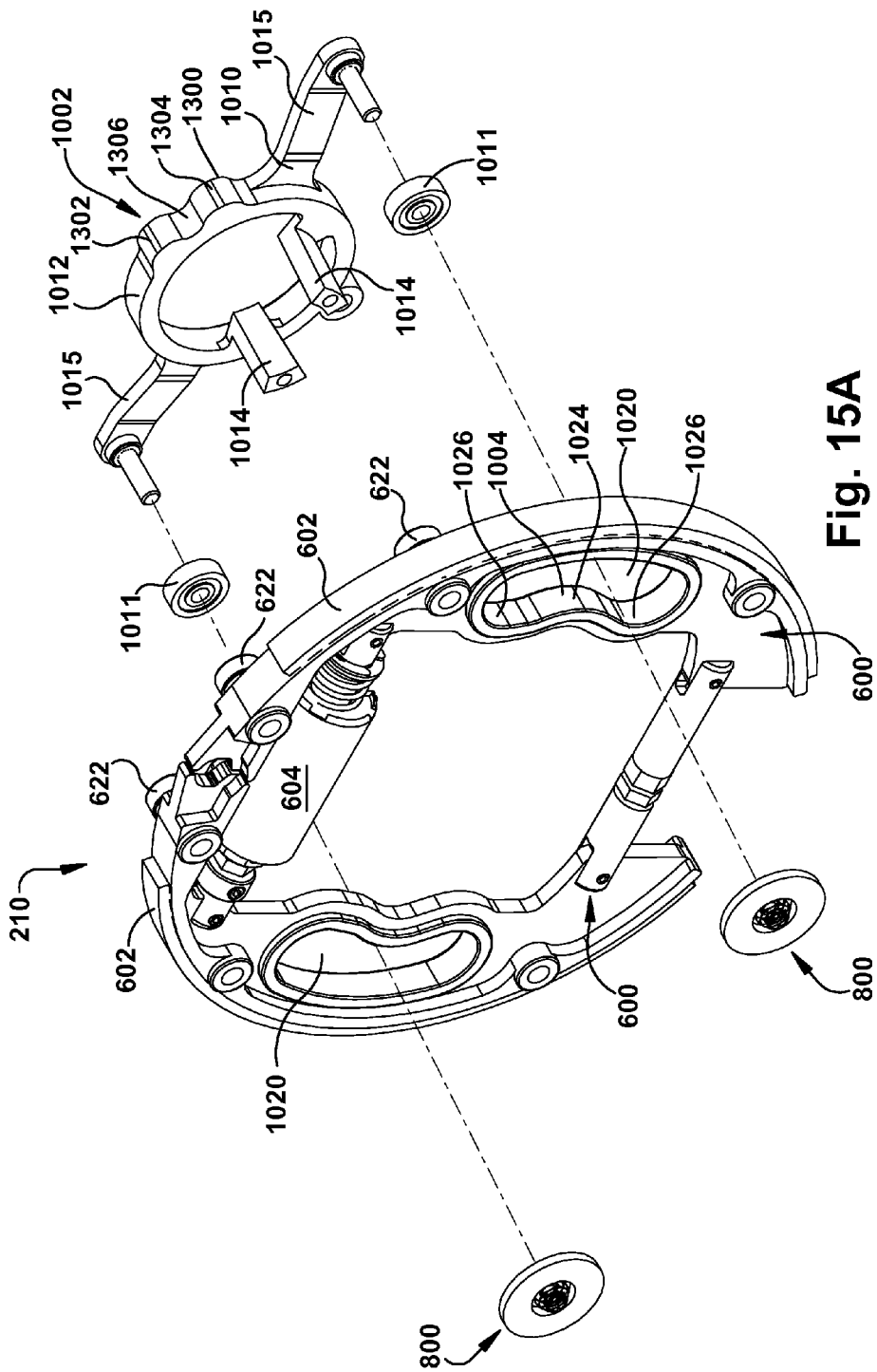
FIG. 15A is an exploded perspective view of the brake assembly shown in FIG. 15.
Figure 15B:
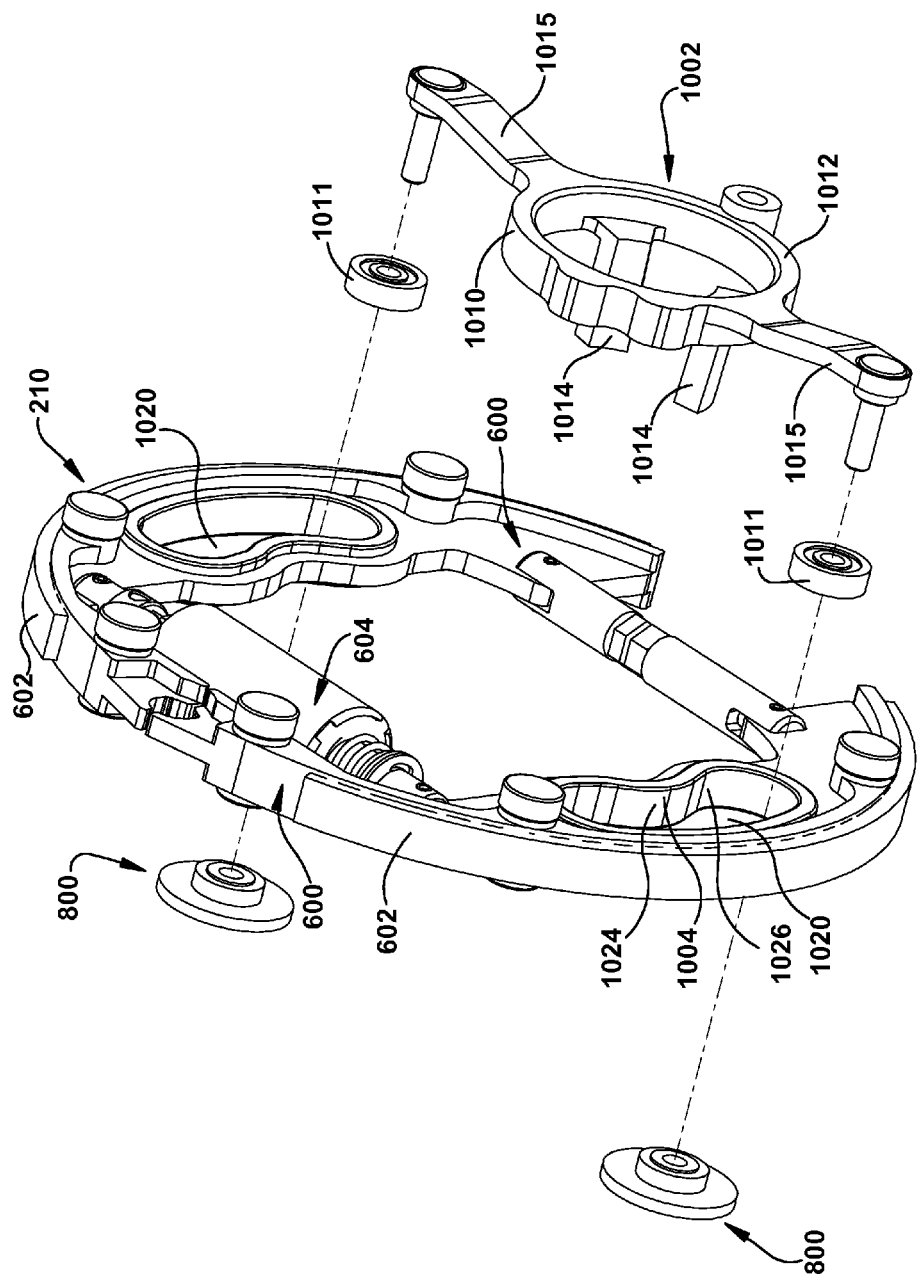
FIG. 15B is an exploded perspective view of the brake assembly shown in FIG. 15.

The manual brake release mechanism 1000 can take a wide variety of different forms. Any configuration that allows the brake assembly 210 to be manually disengaged can be implemented. In the example illustrated by FIGS. 15-15B, the manual brake override includes a cam driver mechanism 1002, brake shoe cam surfaces 1004, and a handle 1006 (FIG. 15). The handle 1006 can be operated such that the cam driver mechanism 1002 engages the brake shoe cam surfaces 1002 to move the brake shoes 600 to a manual brake release position (See FIG. 15).

Figure 16:
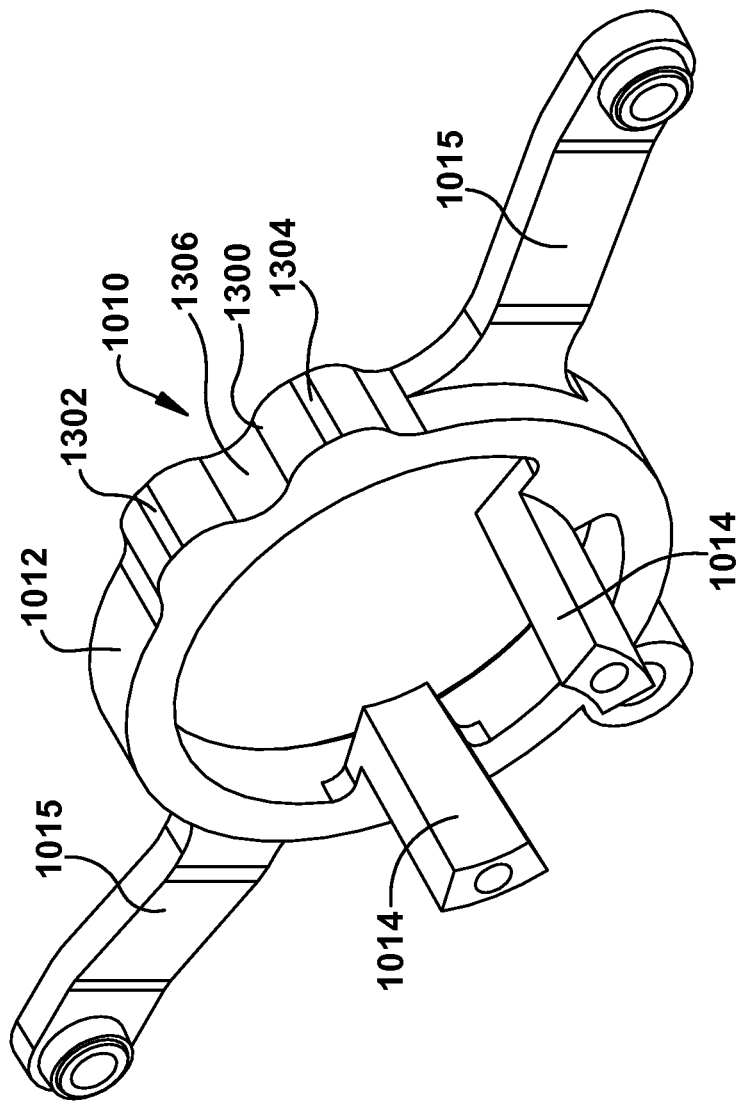
FIG. 16 is a perspective view of an exemplary embodiment of a drive member of a manual brake release mechanism.

The cam driver mechanism 1002 and brake shoe cam surfaces 1004 may take a wide variety of different forms. Any arrangement capable of moving the brake shoes 600 to the released position can be used. In the embodiment illustrated by FIGS. 15-15B, the cam drive mechanism 1002 includes a drive member 1010 and a pair of cam members 1011. Referring to FIG. 16, drive member 1010 may include an annular central hub portion 1012, a pair of legs 1014 extending axially from the annular central hub portion 1012, and a pair of arms 1015 that extend radially outward from the central hub portion. The illustrated cam members 1011 are rollers that are rotatably mounted to the arms 1015. However, the cam members 1011 may be fixed to the arms or integrally formed with the arms.

The brake shoe cam surfaces 1004 can take a wide variety of different forms. The cam surfaces 1004 may be integrally formed with the brake shoes 600 or the cam surfaces 1004 may comprise separate members that are attached to the brake shoes. The cam surfaces 1004 may comprise any structure capable of being engaged by the cam mechanism 1002 to move the brakes to a disengaged position. In the illustrated embodiment, the cam surfaces 1004 comprise slots 1020 formed in the brake shoes. An inner surface of each slot forms the cam surface 1004. The inner surface includes a central portion 1024 and two outer portions 1026. The central portion 1024 is closer to the central axis X of the base member 202 than the outer portions 1026.

Referring to FIG. 8B, the hub portion 1012 of the drive member 1010 is rotatably coupled around the central post 241. An optional bearing may be included to reduce friction between the drive member 1010 and the central post 241 and/or the wall portion 240. Referring to FIG. 8A, the legs 1014 of the drive member 1010 are disposed in the brake passages 280. The clearance between the legs 1014 and the passages 280 define the amount of possible rotation of the drive member 1010 about the central post 241. In the illustrated embodiment, about 15 degrees of travel is allowed, but any amount of travel can be defined. The arms 1015 are positioned between the brake shoes 600 and the wall portion 240 of the mounting plate 202. The cam members 1011 are disposed in the slots 1020.

Referring to FIGS. 2C and 13, the handle 1006 is connected to the legs 1014 of the drive member 1010. The handle 1006 is movable between a disengage position (See FIG. 15) and two "allow engagement" positions (See FIGS. 13A, 13B, 14A, and 14B). In the disengage position (FIG. 15), the cam members 1011 engage the central portions 1024 of the slots 1020. The engagement of the cam members 1011 press against central portions 1024 and pull the brake pads together, such that the pin clamping surfaces 654 are brought into engagement with the pin 656. This action compresses the spring 702. When the pin clamping surfaces 654 engage the pin 656, the brake pads 602 are spaced apart from the inner wall 608 (See FIG. 8A) of the rotor housing assembly 204. When the manual brake release mechanism 1000 is in the disengage position shown in FIGS. 8A and 15 the brakes are released and the wheelchair may easily be pushed by a user.

Figure 13A:
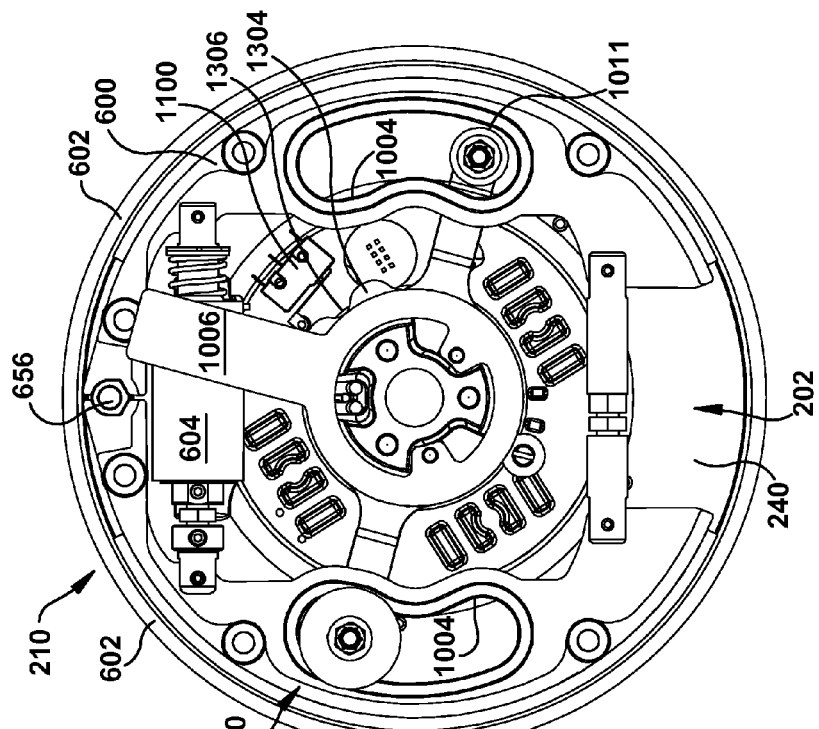
FIGS. 13A and 13B are elevational views of the brake assembly shown in FIG. 13 with a brake release mechanism in two different positions that allow normal operation of the brakes.
Figure 13B:
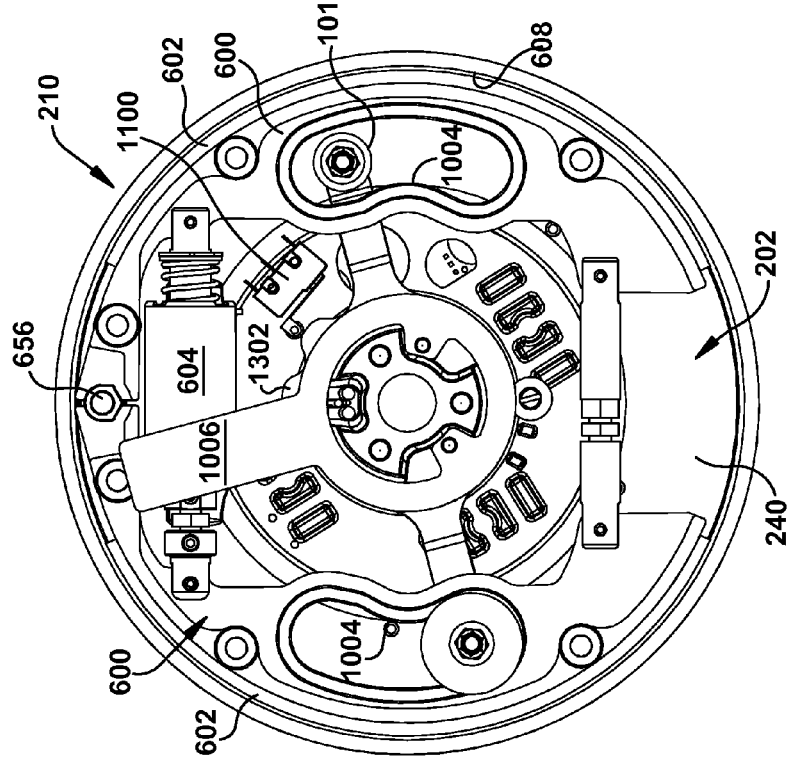

When the handle 1006 is in one of the two "allow engagement" positions (FIGS. 13A, 13B, 14A, 14B), the cam members 1011 are spaced apart from the slots 1020 and the brake assembly 210 is operated by the actuator 700 as described above. For example, if no power is applied to the actuator 700, the brakes are engaged (FIGS. 14A 14B) and if power is applied to the actuator, the brakes are disengaged (FIGS. 13A, 13B). In the illustrated embodiment, in the allow engagement positions, enough clearance is provided between the slots 1020 and cam members 1011 to prevent any engagement between the cam members 1011 and the slots 1020 during operation of the brake assembly by the actuator 700.

Referring to FIG. 8A, in one exemplary embodiment, a sensor 1100, such as a micro-switch (any type of sensor may be used) is positioned to detect whether or not the manual brake release mechanism 1000 is in the disengaged position (or the "allow engagement" position). The output of the sensor 1100 may be used for a variety of different control functions. For example, when the output of the sensor 1100 indicates that the manual brake override is in the disengage position, the drive circuitry 230 may prevent power from being applied to the windings 402 and/or the actuator 700. Referring to FIG. 16, the illustrated central hub portion 1012 of the drive member 1010 includes a cam surface 1300. The illustrated cam surface 1300 includes a pair of spaced part peaks 1302, 1304 and a valley 1306 between the peaks. Referring to FIGS. 8A and 15, an actuator 1308 of the sensor is disposed in the valley 1306, and is therefore extended. This indicates that the brake release mechanism 1000 is in the brake release position. Referring to FIGS. 13A and 13B, when the handle 1006 is in one of the "allow brake engagement" positions, one of the peaks 1302 (depending on which "allow disengagement" position the handle is in) depresses the sensor actuator 1308. This depressed actuator 1308 indicates that the brakes are in one of the "allow disengagement" positions. It should be readily apparent that the illustrated sensor 1100 and cam surface 1300 is but one of the many configurations that may be used.

Figure 17:
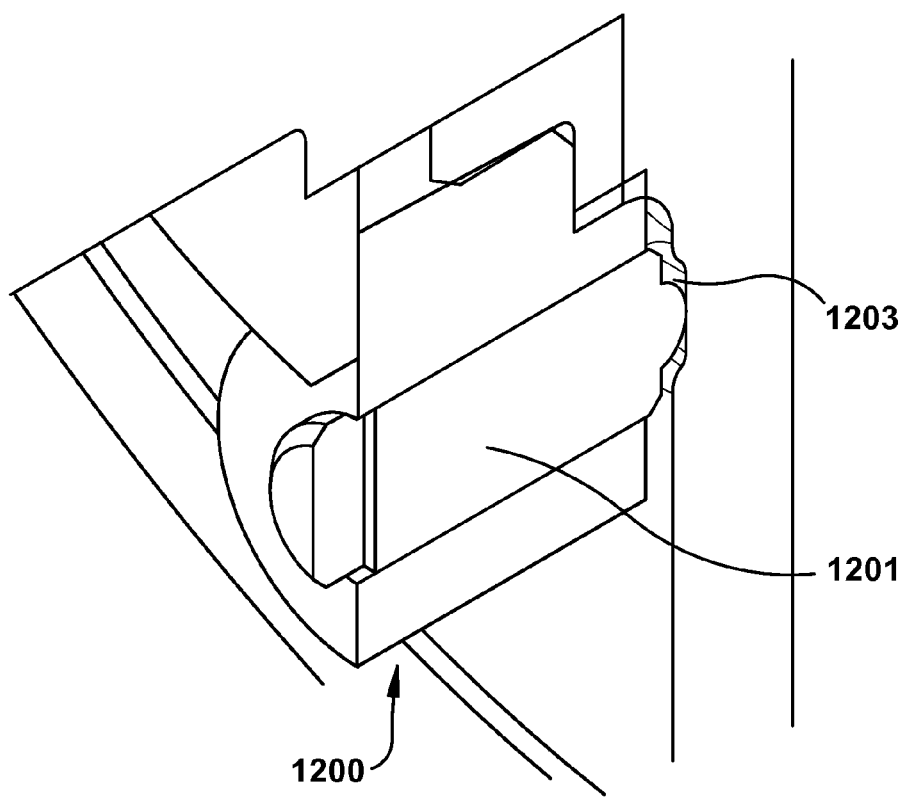
FIG. 17 is an enlarged perspective sectional view taken along lines 17-17 in FIG. 8A.

Referring to FIGS. 8A and 17, in one exemplary embodiment, a detent mechanism 1200 may be included such that the handle 1006 positively stops at the disengagement position and each of the "allow engagement" positions. Any type of detent mechanism 1200 may be used. By way of example, the detent mechanism 1200 illustrated by FIG. 17 comprises a spring loaded pin 1201 that is biased into a recess 1203. Three recesses 1203 are provided in the illustrated embodiment that correspond to the brake release position and the two "allow brake engagement" positions. However, any arrangement and number of recesses may be used.

Referring to FIG. 15, the manual brake release mechanism 1000 is constructed such that the handle 1006 is in a top dead-center position when the brake release mechanism 1000 is in the disengage position. Further, the brake release mechanism 1000 is configured such that the handle 1006 is moved and/or pivoted the same distance and/or angle from the disengage position to each of the "allow engagement" positions (See FIGS. 13A and 13B).

In another embodiment, the manual brake release mechanism 1000 is configured to have one "allow engagement" position and two disengage positions. The manual brake release mechanism 1000 may be constructed to have the handle 1006 in a top dead-center position when the manual brake release mechanism 1000 is in the "allow engagement" position. Further, the manual brake release mechanism 1000 may be configured such that the handle 1006 is moved and/or pivoted the same distance and/or angle from the "allow engagement" position to each of the disengage positions. For example, the handle 1006 may be pivoted in opposite directions from the top dead-center position to reach the disengage positions.

By configuring the handle 1006 to be positioned at top dead-center for the manual disengage position (or "allow engagement" position) and configuring the handle to be moveable in opposite directions to two equally spaced "allow engagement" positions (or manual disengage positions), the same drive assembly 200 can be used on either side of the wheelchair 100 (or other vehicle), while providing the same control positions for the handle 1006 of the manual brake release mechanism 1000. That is, regardless of the side of the wheelchair 100 (or other vehicle) that the drive assembly 200 is mounted on, the control of the manual brake release mechanism 1000 is the same. In the illustrated embodiment, the drive assembly on either side of the wheelchair 100 is placed in the manual brake disengage position by positioning the handle 1006 at the top dead center position and is placed in the "allow engagement" position by moving the handle forward (and/or backward). No adjustments to the drive assembly 200 are required. However, if configuring the manual brake release mechanism 1000 to have only one manual brake disengagement position and only one allow engagement is desired, a simple bracket or other blocking member can be positioned to prevent the handle 1006 (or other component of the mechanism) from moving in one direction. Still, the same drive assembly can be used on both sides of the wheelchair 100 (or other vehicle).

Figure 2F:
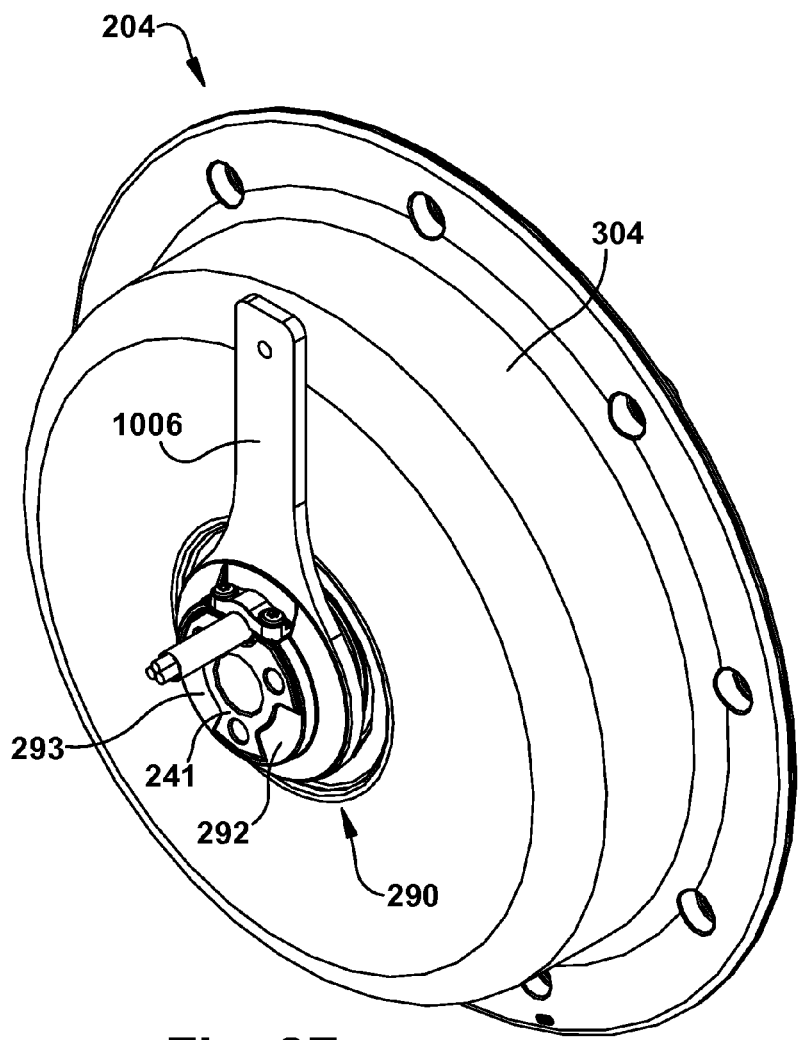
FIG. 2F illustrates a sealing arrangement between a release actuator and a hub.
Figure 2H:
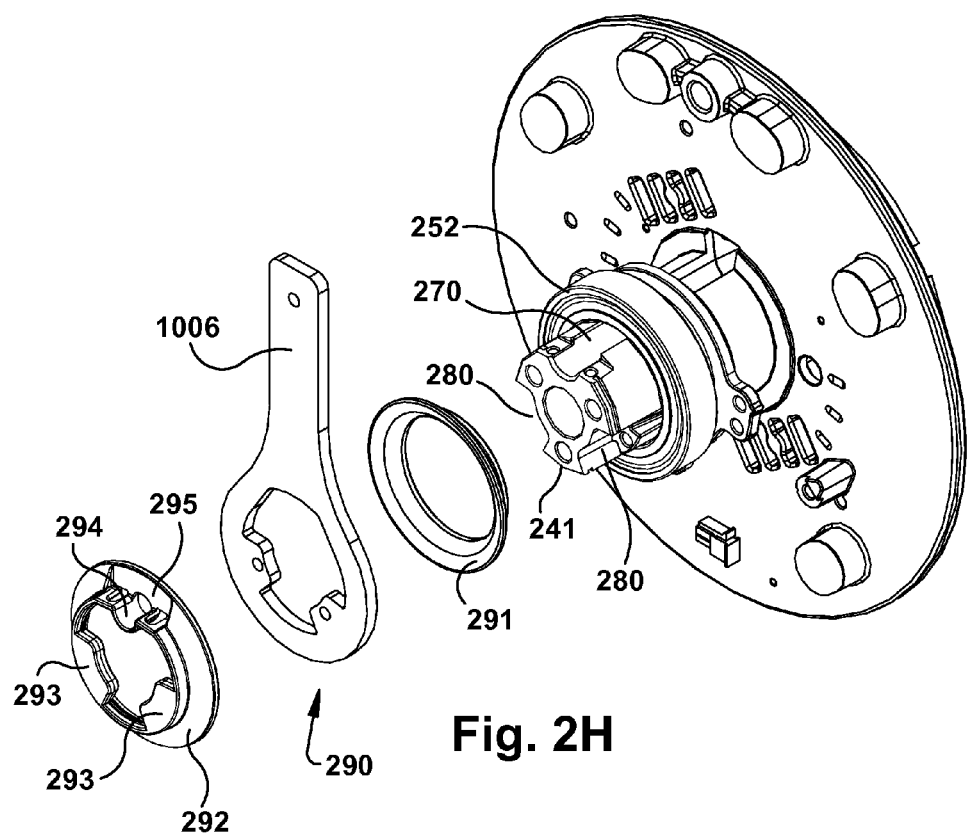
FIG. 2H is a view similar to FIG. 2G with the hub removed.

Referring to FIGS. 2F-2H, in one exemplary embodiment a sealing arrangement 290 is included to reduce the amount of dirt and/or moisture that can enter the rotor housing 204. The sealing arrangement 290 may take a wide variety of different forms. Examples of suitable sealing arrangements include, but are not limited to, gaskets and sealants. Any arrangement that reduces the amount of dirt and/or moisture that can enter the rotor housing 204 can be used. In the example illustrated by FIGS. 2F-2H, the sealing arrangement 290 comprises first and second gaskets 291, 292. The first gasket 291 fits around the central post 241 and seals against the bearing 252 and the handle 1006. The second gasket 292 fits snugly around the central post 241 and seals against the handle 1006. The second gasket includes projections 293 that fit in the brake control passages 280 and a projection 294 that fits in the wireway 270. The projection 294 includes an opening 295 to allow passage of the wires through the gasket 292. The projections 293, 294 inhibit dirt, debris, and water from entering the rotor housing 204.

Figure 18A:
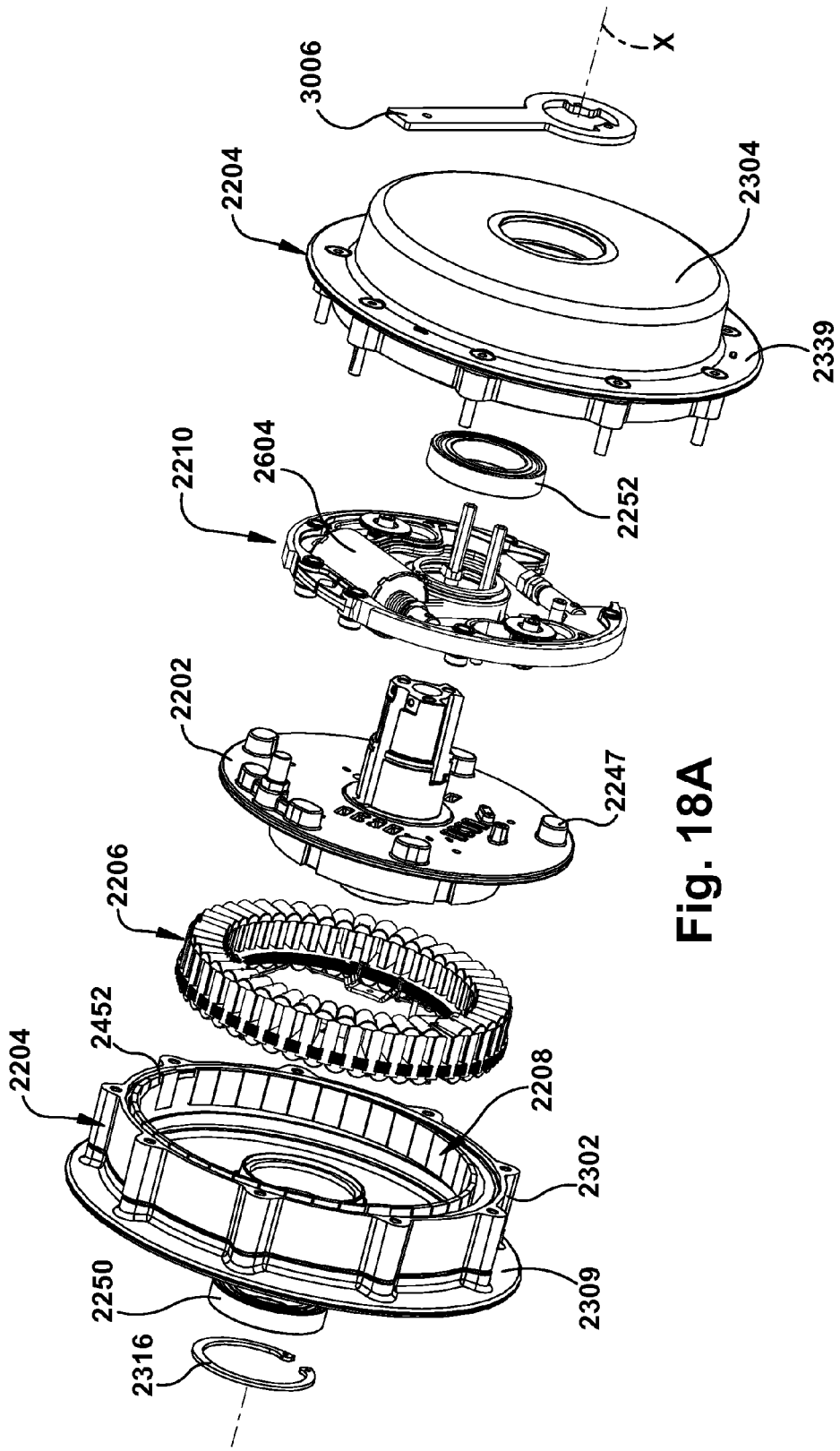
FIG. 18A is a first exploded perspective view of another exemplary embodiment of a hub motor and brake assembly.
Figure 18B:
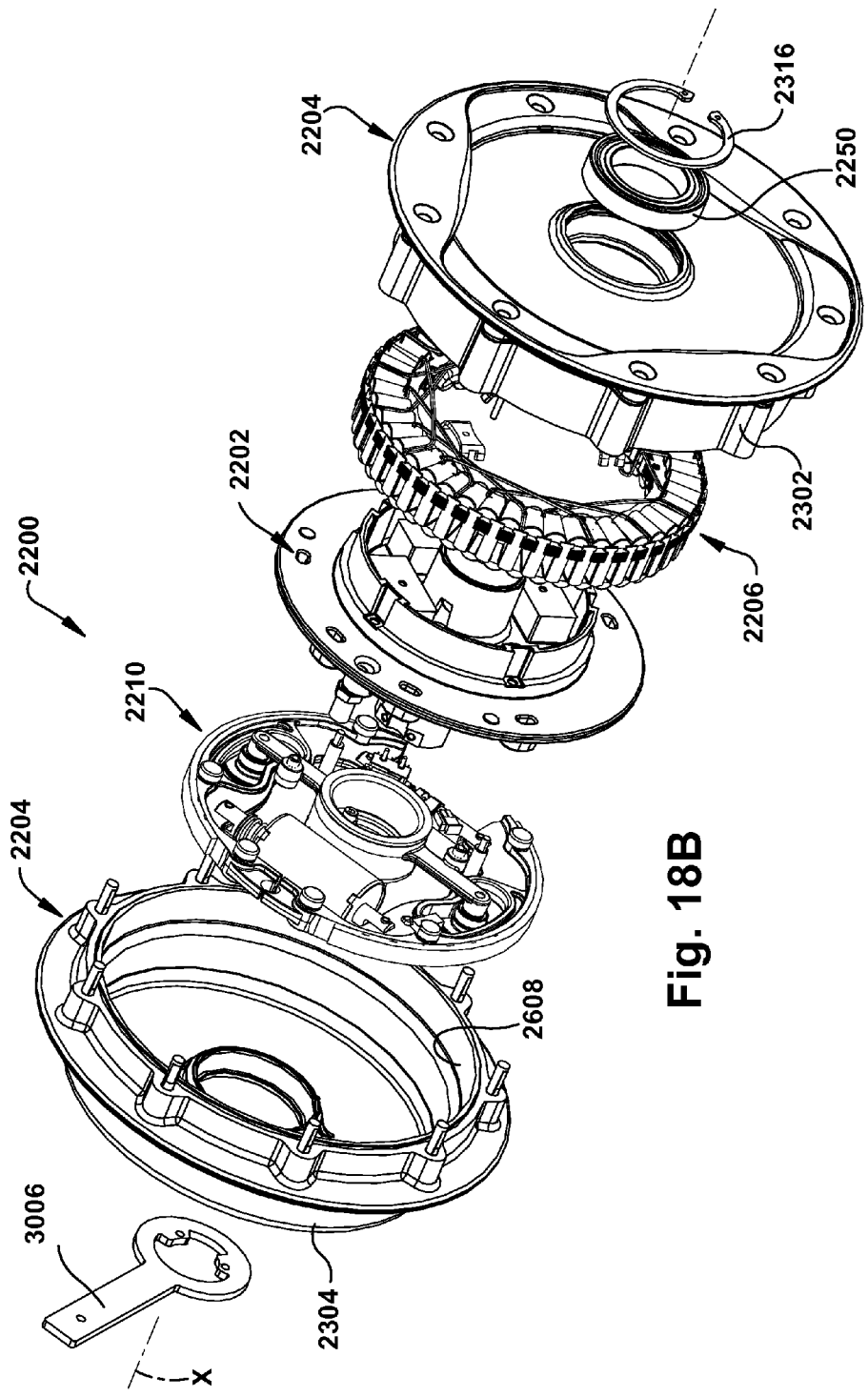
FIG. 18B is a second exploded perspective view of the hub motor and brake assembly shown in FIG. 18A.

FIGS. 18A and 18B illustrate another exemplary embodiment of drive assemblies 2200 that comprise hub motors with internal brakes. The drive assembly 2200 includes a mounting plate 2202, a rotor housing assembly 2204 and magnet ring assembly 2208, a stator armature assembly 2206, and a brake assembly 2210. In one exemplary embodiment, the rotor housing assembly 2204 and magnet ring assembly 2208 are rotatably connected to the mounting plate 2202, with the stator armature assembly 2206 fixed with respect to the mounting plate. As such, when the stator armature assembly 2206 is energized, the rotor magnet ring assembly 2208 and attached rotor housing assembly 2204 is driven to rotate around the stator armature assembly 2206 and mounting plate 2202. As will be explained in more detail below, when disengaged (See FIG. 28), the brake assembly 2210 allows rotation of the rotor housing assembly 2204 around the mounting plate 2202. When engaged (See FIG. 29), the brake assembly 2210 resists rotation of the rotor housing assembly 2204 around the mounting plate 2202.

Figure 19A:
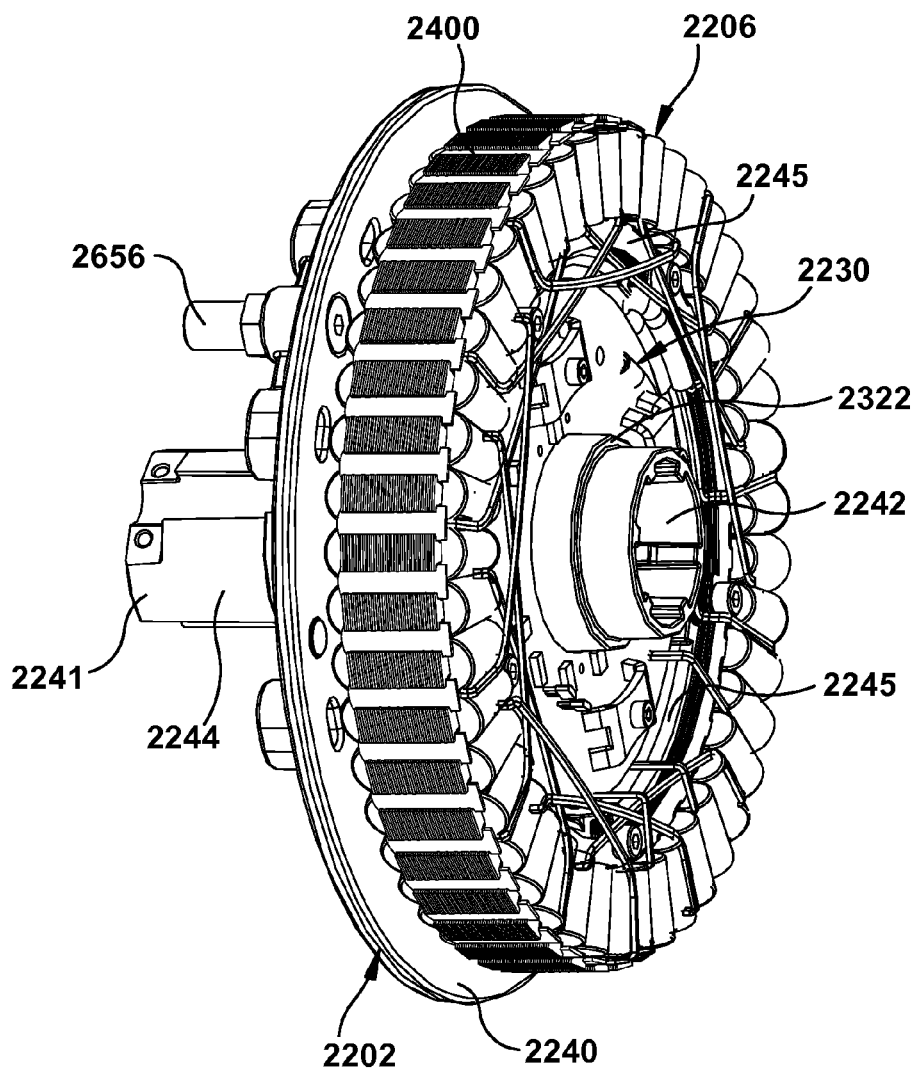
FIG. 19A is a first perspective view of an exemplary embodiment of a mounting plate and stator armature assembly.

The drive assembly 2200 includes drive circuitry 2230 that is optionally mounted inside the rotor housing assembly 2204 (see FIG. 19A). In other embodiments, the drive circuitry may be remote from the drive assembly 2200, or is disposed in a housing of the drive assembly that is outside the rotor housing assembly 2204.

Figure 20A:
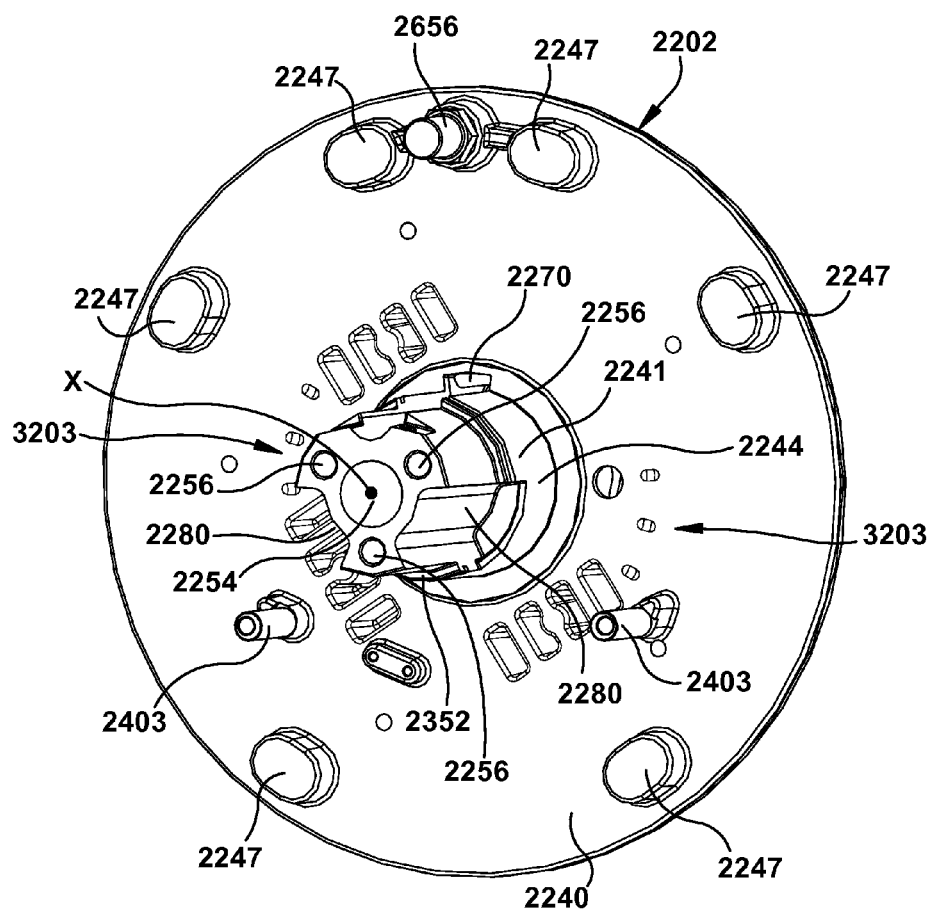
FIG. 20A is a perspective view of an exemplary embodiment of a mounting plate for a hub motor and/or brake assembly.
Figure 20B:
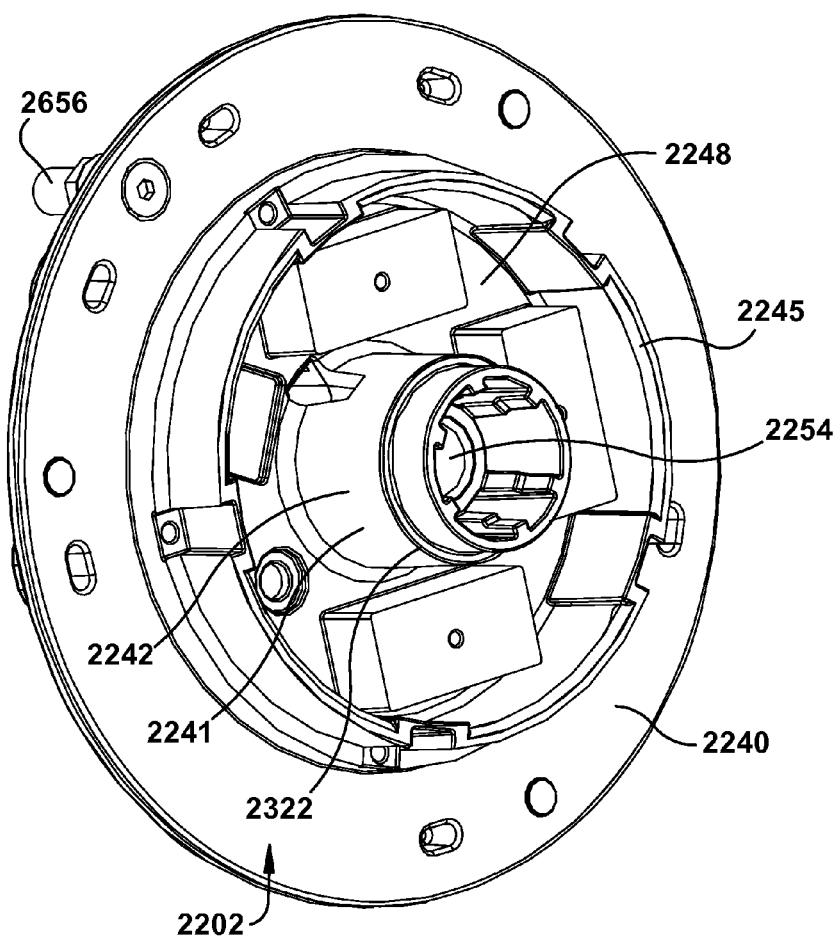
FIG. 20B is a second perspective view of the mounting plate shown in FIG. 20A.

The mounting plate 2202 can take a wide variety of different forms. In FIGS. 20A and 20B, the mounting plate 2202 is illustrated as a single component, but it can be multiple components that are fixed together or otherwise coupled. In the illustrated embodiment, the mounting plate 2202 is configured to support or mount the stator armature assembly 2206 and the brake assembly 2210. Referring to FIGS. 20A and 20B, the illustrated mounting plate 2202 includes a wall portion 2240, a central post 2241 having a stator side portion 2242 and a brake side portion 2244, and a stator support wall 2245.

Figure 19B:
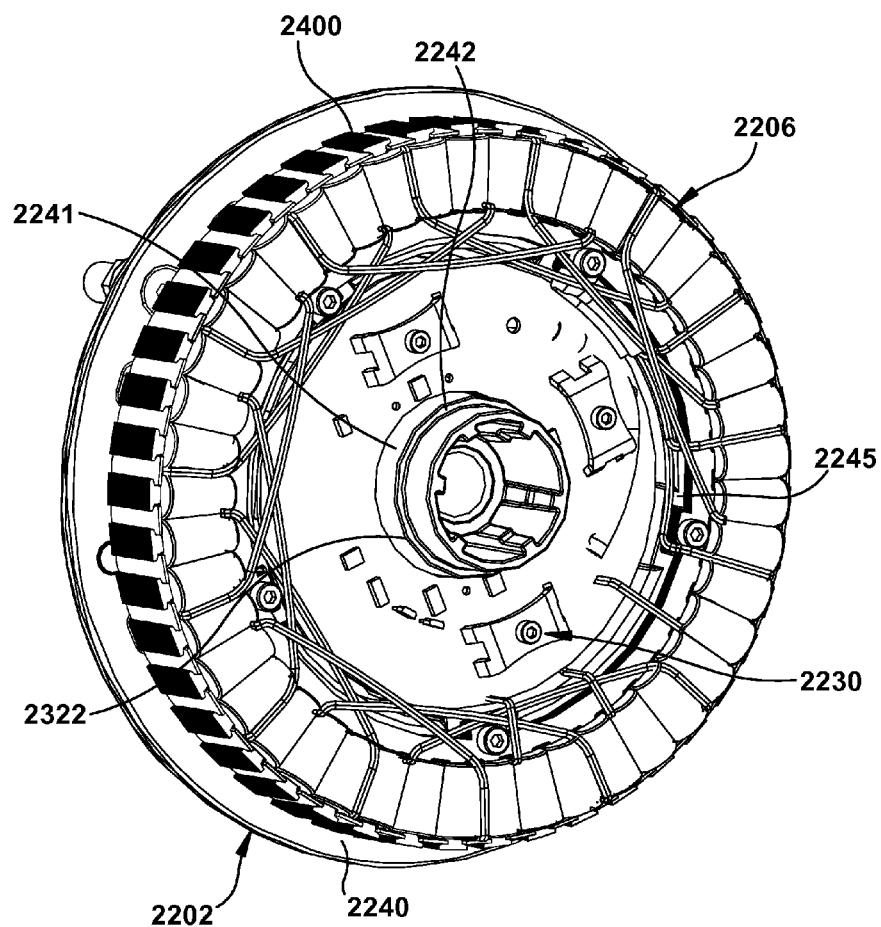
FIG. 19B is a second perspective view of the mounting plate and stator armature assembly shown in FIG. 19A.
Figure 19C:
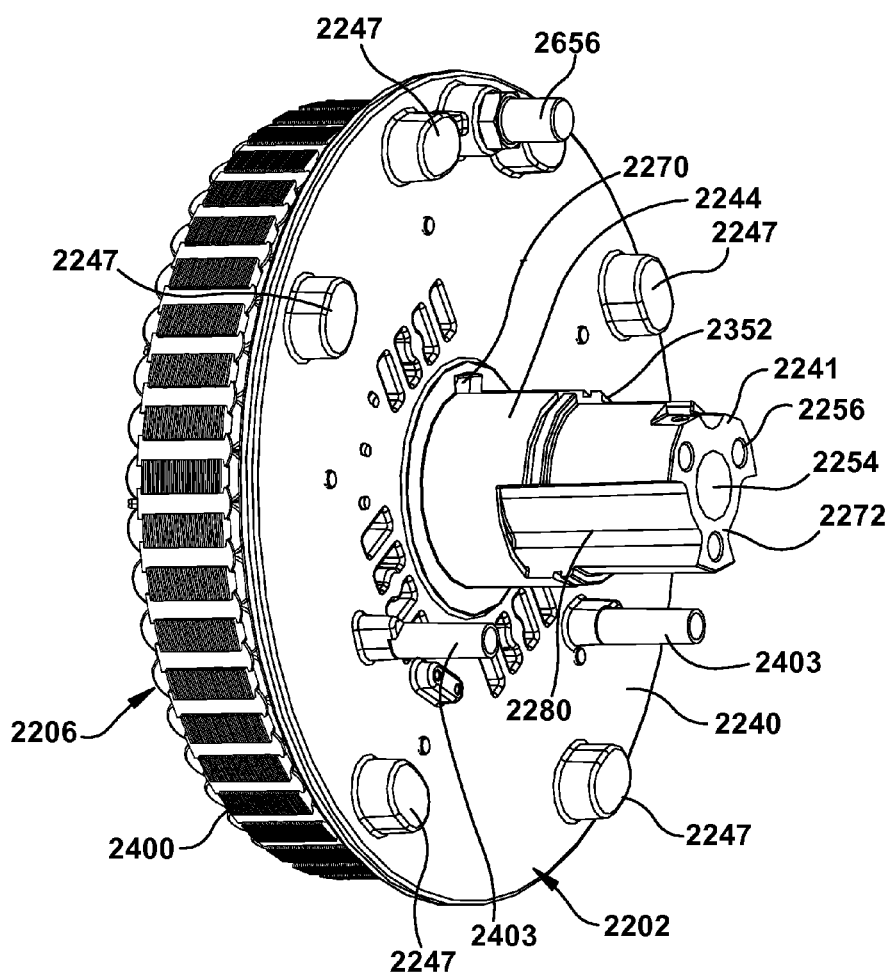
FIG. 19C is a third perspective view of the mounting plate and stator armature assembly shown in FIG. 19A.

Referring to FIGS. 19A-19C, the stator armature assembly 2206 is mounted upon the wall portion 2240 around the stator support wall 2245. Referring to FIG. 20B, the stator side portion 2242 of the central post 2241 and the stator support wall 2245 form an annular space 2248. The drive circuitry 2230 is mounted in the annular space 2248 (FIGS. 19A and 19B). The mounting plate 2202 is optionally made from a thermally conductive material, such as aluminum, and is used as a heat sink for one or more of the components of the drive circuitry.

Referring to FIG. 20A, the brake side of the central wall portion 2240 includes a plurality of glide support protrusions 2247. The glide support protrusions provide support surfaces for brake shoes to slide against as will be described in more detail below. The illustrated support surfaces of the protrusions 2247 are flat and are generally flat and parallel to the central wall portion 2240. The glide support protrusions 2247 can take a wide variety of different forms. In the illustrated embodiment, a plurality of discrete, spaced apart glide support protrusions 2247 are included. In other embodiments, a single protrusion, for example a single ring shaped protrusion may provide a sliding support surface or surfaces for the brake shoes.

Figure 21A:
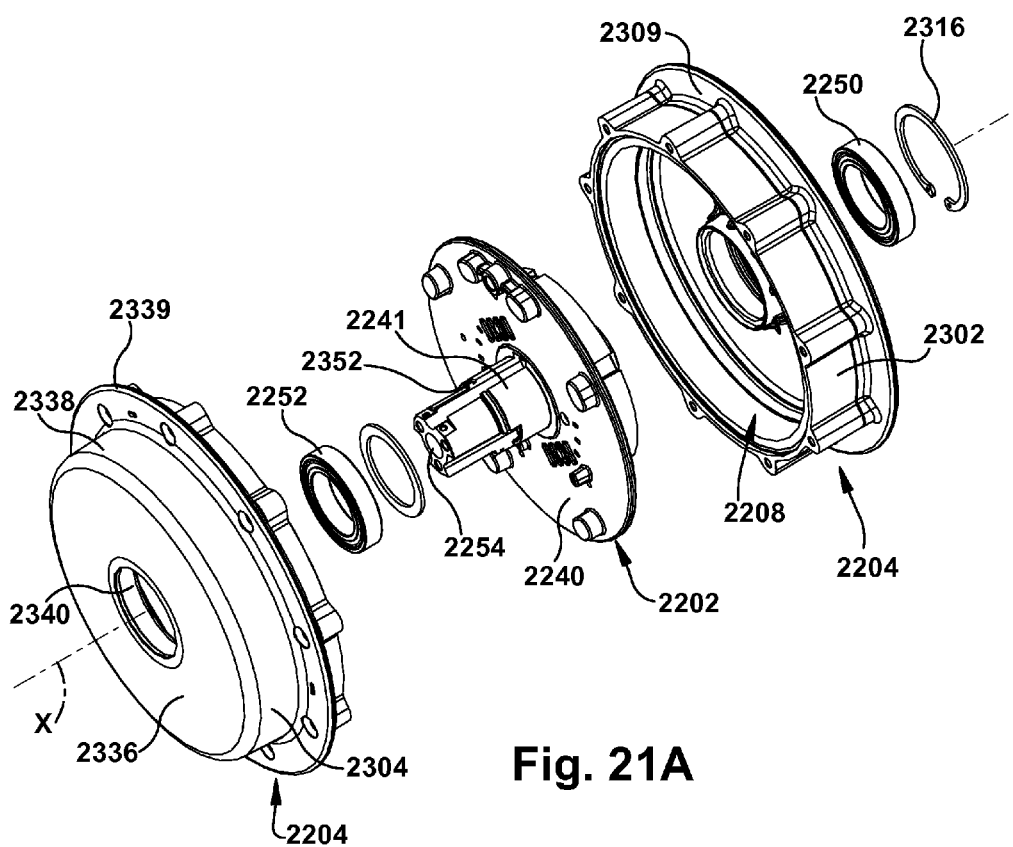
FIG. 21A is an exploded perspective view of an exemplary embodiment of a rotor housing and mounting plate assembly.
Figure 21B:
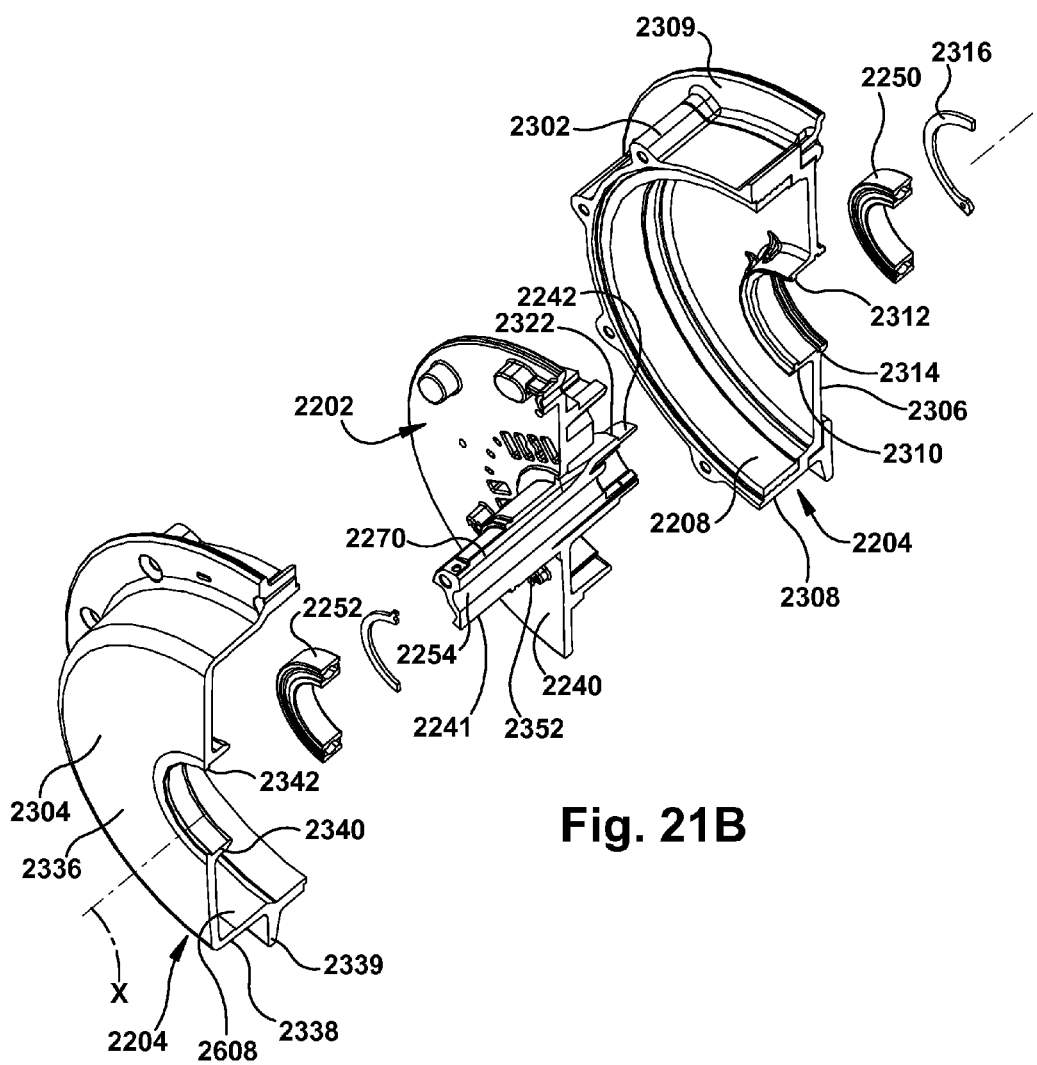
FIG. 21B is a sectioned exploded perspective view of the rotor housing and mounting plate assembly shown in FIG. 21A.

Referring to FIGS. 21A and 21B, the illustrated central post 2241 is generally cylindrical to allow the mounting plate 2202 to be rotatably coupled to the rotor housing assembly 2204 by first and second bearings 2250, 2252. The central post 2241 includes an opening 2254 that accepts a fastener for mounting the drive assembly to a frame in generally the same manner as shown in FIGS. 1 and 1A. In the illustrated embodiment, the opening 2254 is centered in the post 2241, but may be offset from a central axis X of the post in other embodiments.

Referring to FIG. 20A, the illustrated post 2241 also includes or is adapted to include one or more alignment features 2256 that mate with corresponding features included on the frame 150 (FIG. 1) to set the rotational position of the mounting plate 2202 (and attached components) relative to the frame 150. The alignment features 2256 and corresponding alignment features of the frame may take a wide variety of different forms. For example, the alignment features 2256 may be projections and/or recesses that mate with respective recesses and/or projections to set the position of the base member 2202. In the illustrated embodiment, the alignment features 2256 comprise threaded apertures that accept fasteners that include heads that mate with recesses or bores included on the frame 150 (FIG. 1). The alignment features 2256 facilitate quick alignment and connection of each drive assembly 2200 to the frame 150 with a single fastener 255 (FIG. 1).

Referring to FIG. 20A, in one exemplary embodiment, the central post 2241 includes a wire way 2270. The wire way 2270 can take a wide variety of different forms. The illustrated wire way 2270 is a slot that extends from the drive circuitry to an end 2272 of the central post 2241 that is outside the rotor housing assembly 2204 (when assembled). Wires or other types of communication lines that couple the drive circuitry 2230 to a joystick (or other type of user interface) and/or other control circuitry are routed through the wire way 2270. A protective sheath 2271 (FIG. 22A) may be disposed over the wires in the wire way 2270. The wire way 2270 and the protective sheath may be complimentary in shape, such that the protective sheath can simply slide over the wires and snap into the wire way 2270. In an exemplary embodiment, the wire way 2270 and protective sheath 2271 are positioned to be at the top dead-center (or bottom dead-center) when the drive assembly is mounted to the wheelchair (or other vehicle). This positioning places the wires at the same location on each side of the wheelchair 100 (or other vehicle). As such, the same drive assembly can easily be used on either side of the wheelchair 100 (or other vehicle).

Referring to FIG. 20A, in one exemplary embodiment, the central post 2241 includes one or more brake control passages 2280. The illustrated brake control channels 2280 comprise a pair of generally rectangular slots that extend to the end 2272 of the central post 2241. Actuation shafts 3014 of a manual brake disengagement mechanism 3000 (FIG. 22B) extend along the brake control passage 2280.

The rotor housing assembly 2204 can take a wide variety of different forms. For example, any arrangement that can be rotatably mounted around the mounting plate 2202 and that can support a tire 160 (FIGS. 1 and 1A) can be used. In the embodiment illustrated by FIGS. 21A and 21B, the rotor housing assembly 2204 has a clam-shell configuration that includes an outer cover 2302 and an inner cover 2304. Referring to FIG. 21B, the illustrated outer cover 2302 includes a generally disk shaped end face 2306, a radially outer wall 2308, and a radially inner bearing wall 2310. The outer cover 2302 fits over the stator armature assembly 2206 and mounting plate 2202 and is rotatably connected to the stator side portion 2242 of the central post by the bearing 2250 (FIG. 21A). The bearing 2250 may be coupled to the outer cover 2302 and to the stator side portion 2242 of the central post 2241 in a wide variety of different ways. For example, in the illustrated embodiment, the bearing 2250 may be press fit into the radially inner wall 2310 against a bearing support flange 2312 (FIG. 22B) that extends radially inward from the radially inner wall 2310, past an annular groove 2314 that extends radially outward from the radially inner wall 2310. A snap ring 2316 snaps into the annular groove 2314 to secure the bearing 2350 to the outer cover 2302. The bearing 2250 may also be press fit around the stator side portion 2242 of the post 2241 against a bearing support flange 2322 (FIG. 21B) of the post 2241. In the illustrated embodiment, a rim 2309 is connected to the outer cover 2302 by a plurality of fasteners. However, the rim 2309 may be integrally formed with the outer cover 2302.

Referring to FIGS. 21A and 21B, the illustrated inner cover 2304 includes a generally disk shaped end face 2336, a radially outer wall 2338, a rim 2339 extending radially outward from the wall, and a radially inner bearing wall 2340. The rim 2339, like the other components described in this application, may be made from a single piece, or multiple pieces. The inner cover 2304 fits over the brake assembly 2210 and mounting plate 2202 and is rotatably coupled to the brake side of the central post 2241 by the bearing 2252 (FIGS. 21A and 21B). In the illustrated embodiment, the bearing 2252 is press fit into the radially inner wall 2340 against a bearing support flange 2342 (FIG. 21B) that extends radially inward from the radially inner wall 2340. The bearing 2250 may also be press fit around the brake side of the post 2241 against a bearing support flange 2352 of the post 2241. However, any manner of coupling the inner cover 2304 and to the brake side portion 2244 of the central post 2241 may be employed.

In an exemplary embodiment, the outer cover 2302 is secured to the and the inner cover 2304 to complete the rotor housing assembly 2204. In the illustrated embodiment, the outer cover 2302 is securable to the inner cover 2304 by a plurality of fasteners. However, any manner of connection may be used. In the illustrated embodiment, an annular recess is defined between the two rims 2309, 2339 to accept a tire.

The stator armature assembly 2206 may take a wide variety of different forms. Any conventional stator armature assembly may be used. In the embodiment illustrated by FIG. 19A, the stator armature assembly 2206 includes a core 2400 and a plurality of windings 2402. The illustrated core 2400 comprises a plurality of annular plates that are stacked. The plates each include an annular central opening and a plurality of radially outwardly extending legs. The illustrated stator armature assembly 2206 is fixed to the base member 2202 around the stator support wall 2245.

Figure 21C:
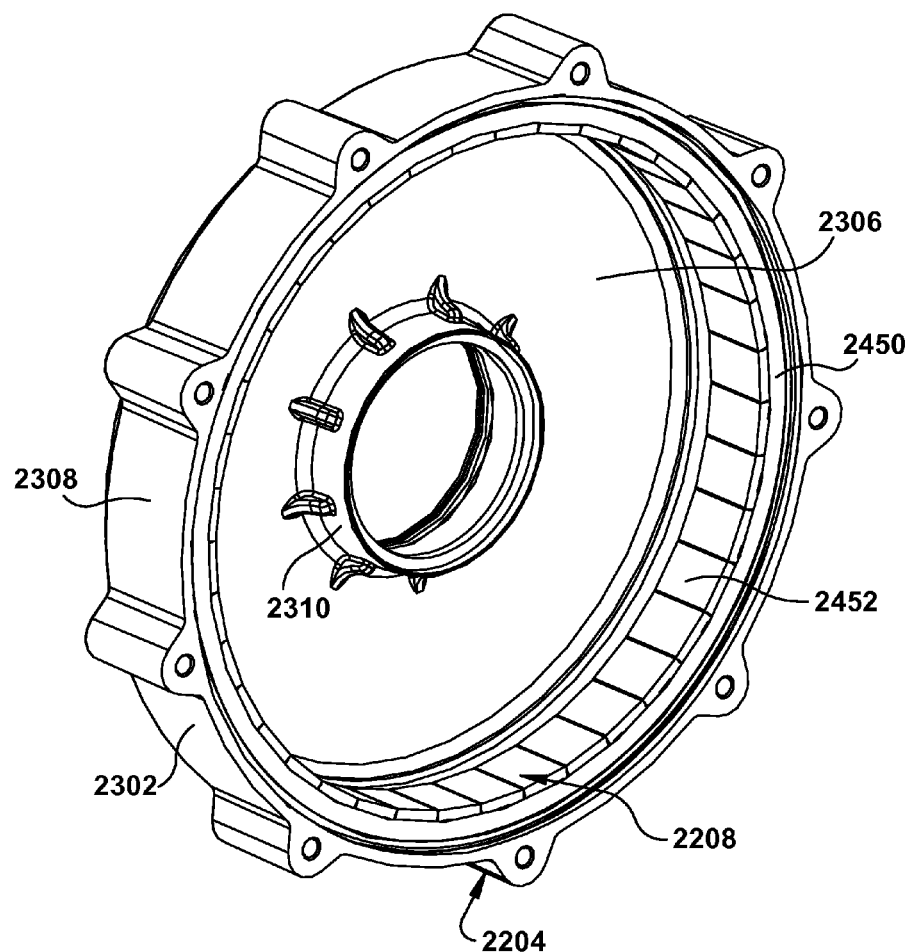
FIG. 21C is a perspective view of a rotor housing and magnet ring assembly.

The rotor magnet ring assembly 2208 may take a wide variety of different forms. Any conventional rotor configuration may be employed. In the embodiment illustrated by FIG. 21C, the rotor magnet ring assembly 2208 includes an annular support ring 2450 and a plurality of permanent magnets 2452 attached to an inner wall of the support ring. The illustrated rotor magnet ring assembly 2208 is fixed to the rotor housing assembly 2204 around the stator armature assembly 2206. The fixing of the rotor magnet ring assembly 2208 to the rotor housing assembly 2204 may be accomplished in a wide variety of different ways. For example, the outer cover 2302 may be molded or cast over the annular support ring 2450. Alternatively, the outer cover may be molded or cast around the magnets 2452 and the support ring 2450 may optionally be omitted. Further, adhesive, fasteners, etc may be used to connect the support ring 2450 and/or the magnets to the housing assembly 2204.

Figure 22A:
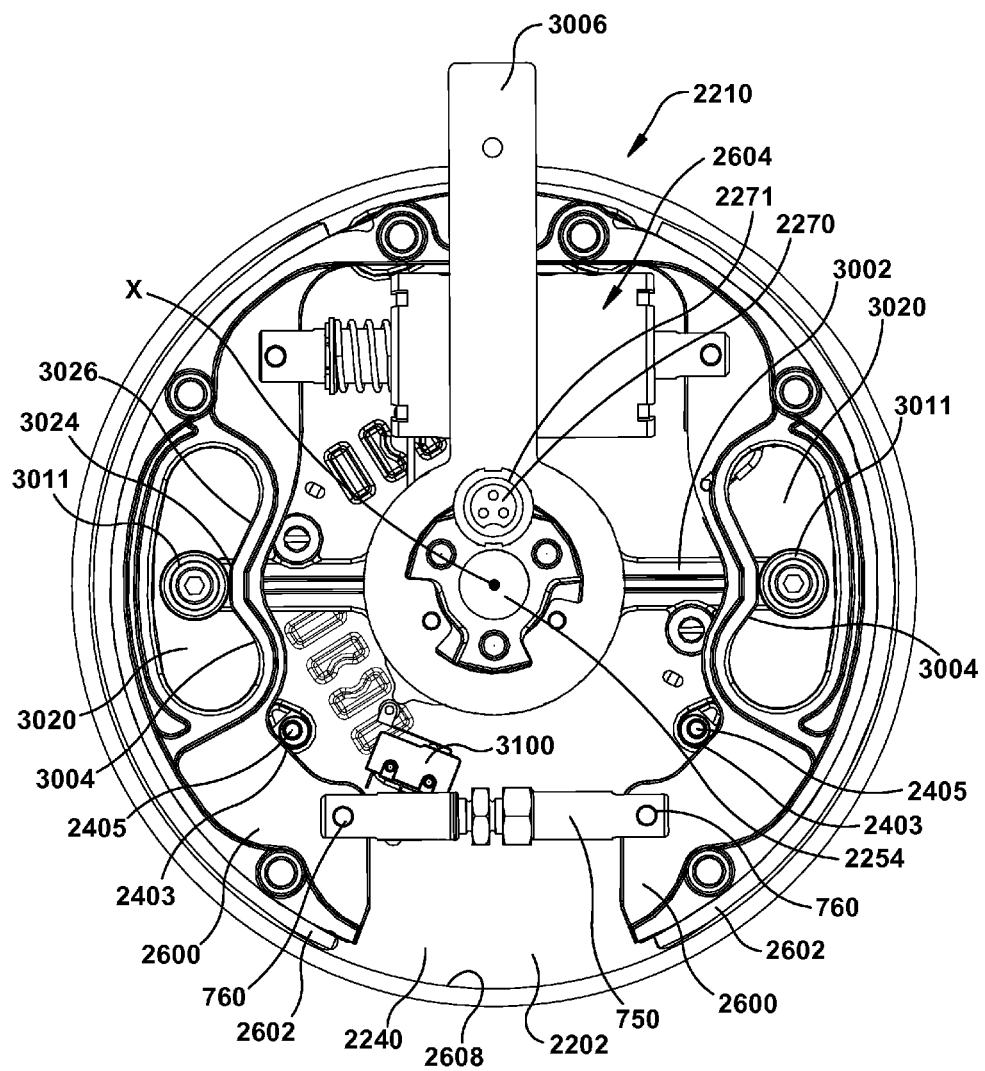
FIG. 22A is an elevational view of an exemplary embodiment of a brake assembly.
Figure 22B:
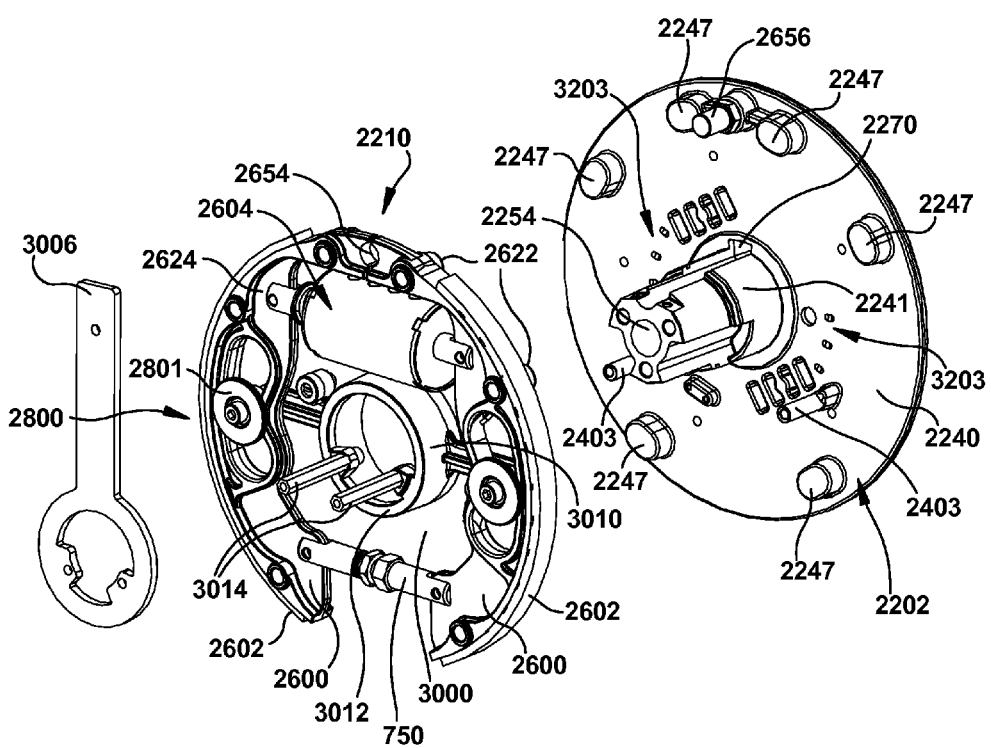
FIG. 22B is an exploded perspective view of a brake shoe, actuator, and release assembly and a mounting plate.

In the embodiment illustrated by FIGS. 21A and 22B, the brake assembly 2210 has a drum brake configuration and is positioned on a brake side of the central portion 2240 of the base member 2202. The brake assembly 2210 includes a pair of brake shoes 2600, a pair of brake pads 2602, and a brake actuator 2604. The brake actuator 2604 selectively moves the brake shoes 2600 and associated pads into (FIG. 29) and out of (FIG. 28) engagement with an inner surface 2608 of the rotor housing assembly 2204 (or alternatively with a lining secured to the inner surface of the rotor housing assembly).

Figure 23A:
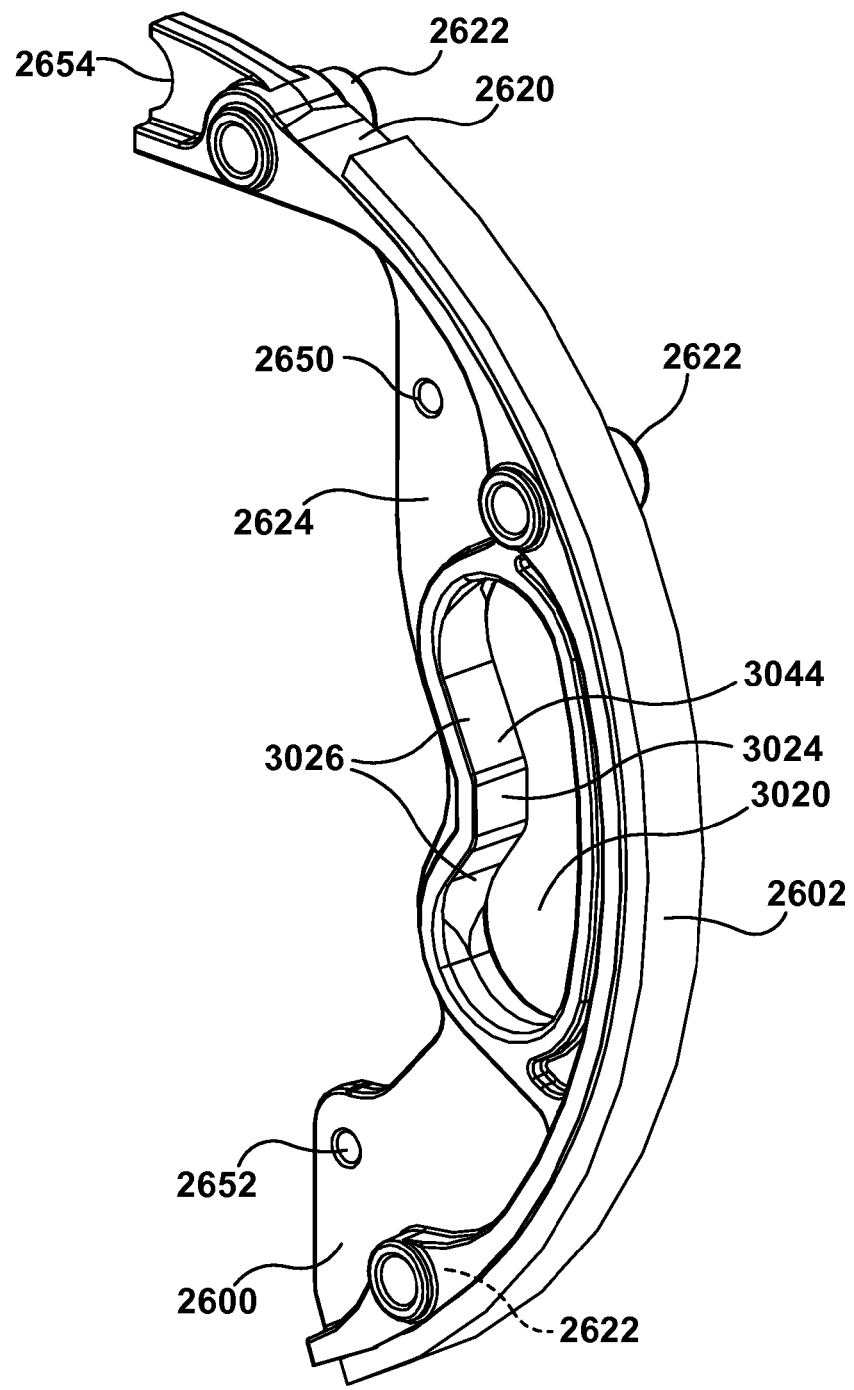
FIG. 23A is a perspective view of an exemplary embodiment of a brake shoe assembly.
Figure 28:
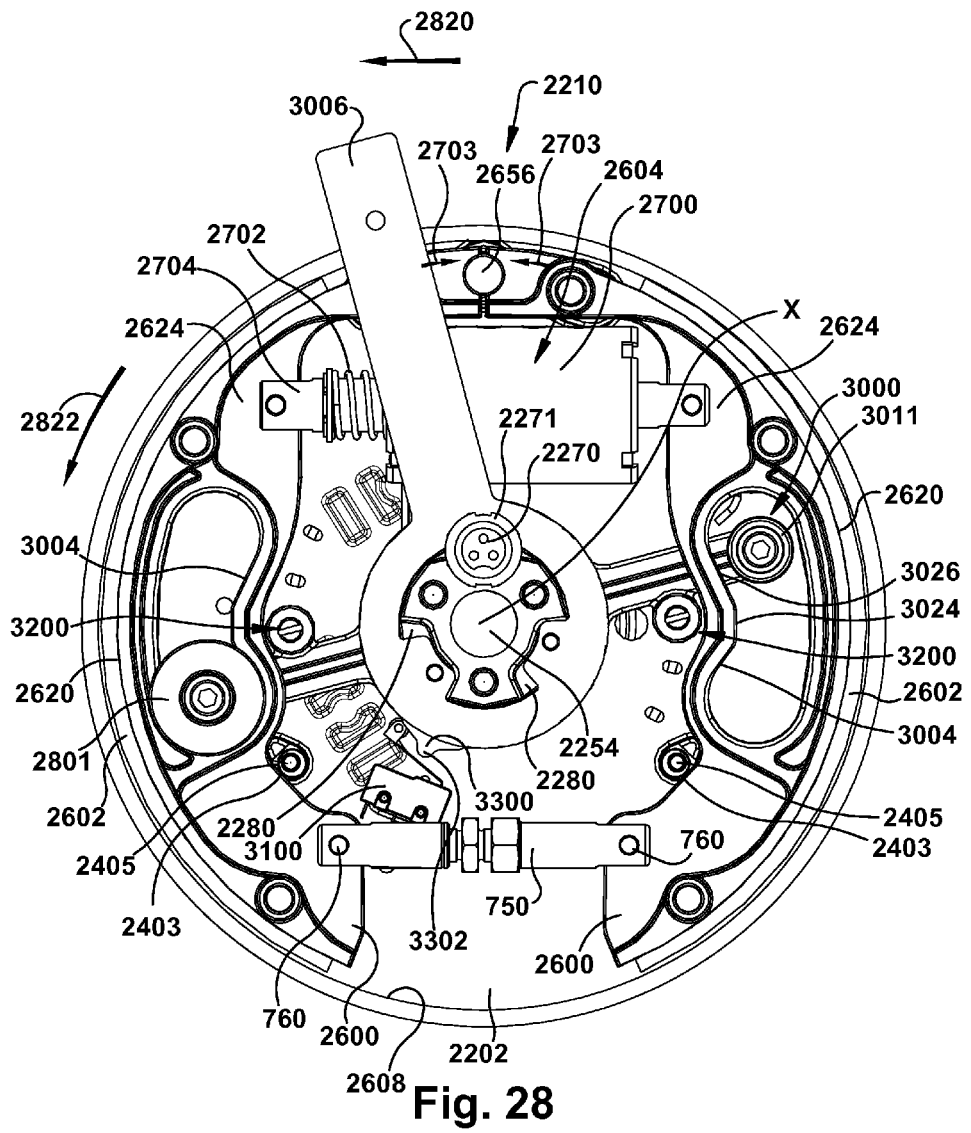
FIG. 28 is an elevational view of an exemplary embodiment of a brake assembly in a position where the brakes are released by an actuator.

The brake shoes 2600 can take a wide variety of different forms. In the embodiment illustrated by FIGS. 23A-23C, the brake shoes 2600 are mirror images of one another. As such, only one brake shoe 2600 will be described in detail. Each brake shoe 2600 has an outer pad mounting surface 2620, a plurality of glides 2622, and an actuator mounting portion 2624 that extends radially inward from the pad mounting surface 2620. The outer pad mounting surface 2620 is generally the shape of a cylindrical segment and is positioned to be parallel to the cylindrical inner surface 2608 of the rotor housing assembly 2204 when the brakes are disengaged (FIG. 28). In the illustrated embodiment, the pad mounting surfaces 2624 extend along a substantial portion of the cylindrical inner surface of the rotor housing assembly 2204. For example, an angle θ between ends 2630, 2632 of the pad mounting surfaces 2624 may be 150° or more (See FIG. 23B).

The actuator mounting portion 2624 includes an actuator mounting aperture 2650 and a link mounting aperture 2652. A pin clamping surface 2654 is defined at an end of the actuator mounting portion 2624. The pin clamping surface 2624 has the shape of a portion of a cylinder to engage a cylindrical pin 2656 that is attached to the mounting plate. The complimentary shapes of the clamping surfaces 2654 and the pin 2656 allow the brake assembly 2210 to be preassembled and then assembled with the mounting plate 2202 simply by sliding the clamping surfaces 2654 over the pin 2656. This may be done before or after the mounting plate 2202 is assembled with the stator assembly 2206 and/or outer cover 2302.

FIGS. 23D-23G illustrate an exemplary embodiment where the brake pads 2602 are overmolded onto the brake shoe 2600. In the illustrated embodiment, the pad mounting surface 2620 includes a plurality of discrete projections 2670 with undercuts 2672. When the brake pads 2602 are molded onto the brake shoe 2600, the brake pad material 2674 flows over the projections 2670 and into the undercuts 2670 to secure the pads 2602 to the shoes 2600. The illustrated brake pads 2602 include optional reliefs 2680.

The molded pads can be made from a wide variety of different materials, including but not limited to, plastics, natural and/or synthetic rubber, carbon fiber, powdered metals, ceramics, and combinations of these materials. In one exemplary embodiment, the molded pads are made from natural and/or synthetic rubber having a durometer of 60-90 Shore A durometer, a 70-90 Shore A durometer, a 75-90 Shore A durometer, or an 80 Shore A durometer.

Figure 24A:
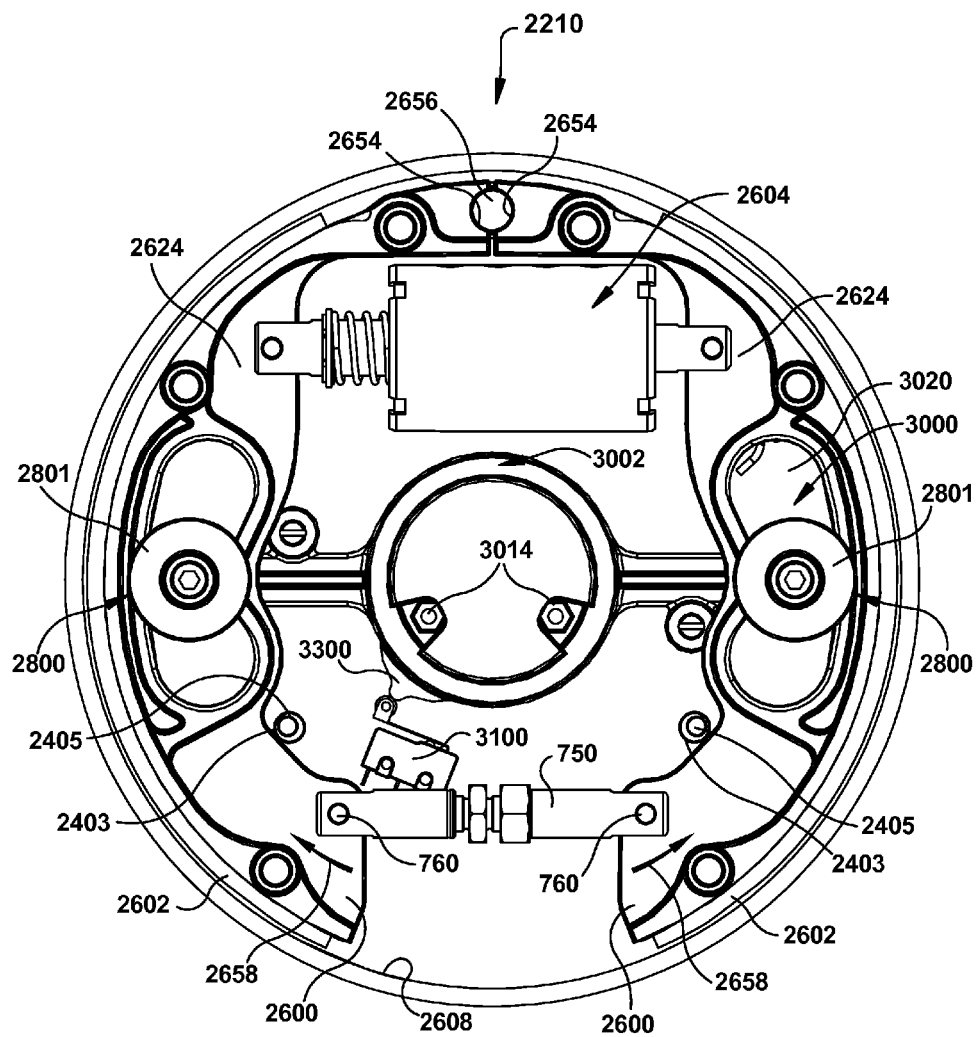
FIG. 24A is an elevational view of a brake assembly in a released condition.
Figure 24B:
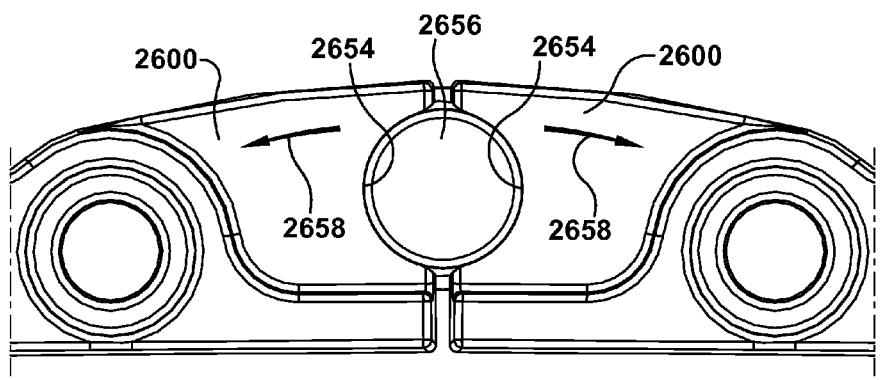
FIG. 24B is an enlarged portion of FIG. 24A, as indicated in FIG. 24A.

When the brakes are disengaged in the embodiment illustrated by FIGS. 24A and 24B, the brake shoes could possibly swing about the pin as indicated by arrows 2658. For example, this swinging might occur as the vehicle travels up or down a hill or accelerates/decelerates. This swinging from a circular pin could potentially cause some dragging of the brakes.

Figure 24C:
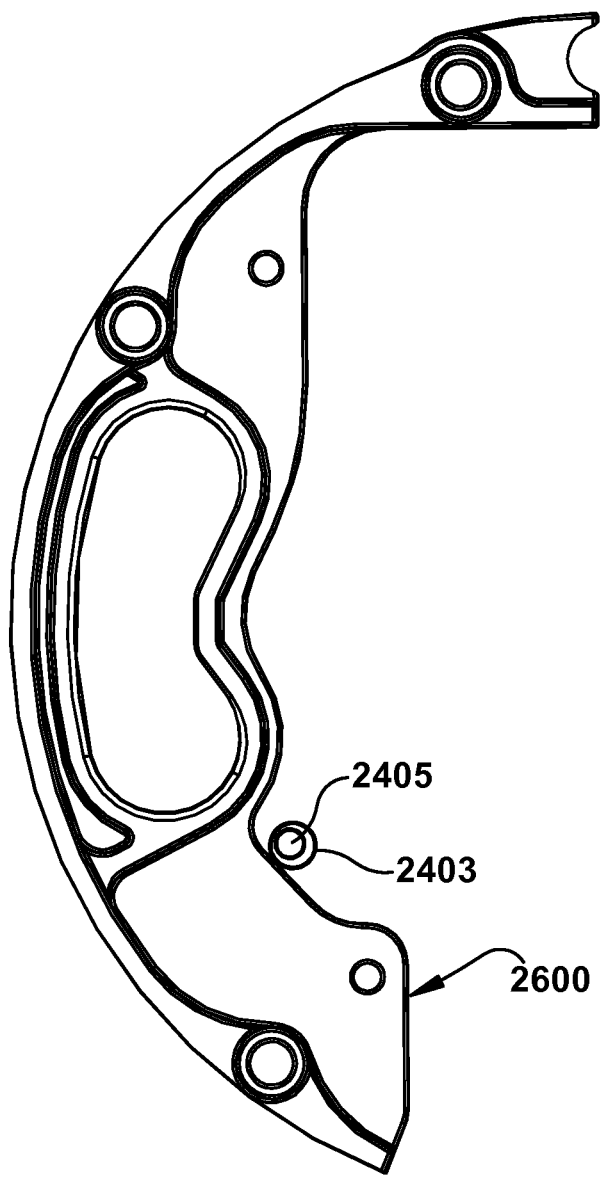
FIG. 24C is an elevational view of a brake shoe and a centering pin.
Figure 25A:
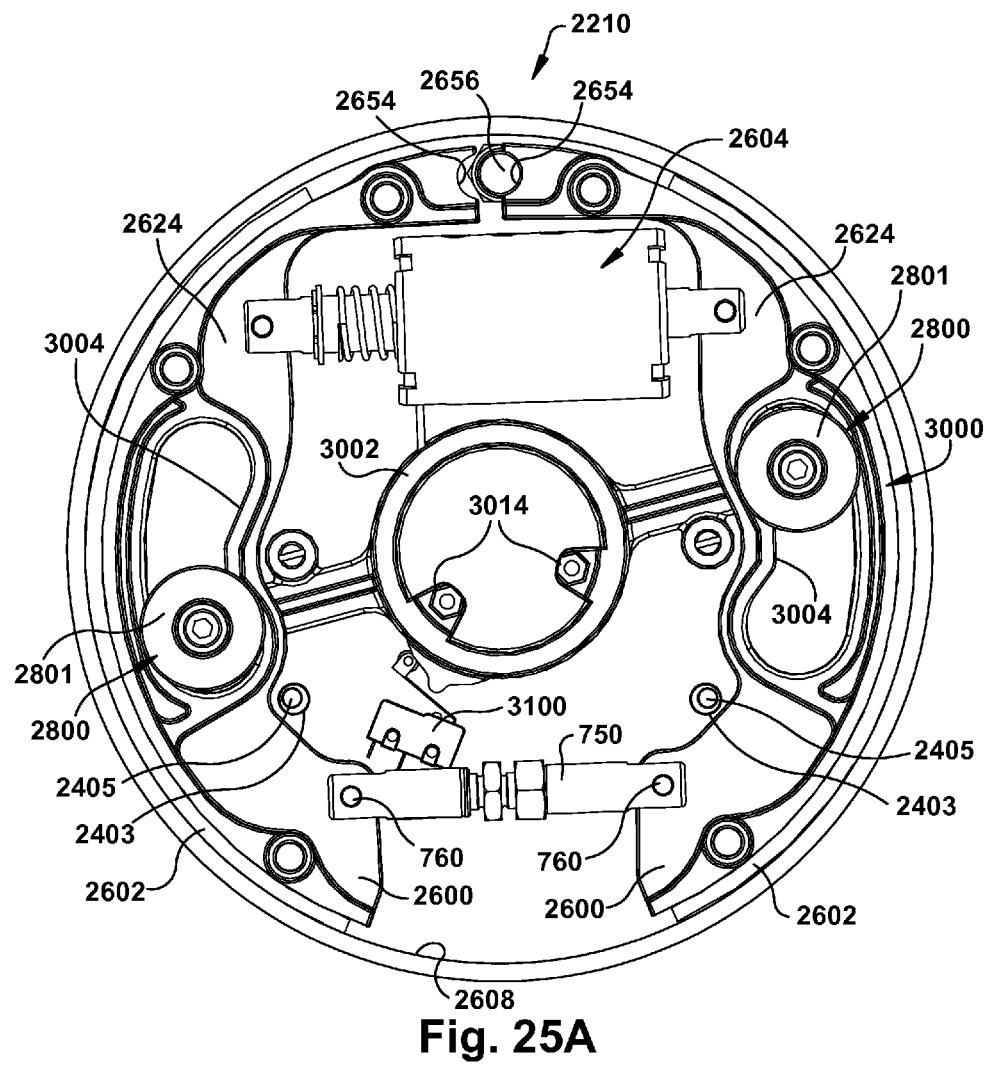
FIG. 25A is a view similar to the view of FIG. 24A showing the brake shoes in a position where the brake pads are engaged with the rotor housing assembly.
Figure 25B:
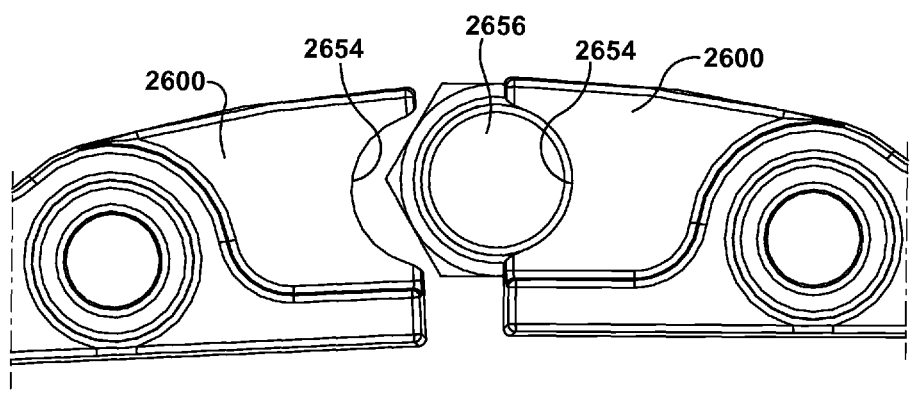
FIG. 25B is an enlarged portion of FIG. 25A, as indicated in FIG. 25A.

In one exemplary embodiment, the brake assembly 2210 includes an anti-swing arrangement that inhibits or reduces the swinging of the disengaged brakes to inhibit the dragging described above. The anti-swing arrangement can take a wide variety of different forms. For example, a structure that acts between the mounting plate 2202 and the brake shoes, such as a spring, a stop, etc. can be used. In the embodiment illustrated by FIGS. 24A-24C, a pair of stops 2403 are secured to the mounting plate 2202. The stops 2403 are positioned to engage the shoes 2600 if the brakes begin to swing when the brakes are disengaged to thereby inhibit brake drag. The stops 2403 can take a wide variety of different forms. In one embodiment, the positions of the stops 2403 are not adjustable. For example, the non-adjustable stops may comprise cylindrical members with centered attachment structures (i.e. centered male or female threads). It should be apparent that the mounting plate could be adapted to make such non-adjustable stops adjustable by allowing the stops to be mounted at multiple locations (i.e. by providing a mounting slot, clearance, multiple distinct locations, etc.).

In the illustrated embodiment, the positions of the stops 2403 are adjustable, for example to account for tolerances or to allow different amounts of swing. The adjustability of the stops may be accomplished in a variety of different ways. As noted above, the mounting plate 2202 may be adapted to allow adjustment of the stops. In an exemplary embodiment, the stops 2403 themselves are configured to allow adjustment of the stops. The stops can be configured to allow adjustment in a variety of different ways. In the illustrated embodiment, the stops 2403 are cylindrical with an off-center mounting structure 2405, such as off-center male or female threads. To adjust the amount of allowable swing or to compensate for tolerances, the stops are simply rotated about their off-center mounting to adjust the distance between the brake shoes 2600 and the stops 2403. Once adjusted, the mounting is tightened to fix the positions of the stops. For example, when the brakes are disengaged, the stops 2403 may be rotated into contact with the brake shoes 2600 or nearly into contact with the brake shoes and then tightened to the mounting plate 2202.

In an exemplary embodiment the stops 2403 are configured to allow the brake assembly 2210 to be pre-assembled and then assembled with the mounting plate 2202. This can be accomplished in a wide variety of different ways. In the embodiment illustrated by FIG. 22-B, the stops 2403 fit between the brake shoes 2600 and the clamping surfaces 2654 of the shoes slide over the pin 2656. The stops 2403 may be adjusted and tightened after assembly with the mounting plate 2200 or may be positioned and tightened before assembly with the mounting plate 2202. As noted above, the assembly of the brake assembly 2210 with the mounting plate 2202 may be done before or after the mounting plate is assembled with the stator assembly 2206 and/or the outer cover 2302.

By preventing the brake shoes 2602 from rotating with respect to the pin 2654 as indicated by arrows 2658 (see FIGS. 24A and 24B) when the brakes are disengaged, the brakes are prevented from dragging when the vehicle travels up or down a hill and/or when the vehicle accelerates or decelerates. That is, the brake shoes 2602 are prevented from swinging about the pin 2654 such that one of the brake pads contacts the rotor housing assembly 2204 when the vehicle travels up or down a hill and/or when the vehicle accelerates or decelerates.

In embodiment illustrated by FIG. 28, the brake pads 2602 are mirror images of one another. However, in other embodiments, the brake pads 2602 may have different sizes and shapes. Each brake pad 2602 is mounted to the pad mounting surface 2620 of a brake shoe. The brake pad 2602 has the shape of a cylindrical segment. In the embodiment illustrated by FIG. 24A, the brake pads 2602 extend along a substantial portion of the cylindrical inner surface of the rotor housing assembly 2204. For example, an angle β between ends 2680, 2682 of the pads 2602 may be 150° or more.

Figure 26A:
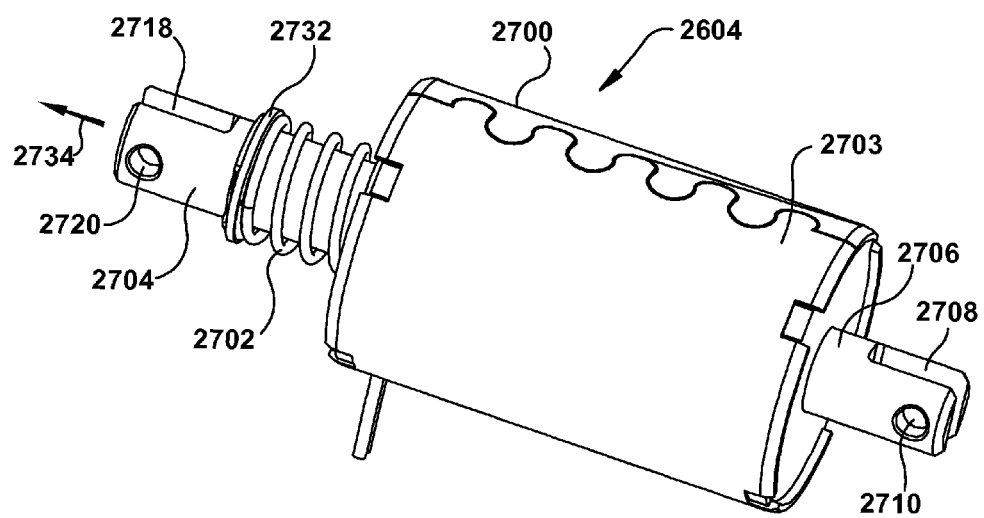
FIG. 26A is a perspective view of an exemplary embodiment of an actuator in an extended position.
Figure 26B:
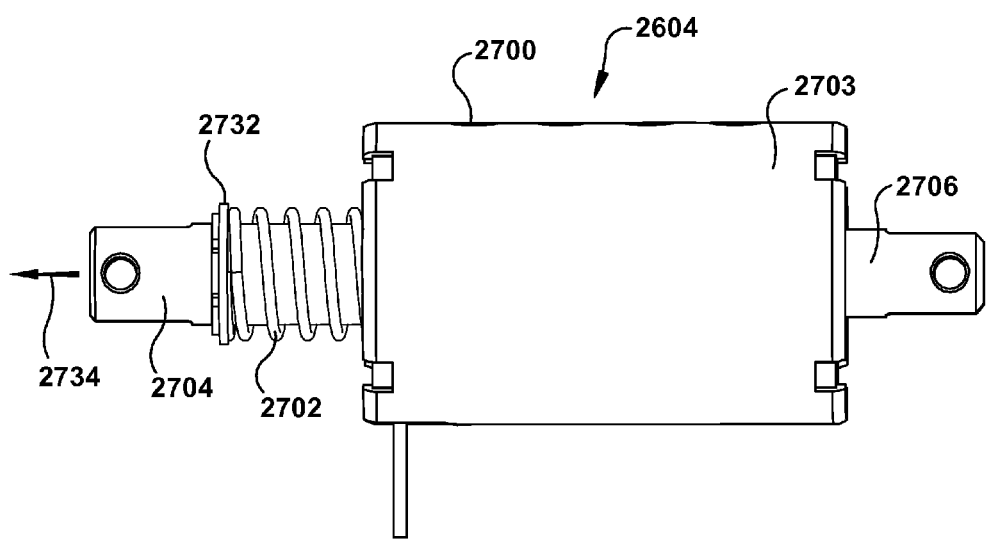
FIG. 26B is an elevational view of the actuator shown in FIG. 26A.
Figure 26C:
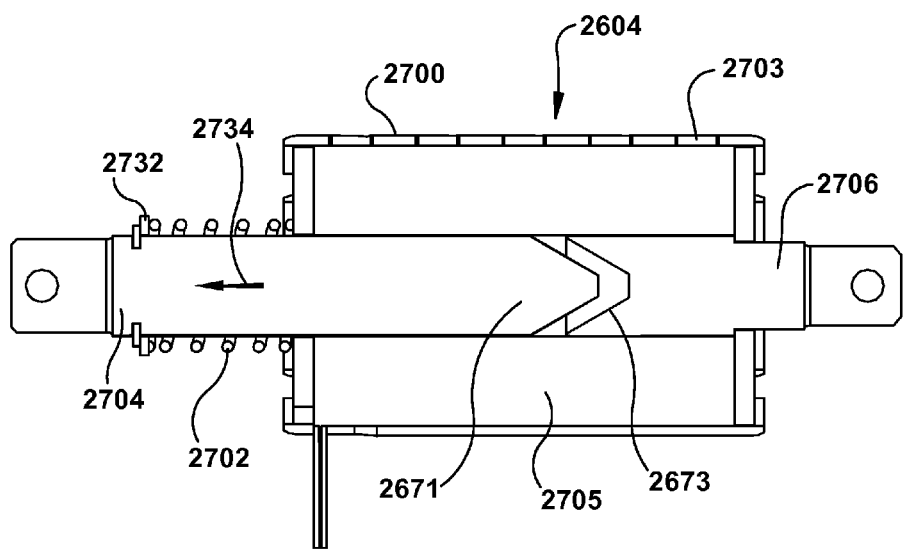
FIG. 26C is a sectional view taken along the plane indicated by lines 26C-26C in FIG. 26A.
Figure 27A:
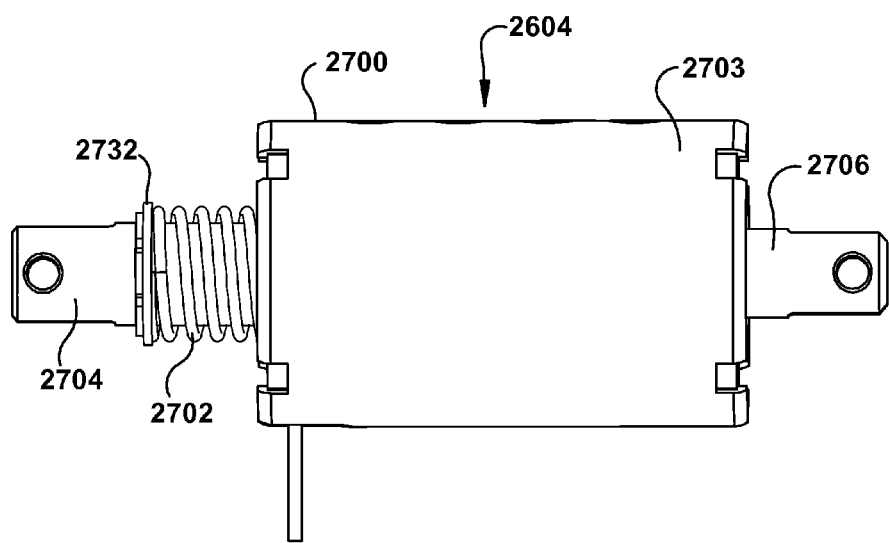
FIG. 27A is an elevational view of the actuator shown in FIG. 26A in a retracted position.
Figure 27B:
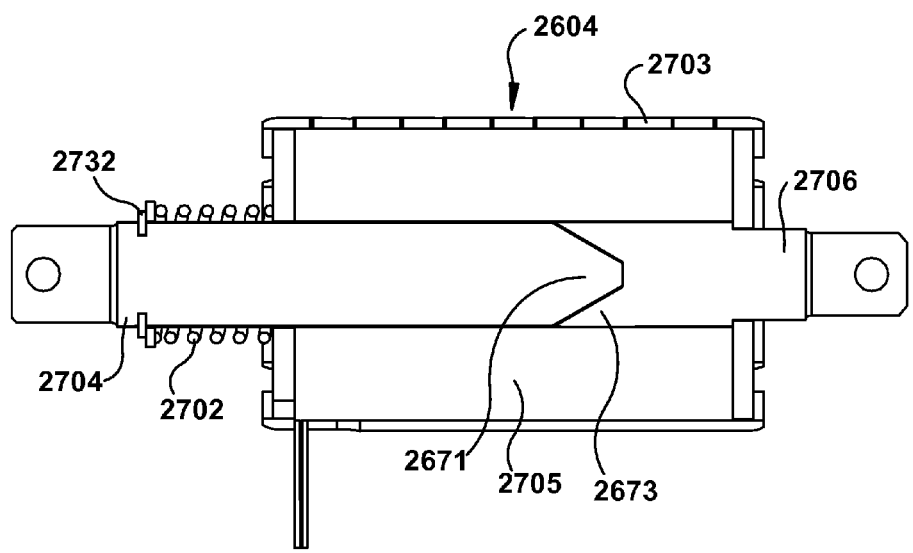
FIG. 27B is a sectional view of the actuator shown in FIG. 27A.
Figure 27C:
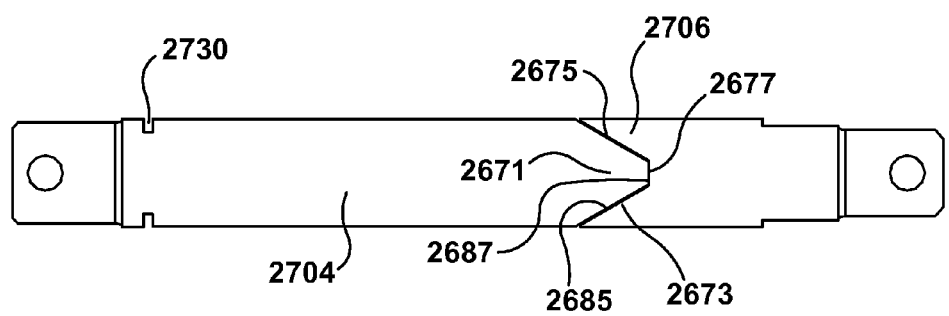
FIG. 27C is an enlarged sectional view of the shaft members of the actuator in the retracted position.

Referring to FIGS. 26A and 27A, the illustrated brake actuator 2604 comprises an electrically powered linear actuator 2700 and a spring 2702. FIGS. 26A-26C illustrate the actuator 2604 in and extended condition and FIGS. 27A and 27B illustrate the actuator in a retracted condition. The illustrated electrically powered linear actuator 2700 includes a body 2703 that surrounds a magnet coil 2705 that accepts a movable shaft 2704. A fixed shaft 2706 is also surrounded by the magnet coil 2750, but is fixed relative to the magnet coil 2705 and the body 2703 at the end that is opposite the shaft 2704.

Figure 26D:
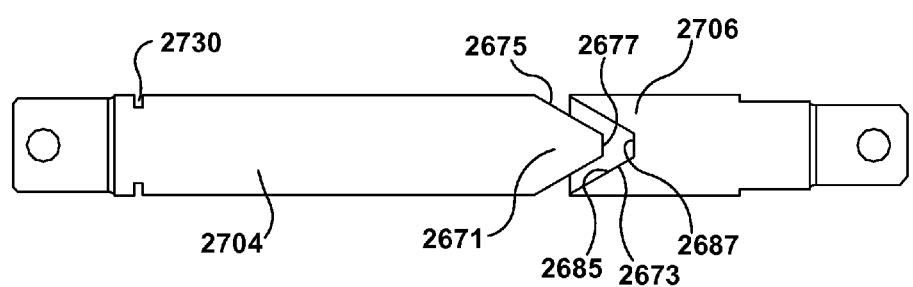
FIG. 26D is an enlarged sectional view of shaft members of the actuator in the extended position.

Referring to FIG. 26D, the movable shaft 2704 and the fixed shaft 2706 have complimentary mating surfaces, which may take a wide variety of different forms. In the illustrated embodiment, the movable shaft 2704 has a male frusto-conical end 2671 that mates with a female frusto-conical recess 2673 of the fixed shaft 2706. However, the moveable shaft 2704 can be female and the fixed shaft 2706 can be male. The frusto-conical male end 2671 includes a tapered surface 2675 and a flat end wall 2677. The frusto-conical female recess 2673 includes a tapered surface 2685 and a flat end wall 2687.

The size and shape of the size and shape of the mating surfaces 2671, 2673 effect the performance of the actuator. For example, larger end walls 2677, 2687 provide more holding force (i.e. the force required to pull the end walls apart when the electromagnet is energized and the end walls are in contact). As such, cylindrical shafts with flat ends would provide the most holding force. However, larger end walls 2677, 2687 can result in lower pulling force (i.e. the force urging the movable shaft 2704 relatively toward the fixed shaft when the end walls 2677, 2687 are spaced apart and the electromagnet is energized). Conversely, larger tapered surfaces 2675, 2685, with one extending into the other, increase the amount of pulling force, but do not provide as much holding force. In an exemplary embodiment, the size and shape of the end walls 2677, 2687 and the tapered surfaces 2675, 2685, along with other parameters (i.e. electromagnet properties—size, number of wire turns, power applied, etc., shaft materials, shaft travel, etc.) are selected to provide the desired pulling force and the desired holding force.

Figure 27D:
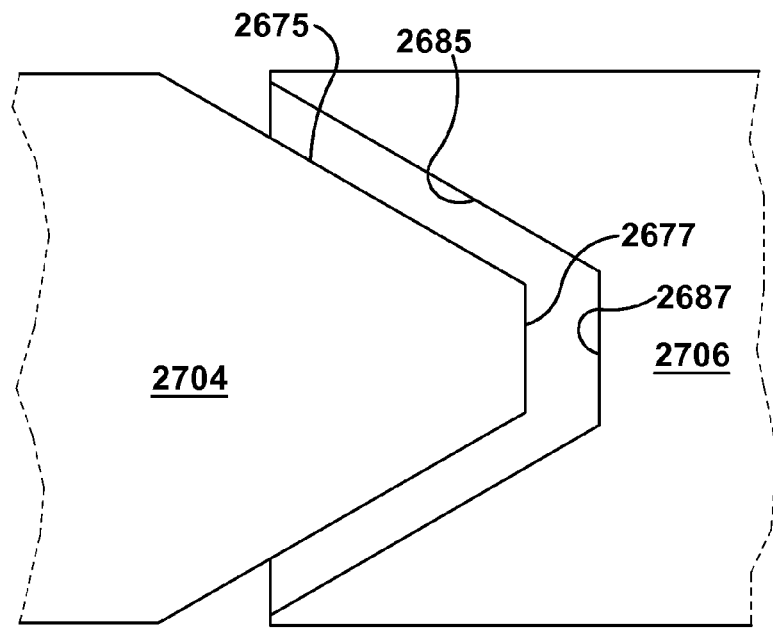
FIG. 27D is an enlarged sectional view of an exemplary embodiment of shaft members of an actuator in a retracted position.
Figure 27E:
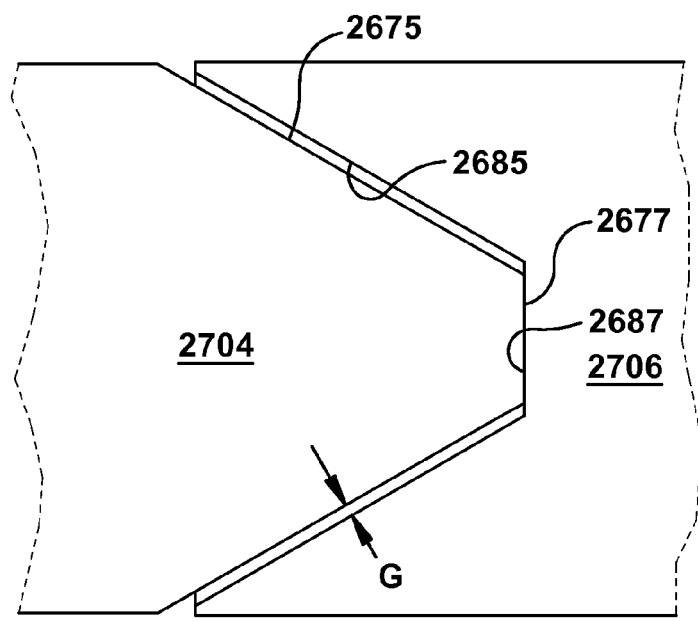
FIG. 27E is an enlarged sectional view of the shaft members shown in FIG. 27D in an extended position.

FIGS. 27D and 27E illustrate another exemplary configuration of the shafts 2704, 2706. Either shaft can be the fixed shaft with the other shaft being the moveable shaft. In the illustrated example, the inner tapered surface 2685 of the shaft 2706 is spaced apart from the outer tapered surface 2675 of the shaft 2704 when the flat end wall 2677 of the shaft 2704 is in engagement with the flat inner wall 2687 of the shaft 2706 to form a gap G. The gap G ensures that the end walls 2677, 2687 always engage one another before the shafts bottom out due to engagement between the tapered surfaces 2675, 2685. This ensures that the actuator 2604 always retracts to the same position while still providing a strong pulling force.

Figure 22C:
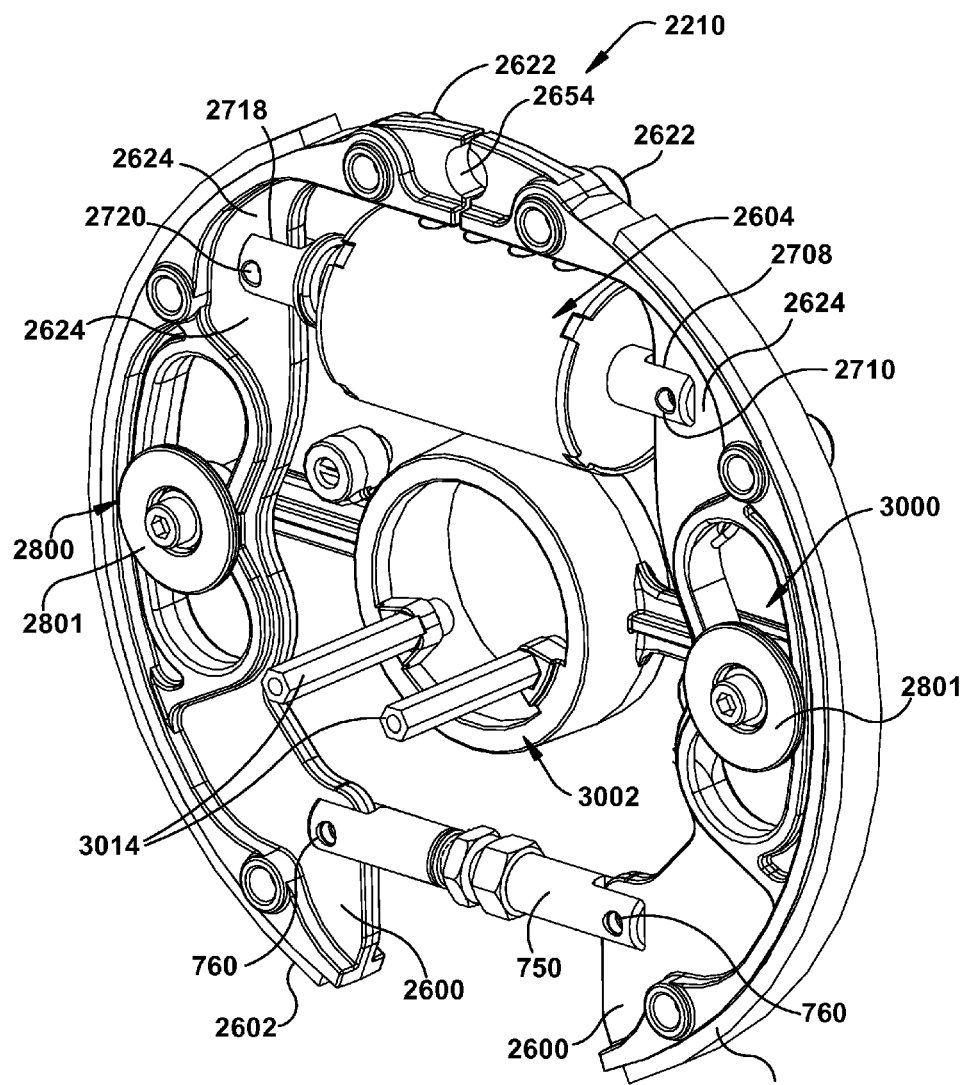
FIG. 22C is an enlarged perspective view of the brake shoe, actuator, and release assembly shown in FIG. 22B.

The fixed shaft 2706 has a slot 2708 at its end and has a bore 2710 that intersects the slot 2708. Referring to FIG. 22C, the slot 2708 is placed over the actuator mounting portion 2624 and a fastener is placed through the bore 2710 of the mounting member 2706 and through the actuator mounting aperture 2650 (see FIG. 23A) to connect one end of the actuator 2700 to one of the shoes 2600. Similarly, the shaft 2704 has a slot 2718 at its end and has a bore 2720 that intersects the slot 2718. Referring to FIG. 22C, the slot 2718 is placed over the actuator mounting portion 2624 and a fastener is placed through the bore 2720 of the shaft 2704 and through the actuator mounting aperture 2650 (see FIG. 23A) to connect the other end of the actuator 2700 to the other shoe 2600.

The spring 2702 can take a wide variety of different forms. Any spring capable of biasing the brakes to an engaged position or to a released position can be used. In the illustrated embodiment, the spring 2702 is a compression spring that is disposed around the shaft 2704 and acts against the actuator body 2703. The illustrated shaft 2704 has an annular groove 2730 (FIG. 26D) that accepts a snap ring 2732 or another fastening arrangement can be used. The spring 2702 is captured between the body 2703 and the snap ring 2732. As such, the spring 2702 biases the shaft 2704 as indicated by arrow 2734 to a normally extended position. Referring to FIGS. 26A-26C and FIG. 29, the spring 2702 extends the shaft 2704 to bias the brakes into a normally engaged position. Referring to FIGS. 27A, 27B and 28, when the actuator 2700 is energized, the shaft 2704 is pulled into the body 2703 against the biasing force of the spring 2702 and into contact with the shaft 2706 to move the brakes to a released position. In one exemplary embodiment, once the flat end walls 2677, 2687 engage, the amount of power applied to the electromagnet may be reduced, since the flat end walls provide increased holding force. As such, the power consumed by operation of the brakes may be reduced to extend the battery life of the vehicle.

In the illustrated embodiment, the brake assembly 2210 also includes a brake link 750. The brake link 750 is illustrated as being adjustable in length, but may be a member having a fixed length. The brake link 750 has bores 760 that align with apertures 2652 to connect the ends of the brake link to the shoes 2600.

The brake shoe glides 2622 and the glide support protrusions 2247 can take a wide variety of different forms. The glides 2622 and the glide support protrusions are configured to allow the brake shoes 2600 to smoothly move back and forth between the engaged and released positions. In the illustrated embodiment, the glides 2622 comprise cylindrical bosses with flat engagement surfaces. The glides 2622 slide against the glide support protrusions 2247 on the central wall portion 2240 of the mounting plate 2202. The glides 2622 and/or the glide support protrusions 2247 of the mounting plate 202 can be configured to reduce friction between the glides 2622 and the mounting plate 2202. This reduction in friction can be accomplished in a wide variety of different ways. For example, the glides 622 and/or the glide support protrusions 2247 can be made from a low-friction material, such as nylon, Teflon, silicone, etc., surfaces or portions of surfaces of the glides 2622 and/or the glide support protrusions 2247 can be coated with a low friction material, such as nylon, Teflon, silicone, etc. and/or an anti-friction grease can be applied between the contacting surfaces.

In one exemplary embodiment, the brake assembly 2210 includes a retaining mechanism 2800 (See FIGS. 22C and 22D) that prevents the brake shoes 2600 from moving too far axially away from the wall portion 2240 of the mounting plate 2202. For example, the retaining mechanism 2800 prevents the brake shoes 2600 from moving away from the wall portion 2240 and into contact with the rotor housing assembly 2204. In one embodiment, the retaining mechanism 2800 keeps the glides 2622 near the wall portion 2240 of the mounting plate 2202 or in contact with the wall portion 2240 of the mounting plate 2202. The retaining mechanism 2800 can take a wide variety of different forms. For example, the retaining mechanism may comprise one or more springs that bias the brake shoes 2600 toward the wall portion 2240 of the mounting plate 2202, one or more stops or stop brackets that limit the movement of the brake shoes 2600 away from the wall portion 2240, etc. Any mechanism that prevents the brake shoes 2600 from moving axially outward and/or tilting or canting such that the brake shoes axially contact with the rotor housing assembly 2204 or a component that rotates with the rotor housing assembly may be used.

In the embodiment illustrated by FIG. 22C, the retaining mechanism 2800 comprises washers 2801 that are connected in a spaced apart relationship to the wall portion 2240 by a brake release mechanism 3000 (described in detail below). The brake shoes 2600 are positioned between the wall portion 2240 and the washers to limit the axial movement of the brake shoes 2600 away from the wall portion 2240. A clearance may be provided between the brake shoes 2600 and the washers 2801 of the retaining mechanism 2800, such that the brake shoes and glides float between the washers 2801 and the glide support protrusions 2247 of the mounting plate 2202. An additional stop and/or stop bracket (not shown) may be provided to prevent or limit tilting of each brake shoes 2600 about the area of engagement between the brake shoe 2600 and corresponding washer 2801.

Figure 29:
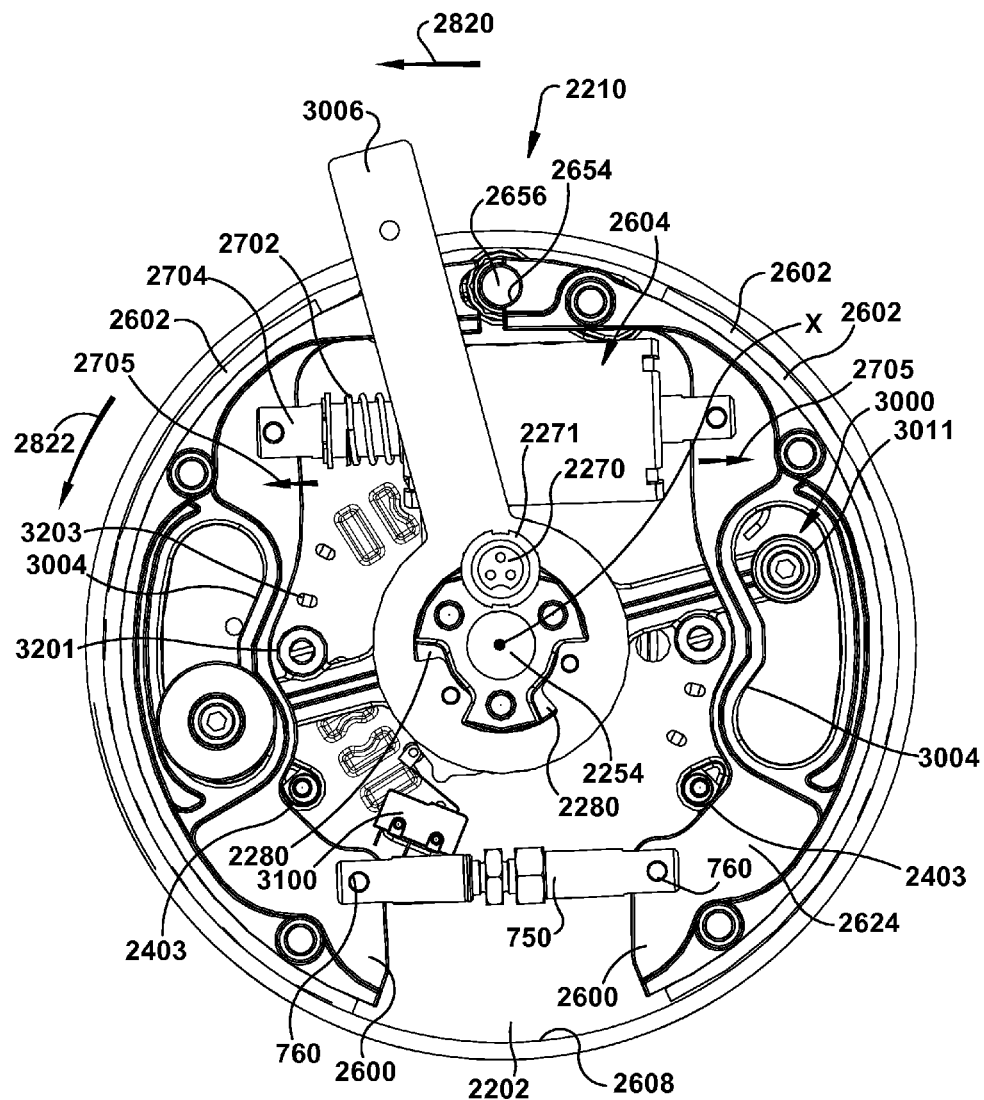
FIG. 29 is an elevational view of an exemplary embodiment of a brake assembly in a position where the brakes are applied by an actuator.
Figure 29A:
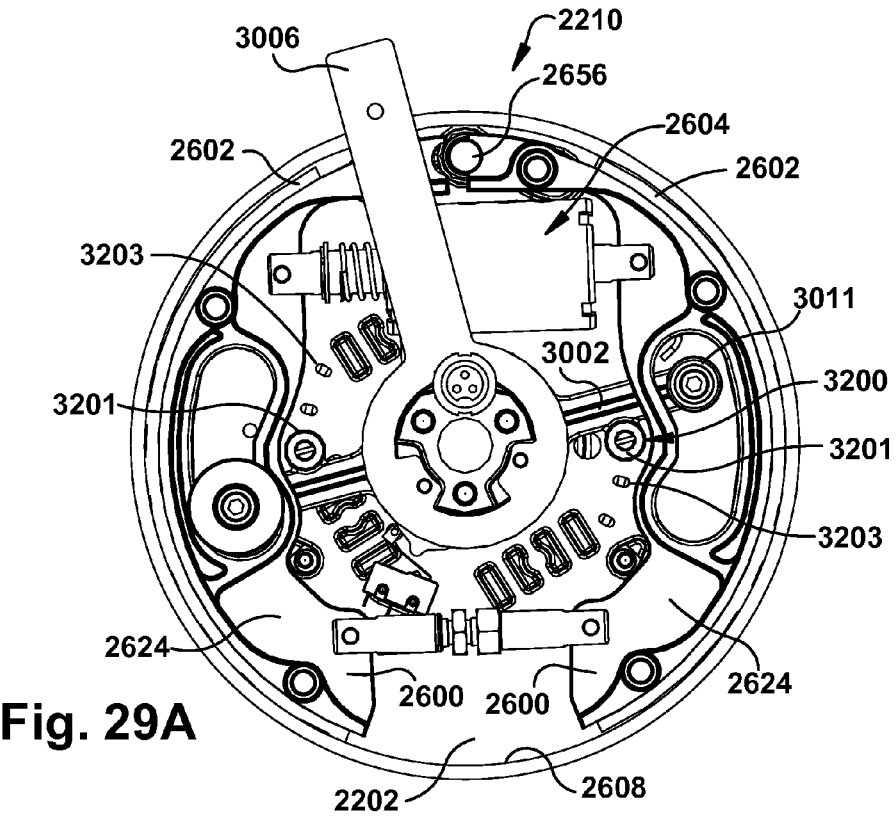
FIGS. 29A and 29B are elevational views of the brake assembly shown in FIG. 19 with a brake release mechanism in two different positions that allow normal operation of the brakes.
Figure 29B:
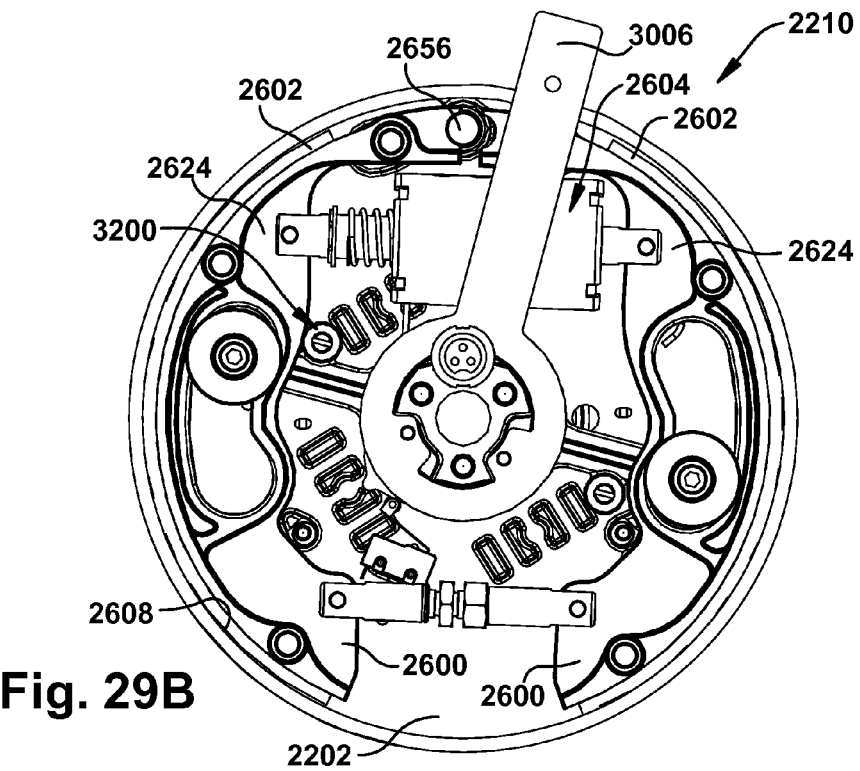

FIGS. 28 and 29 illustrate normal operation of the brake assembly 2210. That is, FIGS. 28 and 29 illustrate operation of the brake assembly 2210 by the actuator 2700. FIG. 28 illustrates the brake assembly 2210 in a released or disengaged condition. For example, when a user of the wheelchair 100 (FIG. 1) presses on the joystick 124 (FIG. 1), the actuator 2700 is energized and the shaft 2704 is retracted against the biasing force of the spring 2702. The actuator 2700 pulls the brake pads together as indicated by arrows 2703 in FIG. 28 and the pin clamping surfaces 2654 (FIG. 23A) are brought into contact with the pin 2656. When the pin clamping surfaces 2654 engage the pin 2656, the brake pads 2602 are spaced apart from the inner wall (or brake lining) 2608 of the rotor housing assembly 2204.

When the brake assembly 2210 is in the disengaged position shown in FIG. 28, the wheelchair begins to move in the direction selected by operating the joystick 124 (FIG. 1). In the example illustrated by FIGS. 28 and 29, arrow 2820 represents the direction of movement of the wheelchair 100 (FIG. 1) and arrow 2822 represents the corresponding direction of rotation of the rotor housing assembly 2204 around the mounting plate 2202 for movement in this direction.

FIG. 29 illustrates the brake assembly 2210 in an engaged position. For example, when the user of the wheelchair 100 releases the joystick 124 (FIG. 1), the actuator 2700 is de-energized and the shaft 2704 is extended by the biasing force of the spring 2702. In some embodiments, this de-energizing is delayed.

When the actuator is de-energized, the spring 2702 pushes the brake pads apart as indicated by arrows 2705 in FIG. 29 and into contact with the rotor housing assembly 2204. When the rotor housing assembly 2204 is rotating in the direction indicated by arrow 2822, the clamping surface 2654 of the brake shoe shown on the right in FIG. 29 substantially remains in engagement with the pin 2656 and rotates about the pin to bring its pad 2602 into contact with the wall or lining 2608. The brake shoe 2600 shown on the left in FIG. 29 rotates about the connection to the brake link 750 to bring its pad 2602 into contact with the wall or lining 2608. Once the wheelchair 100 (FIG. 1) is stopped, the brake assembly 2210 remains engaged until the actuator 2700 is energized again or the brakes are disengaged by a manual brake disengagement mechanism 3000 (described in detail below).

One feature of the exemplary brake assembly shown in FIGS. 28 and 29 is that the brake shoes 2600 and brake pads 2602 are mirror images of one another and the brake pads 2602 are sized such that the drive assembly 2200 can be used on either side of the wheelchair 100 (or other vehicle), without changing the performance of the brakes.

Another feature that contributes to the ambidextrous nature of the brake assembly is that the action of the brake shoes (i.e. one brake shoe 2600 engages the pin 2656, while the other brake shoe pivots) automatically reverses, simply by placing the drive assembly on the opposite side of the vehicle. No adjustment to the brake assembly 2210 is required to used the drive assembly on either side of the vehicle.

Referring to FIG. 28, when the drive assembly 2200 is used on a powered wheelchair 100 (FIG. 1), it may be advantageous to include a brake release assembly 3000. For example, should a person wish to manually push the wheelchair 100 having a brake system as described above, normally engaged brakes need to be released before the person could push the wheelchair. While provisions can be made to release the brakes electrically (i.e. by providing a switch that energizes the actuator 2700), a manual brake override is preferred, since it is operable even though power may not be available to the actuator 2700.

The manual brake release mechanism 3000 can take a wide variety of different forms. Any configuration that allows the brake assembly 2210 to be manually disengaged can be implemented. In the example illustrated by FIGS. 22D and 22E, the manual brake override includes a cam driver mechanism 3002, brake shoe cam surfaces 3004, and a handle 3006 (FIG. 22A). The handle 3006 can be operated such that the cam driver mechanism 3002 engages the brake shoe cam surfaces 3002 to move the brake shoes 2600 to a manual brake release position (See FIG. 22A).

Figure 22D:
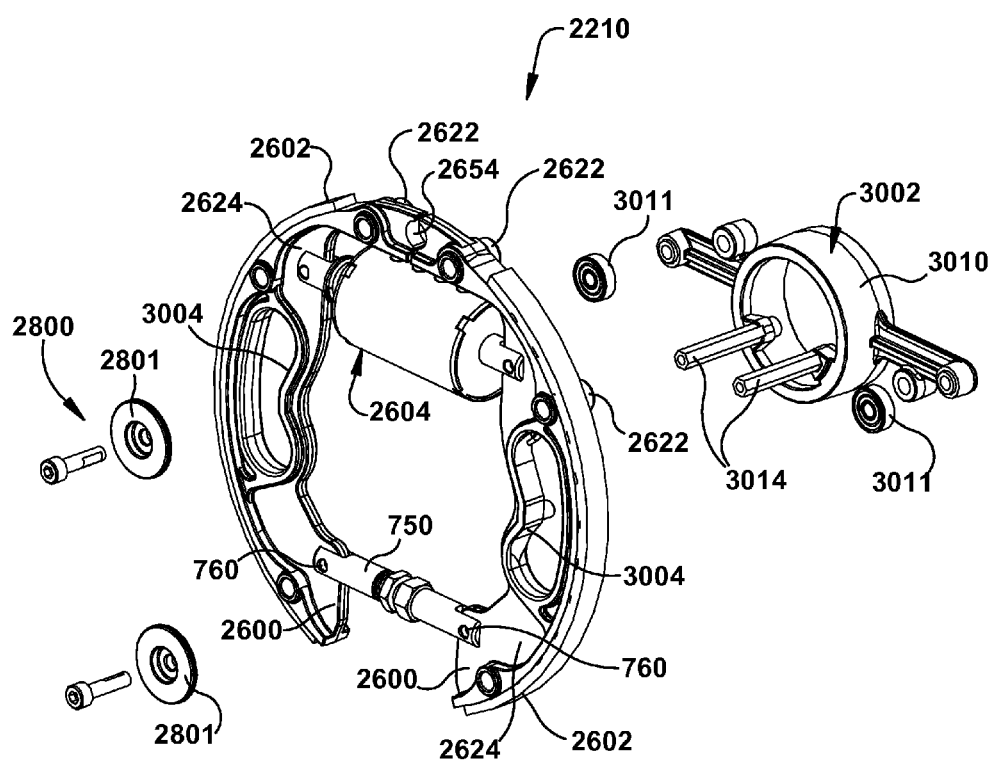
FIG. 22D is a first exploded perspective view of the brake shoe, actuator, and release assembly shown in FIG. 22C.
Figure 22E:
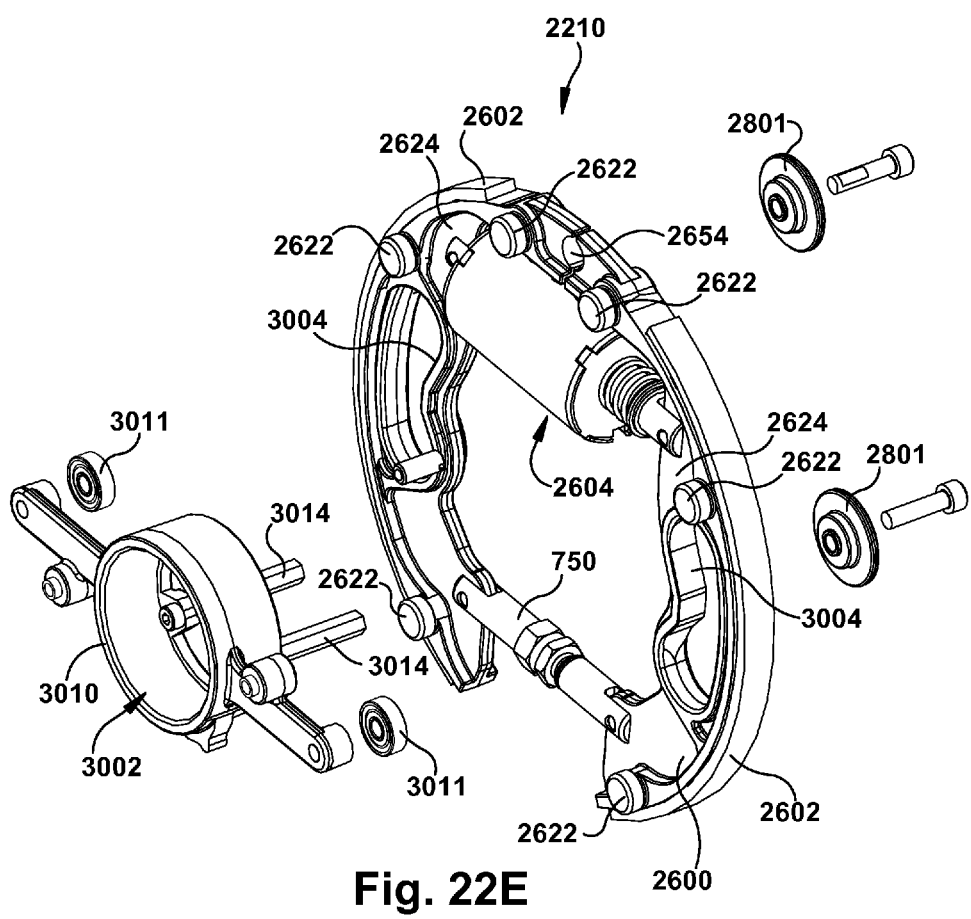
FIG. 22E is a second exploded perspective view of the brake shoe, actuator, and release assembly shown in FIG. 22C.
Figure 31A:
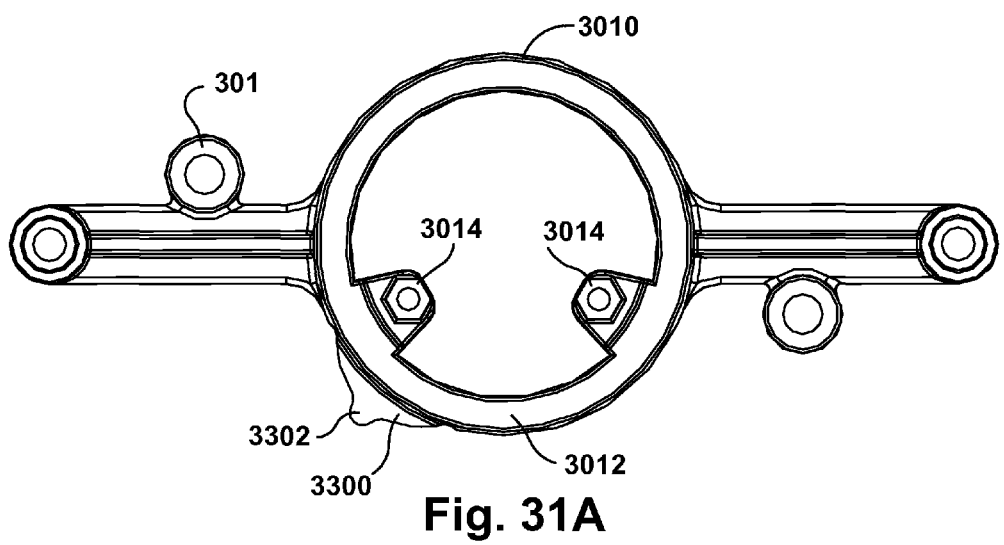
FIG. 31A is a plan view an exemplary embodiment of a drive member of a manual brake release mechanism.
Figure 31B:
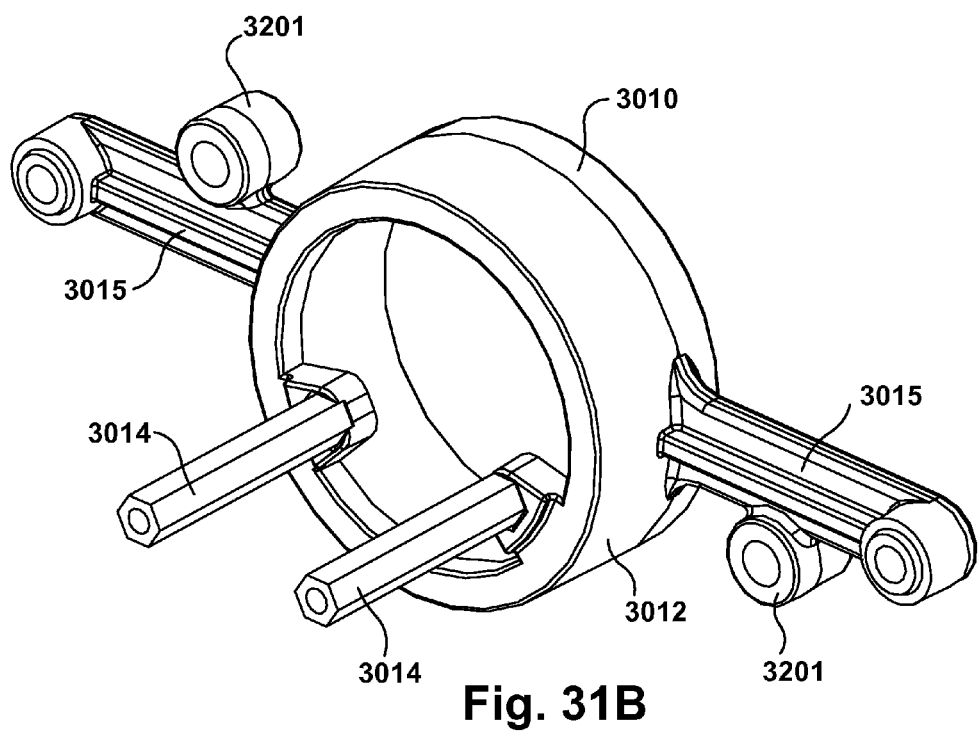
FIG. 31B is a perspective view of the drive member illustrated by FIG. 31.

The cam driver mechanism 3002 and brake shoe cam surfaces 3004 may take a wide variety of different forms. Any arrangement capable of moving the brake shoes 2600 to the released position can be used. In the embodiment illustrated by FIGS. 22D and 22E, the cam drive mechanism 3002 includes a drive member 3010 and a pair of cam members 3011 (In some views, the cam members 3011 are hidden behind a washer 2801. In other views, washers 2801 are removed to show the cam members 3011). Referring to FIGS. 31A and 31B, the drive member 3010 may include an annular central hub portion 3012, a pair of legs 3014 (which may be integrally formed or separate members that are attached) extending axially from the annular central hub portion 3012, and a pair of arms 3015 that extend radially outward from the central hub portion. Referring to FIG. 22D, the illustrated cam members 3011 are rollers that are rotatably mounted to the arms 3015. However, the cam members 3011 may be fixed to the arms or integrally formed with the arms.

Figure 23B:
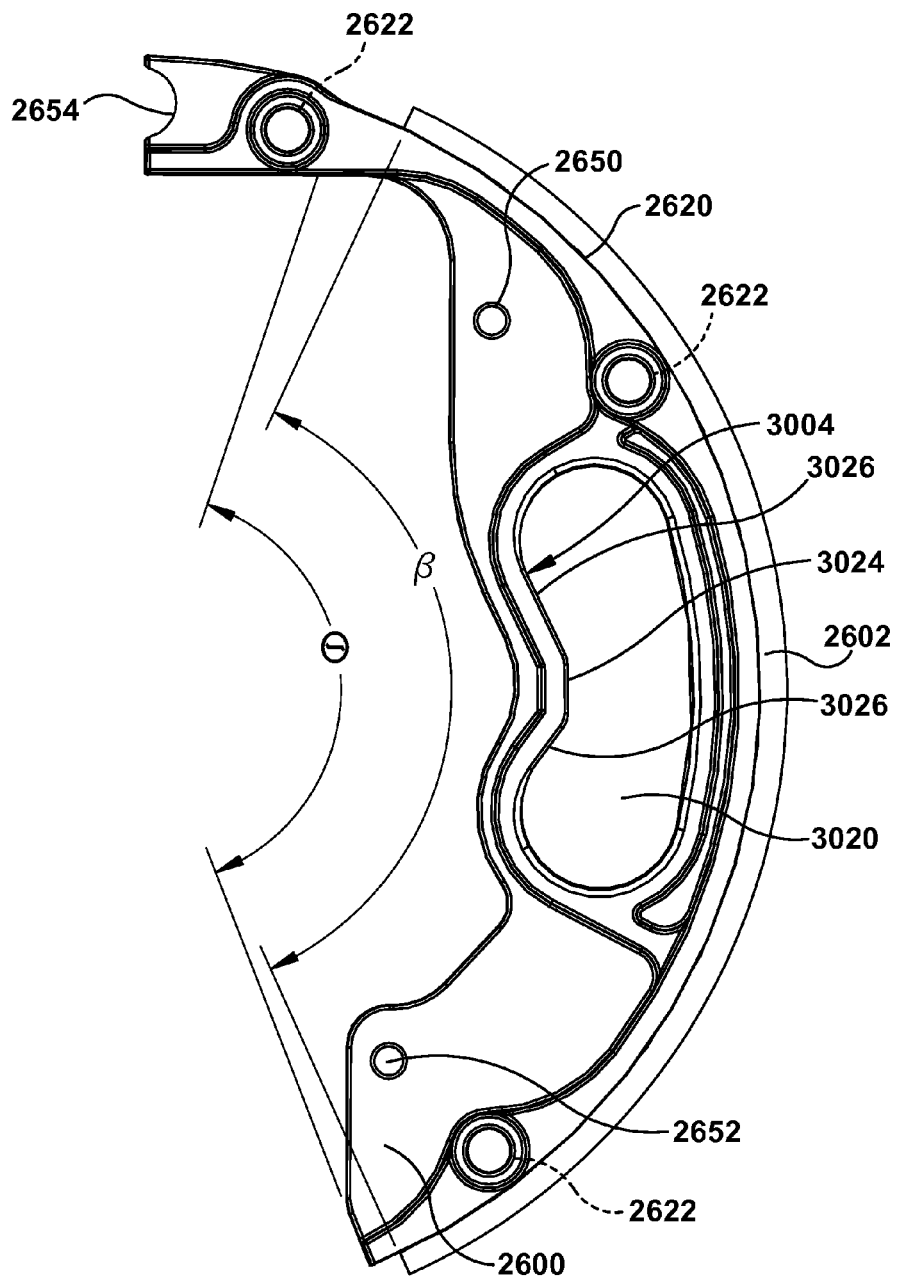
FIG. 23B is a front view of the brake shoe assembly shown in FIG. 23A.
Figure 23C:
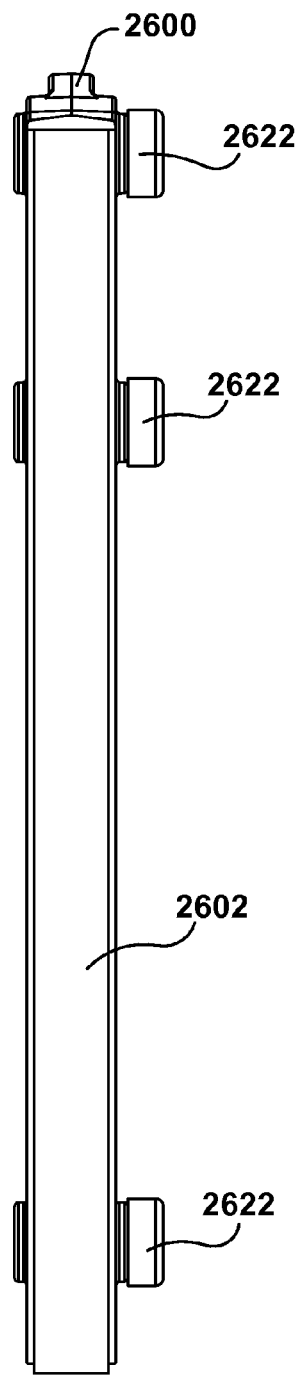
FIG. 23C is a side view of the brake shoe assembly shown in FIG. 23A.
Figures 23D, 23E:
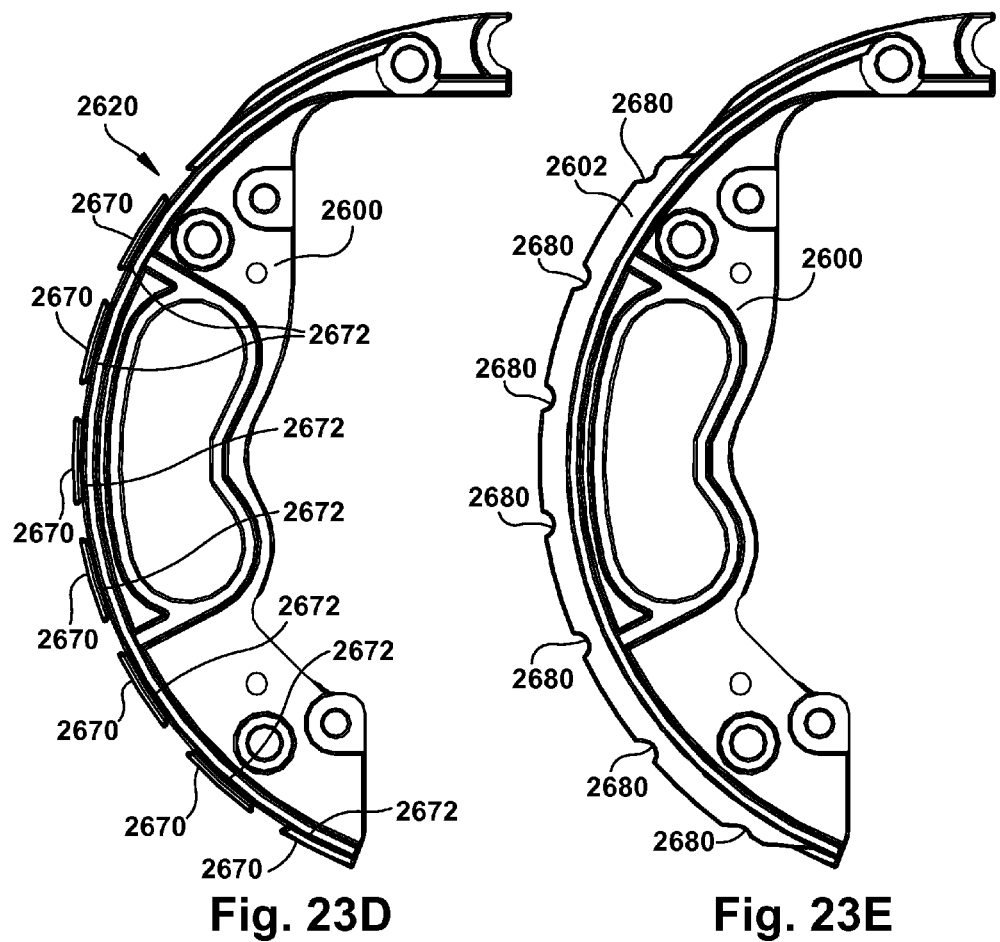
FIG. 23D is a front view of an exemplary embodiment of a brake shoe.
FIG. 23E is a front view of an exemplary embodiment of a brake shoe and pad assembly.
Figures 23F, 23G:
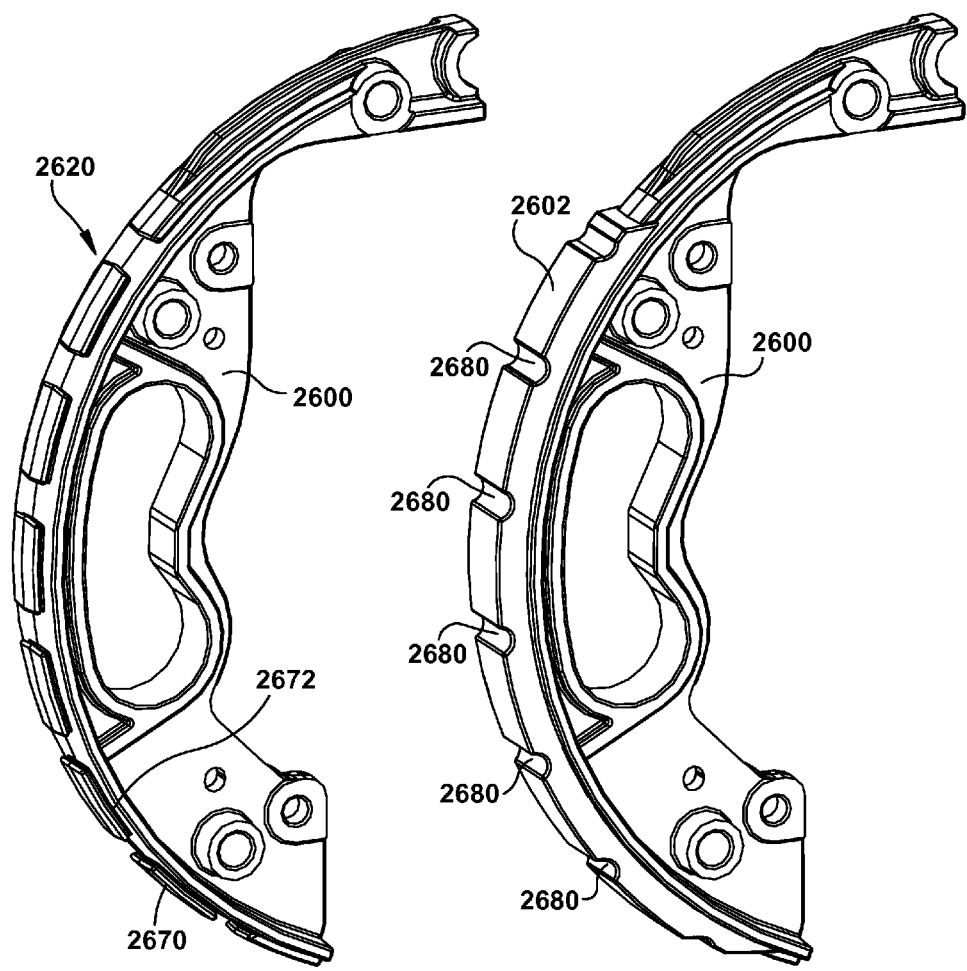
FIG. 23F is a perspective view of an exemplary embodiment of a brake shoe.
FIG. 23G is a perspective view of an exemplary embodiment of a brake shoe and pad assembly.

The brake shoe cam surfaces 3004 can take a wide variety of different forms. The cam surfaces 3004 may be integrally formed with the brake shoes 2600 or the cam surfaces 3004 may comprise separate members that are attached to the brake shoes. The cam surfaces 3004 may comprise any structure capable of being engaged by the cam mechanism 3002 to move the brakes to a disengaged position. Referring to FIG. 23B, the illustrated cam surfaces 3004 comprise slots 3020 formed in the brake shoes. An inner surface of each slot forms the cam surface 3004. The inner surface includes a central portion 3024 and two outer portions 3026. The central portion 3024 is closer to the central axis X of the base member 2202 than the outer portions 3026. The illustrated central portion 3024 is flat to provide a "dwell" to the brake release assembly. That is, the flat portion 3024 prevents or reduces the likelihood that the cam members will unintentionally slide or roll off of the central portion 3024 to one of the outer portions 3026. One or more detests can be added to the central portion 3024 to further reduce the chance that the cam members will unintentionally roll off the central portion 3024.

Referring to FIG. 22B, the hub portion 3012 of the drive member 3010 is rotatably coupled around the central post 2241. An optional bearing (not shown) may be included to reduce friction between the drive member 3010 and the central post 2241 and/or the wall portion 2240. The legs 3014 of the drive member 3010 are disposed in the passages 2280.

Figure 30:
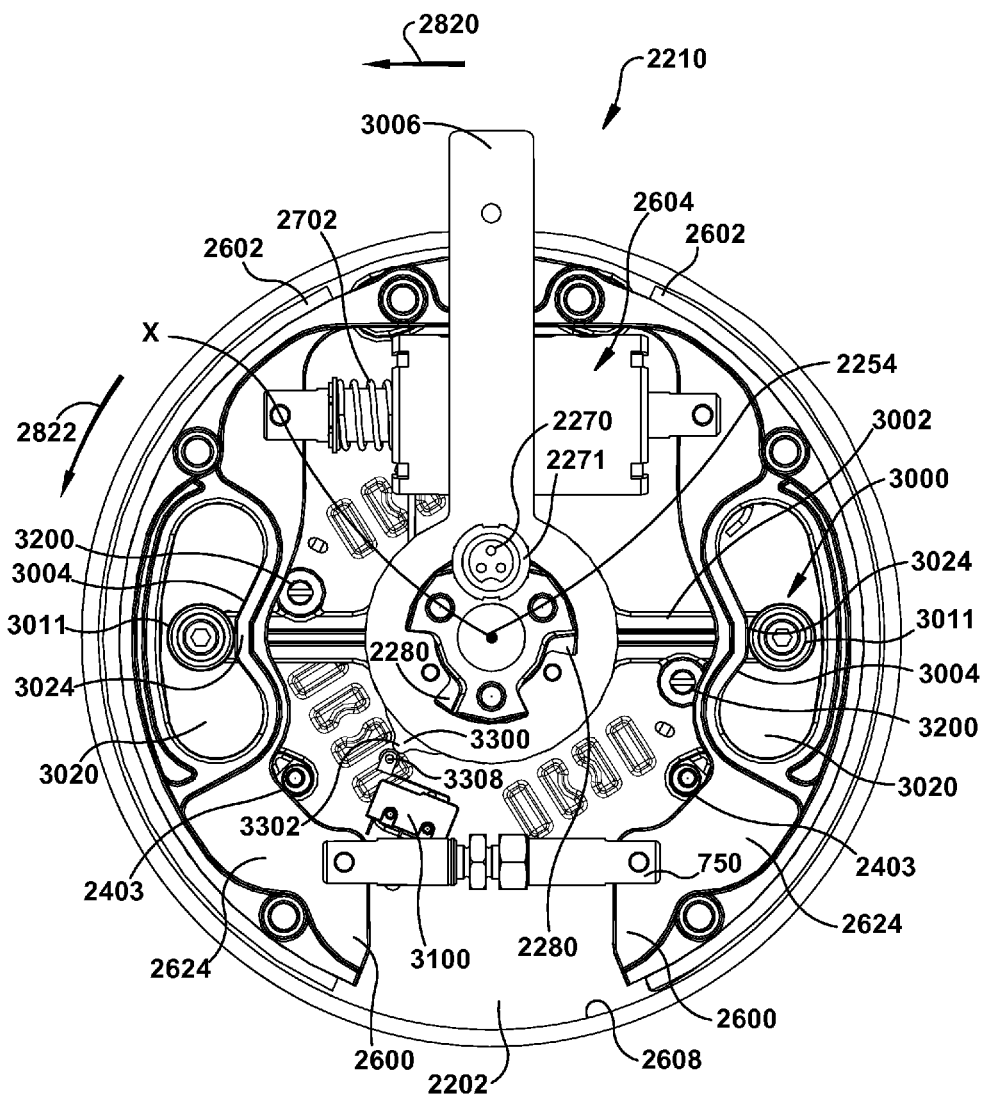
FIG. 30 is an elevational view of an exemplary embodiment of a brake assembly in a position where the brakes are released by a manual brake release mechanism.

The clearance between the legs 3014 and the passages 2280 define the amount of possible rotation of the drive member 3010 about the central post 2241. Referring to FIGS. 28 and 30, about 15 degrees of travel is allowed, but any amount of travel can be defined. The arms 3015 are positioned between the brake shoes 2600 and the wall portion 2240 of the mounting plate 2202. The cam members 3011 are disposed in the slots 3020.

Referring to FIG. 22B, a handle 3006 is connected to the legs 3014 of the drive member 3010. The handle 3006 is movable between a disengage position (See FIG. 30) and two "allow engagement" positions (See FIGS. 28A, 28B, 29A, and 29B). In the disengage position (FIG. 30), the cam members 3011 engage the central portions 3024 of the slots 3020. The cam members 3011 press against central portions 3024 and pull the brake pads together, such that the pin clamping surfaces 2654 are brought into engagement with the pin 2656 (see FIG. 24A). This action compresses the spring 2702. When the pin clamping surfaces 2654 engage the pin 2656, the brake pads 2602 are spaced apart from the inner wall 2608 or brake lining. When the manual brake release mechanism 3000 is in the disengage position shown in FIG. 30 the brakes are released and the wheelchair may easily be pushed by a user.

Figure 28A:
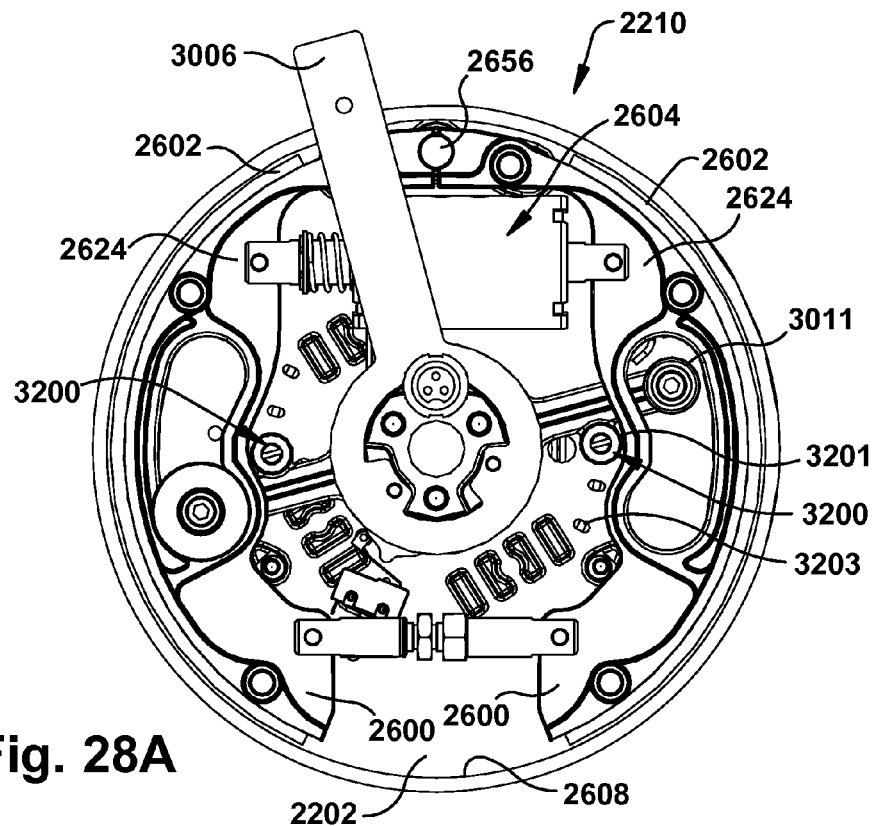
FIGS. 28A and 28B are elevational views of the brake assembly shown in FIG. 28 with a brake release mechanism in two different positions that allow normal operation of the brakes.
Figure 28B:
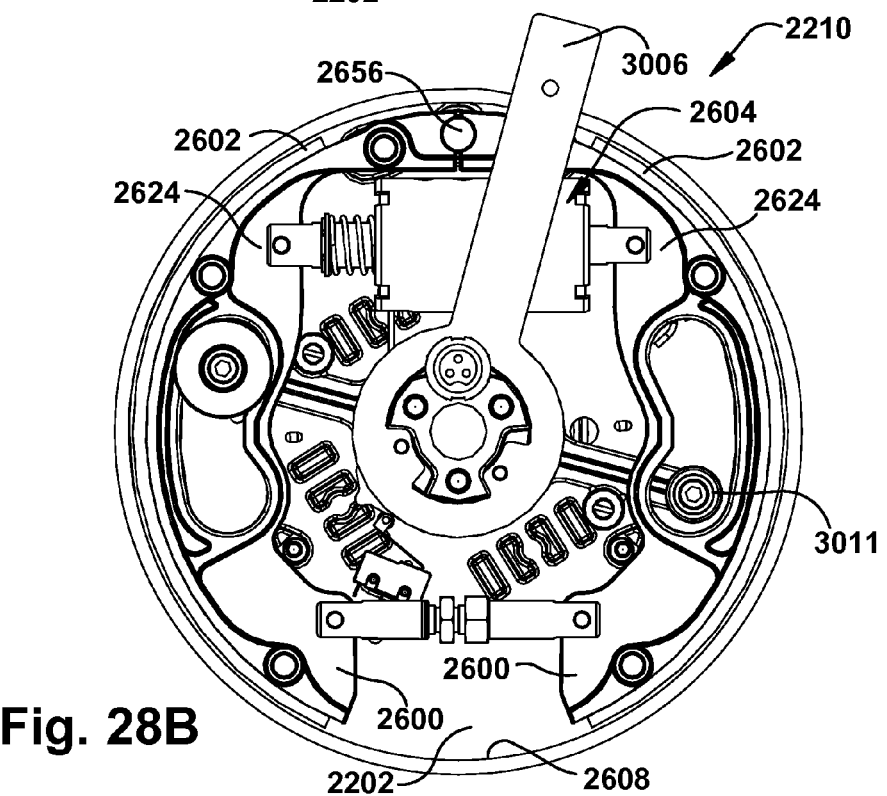

When the handle 3006 is in one of the two "allow engagement" positions (FIGS. 28A, 28B, 29A, 29B), the cam members 3011 are spaced apart from the cam surfaces defined by the slots 3020 and the brake assembly 2210 is operated by the actuator 2700 as described above. For example, if no power is applied to the actuator 2700, the brakes are engaged (FIGS. 29A 29B) and if power is applied to the actuator, the brakes are disengaged (FIGS. 28A, 28B). In the illustrated embodiment, in the allow engagement positions, enough clearance is provided between the cam surfaces defined by the slots 3020 and cam members 3011 to prevent any engagement between the cam members 3011 and the cam surfaces during operation of the brake assembly by the actuator 2700.

Referring to FIG. 28, in one exemplary embodiment, a sensor 3100, such as a micro-switch (any type of sensor may be used) is positioned to detect whether or not the manual brake release mechanism 3000 is in the disengaged position (or the "allow engagement" position). The output of the sensor 3100 may be used for a variety of different control functions. For example, when the output of the sensor 3100 indicates that the manual brake override is in the disengage position, the drive circuitry may prevent power from being applied to the motor windings 2402 and/or the actuator 2700. Referring to FIGS. 28 and 30, the illustrated central hub portion 3012 of the drive member 3010 includes a cam surface 3300. The illustrated cam surface 3300 includes a peak 3302. Referring to FIG. 30, an actuator 3308 of the sensor is engaged by the peak 3302, and is therefore depressed. This indicates that the brake release mechanism 3000 is in the brake release position. Referring to FIGS. 28A and 28B, when the handle 3006 is in one of the "allow brake engagement" positions, the sensor actuator 3308 is extended. This extended actuator 3308 indicates that the brakes are in one of the "allow disengagement" positions.

Referring to FIG. 28, in one exemplary embodiment, a dual detent mechanism 3200 may be included such that the brake release mechanism 300 positively stops at the disengagement position and each of the "allow engagement" positions. Any type of detent mechanism may be used. By way of example, the detent mechanism 3200 may a pair of spaced apart spring loaded pins 3201 that are attached to the cam drive member 3010 (FIGS. 31A and 31B). The spring loaded pins are biased into recess of a corresponding pair of recess sets 3203 (FIG. 20A). Each set of recesses 3203 have a recess that corresponds to the brake release position (the middle recess in the illustrated embodiment) and the two recesses that correspond to the "allow brake engagement" position (the two outer recesses in the illustrated embodiment). In the illustrated embodiment, the spring loaded pins 3201 are positioned to balance the load applied to the drive member 3010 when the mechanism is moved from one position to another.

Referring to FIG. 30, the manual brake release mechanism 3000 is constructed such that the handle 3006 is in a top dead-center position when the brake release mechanism 3000 is in the disengage position. Further, the brake release mechanism 3000 is configured such that the handle 3006 is moved and/or pivoted the same distance and/or angle from the disengage position to each of the "allow engagement" positions (See FIGS. 28A and 28B).

In another embodiment, the manual brake release mechanism 3000 is configured to have one "allow engagement" position and two disengage positions. The manual brake release mechanism 3000 may be constructed to have the handle 3006 in a top dead-center position when the manual brake release mechanism 3000 is in the "allow engagement" position. Further, the manual brake release mechanism 3000 may be configured such that the handle 3006 is moved and/or pivoted the same distance and/or angle from the "allow engagement" position to each of the disengage positions. For example, the handle 3006 may be pivoted in opposite directions from the top dead-center position to reach the disengage positions.

By configuring the handle 3006 to be positioned at top dead-center for the manual disengage position (or "allow engagement" position) and configuring the handle to be moveable in opposite directions to two equally spaced "allow engagement" positions (or manual disengage positions), the same drive assembly 2200 can be used on either side of the wheelchair 100 (or other vehicle), while providing the same control positions for the handle 3006 of the manual brake release mechanism 3000. That is, regardless of the side of the wheelchair 100 (or other vehicle) that the drive assembly 2200 is mounted on, the control of the manual brake release mechanism 3000 is the same. In the illustrated embodiment, the drive assembly on either side of the wheelchair 100 is placed in the manual brake disengage position by positioning the handle 3006 at the top dead center position and is placed in the "allow engagement" position by moving the handle forward (and/or backward). No adjustments to the drive assembly 2200 are required. However, if configuring the manual brake release mechanism 1000 to have only one manual brake disengagement position and only one allow engagement is desired, a simple bracket or other blocking member can be positioned to prevent the handle 1006 (or other component of the mechanism) from moving in one direction. Still, the same drive assembly can be used on both sides of the wheelchair 100 (or other vehicle).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, hardware, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

While the present invention has been illustrated by the description of embodiments thereof, and while the embodiments have been described in considerable detail, it is not the intention of the applicant to restrict or in any way limit the scope of the invention to such detail. Additional advantages and modifications will readily appear to those skilled in the art. For example, the specific locations of the component connections and interplacements can be modified. Still further, while cylindrical or elliptical tubular components have been shown and described herein, other geometries can be used including polygonal (e.g., square, rectangular, triangular, hexagonal, etc.) can also be used. Therefore, the invention, in its broader aspects, is not limited to the specific details, the representative apparatus, and illustrative examples shown and described. Accordingly, departures can be made from such details without departing from the spirit or scope of the applicant's general inventive concept.

The invention claimed is:

1. A motor and brake assembly comprising:
   a mounting member;
   a stator winding assembly mounted to the mounting member;
   a brake assembly operably connected to the mounting member;
   a hub coupled to the mounting member such that the hub is rotatable about a central axis, wherein the hub includes a radially outer wall that surrounds the stator winding assembly and the brake assembly such that the stator winding assembly and the brake assembly are between the radially outer wall of the hub and the central axis;
   a rotor magnet assembly fixedly mounted to an inside of the radially outer wall of the hub, wherein the stator winding is radially inward of the rotor magnet and the radially outer wall of the hub;
   wherein the brake assembly is operable to radially move a component of the brake assembly between an engaged position where said component engages said inside of the radially outer hub wall and a disengaged position where said component is spaced apart from the inside of the radially outer hub wall.

2. The motor and brake assembly of claim 1 wherein the inside of the radially outer wall is an inner surface of the radially outer wall.

3. The motor and brake assembly of claim 1 wherein the inside of the radially outer wall comprises a brake lining that is attached to the inner surface of the radially outer wall.

4. The motor and brake assembly of claim 1 wherein the mounting member comprises a circular plate, wherein the stator winding assembly is mounted to one side of the plate and the brake assembly is operably connected to the other side of the plate, such that the plate substantially isolates the stator winding assembly from the brake assembly.

5. The motor and brake assembly of claim 1 wherein the brake assembly comprises a brake shoe assembly and wherein the motor and brake assembly further comprises an anti-swing arrangement that prevents said brake assembly component from swinging into contact with said inside of the radially outer hub wall when the brake assembly is in the disengaged position.

6. The motor and brake assembly of claim 5 wherein the anti-swing arrangement comprises a stop member connected to the mounting member, wherein the stop member is positioned for engagement with the brake assembly to prevent said brake component from swinging into contact with said inside of the radially outer hub wall when the brake assembly is in the disengaged position.

7. The motor and brake assembly of claim 5 wherein the anti-swing arrangement comprises a shaped pin connected to the mounting member, wherein the brake assembly includes clamping surfaces that engage the shaped pin to prevent said brake component from swinging into contact with said inside of the radially outer hub wall when the brake assembly is in the disengaged position.

8. The motor and brake assembly of claim 1 further comprising an electromechanical actuator coupled to the brake assembly for moving the brake assembly between the engaged position and the disengaged position.

9. The motor and brake assembly of claim 8 wherein the electromechanical actuator comprises a first shaft that is moveable relative to a second shaft by applying an electromagnetic field, wherein the first shaft includes a frusto-conical recess that includes an inner tapered surface and a flat inner wall and the second shaft includes a male frusto-conical end portion that includes an outer tapered surface and a flat end wall.

10. The motor and brake assembly of claim 9 wherein said flat end wall of the second shaft is in engagement with the flat inner wall of the first shaft when the electromechanical actuator has moved the brake assembly to the released position.

11. The motor and brake assembly of claim 10 wherein the inner tapered surface of the first shaft is spaced apart from the outer tapered surface of the second shaft when the flat end wall of the second shaft is in engagement with the flat inner wall of the first shaft.

12. A motor and brake assembly comprising:
    a mounting plate having a first side and a second side;
    a stator winding assembly mounted to the first side of the mounting plate;
    a brake assembly operably connected to the second side of the mounting plate:
    a hub coupled to the mounting plate such that the hub is rotatable about a central axis, wherein the hub includes a radially outer wall that extends between first and second side walls and the radially outer wall surrounds the stator winding assembly and the brake assembly such that the stator winding assembly and the brake assembly are between the outer wall of the hub and the central axis, wherein the hub encloses the mounting plate, the stator winding assembly, and the brake assembly;
a rotor magnet assembly fixedly mounted to an inside the radially outer wall of the hub;
a service actuator coupled to the brake assembly such that the service actuator radially moves a component of the brake assembly between an engaged position where said component engages the inside of the radially outer hub wall and a disengaged position where said component is radially spaced apart from the inside of the radially outer hub wall;
a release actuator coupled to the brake assembly, wherein the release actuator is moveable between a release position and a normal operation position;
wherein when the release actuator is moved to the release position, the release actuator moves said component of the brake assembly radially away from said inside of the radially outer hub wall and prevents said component of the brake assembly from moving to said engaged position;
wherein when the release actuator is in the normal operating position, the service actuator is able to radially move said component from the disengaged position to said engaged position.

13. The motor and brake assembly of claim 12 wherein the inside of the radially outer wall is an inner surface of the radially outer wall.

14. The motor and brake assembly of claim 12 wherein the inside of the radially outer wall comprises a brake lining that is attached to the inner surface of the radially outer wall.

15. The motor and brake assembly of claim 12 wherein the mounting plate substantially isolates the stator winding assembly from the brake assembly.

16. The motor and brake assembly of claim 12 wherein the brake assembly comprises a brake shoe assembly and wherein the motor and brake assembly further comprises an anti-swing arrangement that prevents said brake assembly component from swinging into contact with said inside of the radially outer hub wall when the brake assembly is in the disengaged position.

17. The motor and brake assembly of claim 16 wherein the anti-swing arrangement comprises a stop member connected to the mounting member, wherein the stop member is positioned for engagement with the brake assembly to prevent said brake assembly component from swinging into contact with said inside of the radially outer hub wall when the brake assembly is in the disengaged position.

18. The motor and brake assembly of claim 16 wherein the anti-swing arrangement comprises a shaped pin connected to the mounting member, wherein the brake assembly includes clamping surfaces that engage the shaped pin to prevent said brake component from swinging into contact with said inside of the radially outer hub wall when the brake assembly is in the disengaged position.

19. The motor and brake assembly of claim 12 wherein the service actuator is an electromechanical actuator that comprises a first shaft that is moveable relative to a second shaft by applying an electromagnetic field, wherein the first shaft includes a frusto-conical recess that includes an inner tapered surface and a flat inner wall and the second shaft includes a male frusto-conical end portion that includes an outer tapered surface and a flat end wall.

20. The motor and brake assembly of claim 19 wherein said flat end wall of the second shaft is in engagement with the flat inner wall of the first shaft when the electromechanical actuator has moved the brake assembly to the released position.

21. The motor and brake assembly of claim 20 wherein the inner tapered surface of the first shaft is spaced apart from the outer tapered surface of the second shaft when the flat end wall of the second shaft is in engagement with the flat inner wall of the first shaft.

22. A wheelchair comprising:
a frame;
a seat mounted to the frame;
first and second motor and brake assemblies coupled to opposite sides of the frame, wherein each of the first and second motor assemblies comprise:
a mounting member;
a stator winding assembly mounted to the mounting member;
a brake assembly operably connected to the mounting member;
a hub rotatably coupled to the mounting member such that the hub is rotatable about a central axis, wherein the hub includes a radially outer wall that surrounds the stator winding assembly and the brake assembly such that the stator winding assembly and the brake assembly are between the radially outer wall of the hub and the central axis;
a rotor magnet assembly fixedly mounted to an inside of the radially outer wall of the hub, wherein the stator winding is radially inward of the rotor magnet and the radially outer wall of the hub;
wherein the brake assembly is operable to radially move a component of the brake assembly between an engaged position where said component engages said inside of the radially outer hub wall and a disengaged position where said component is radially spaced apart from the inside of the radially outer hub wall; and
first and second tires mounted to the hubs of the first and second motor and brake assemblies respectively.

23. A wheelchair comprising:
a frame;
a seat mounted to the frame;
first and second motor and brake assemblies coupled to opposite sides of the frame, wherein each of the first and second motor assemblies comprise:
a mounting plate having a first side and a second side;
a stator winding assembly mounted to the first side of the mounting plate;
a brake assembly operably connected to the second side of the mounting plate:
a hub coupled to the mounting plate such that the hub is rotatable about a central axis, wherein the hub includes a radially outer wall that extends between first and second side walls and the radially outer wall surrounds the stator winding assembly and the brake assembly such that the stator winging assembly and the brake assembly are between the outer wall of the hub and the central axis, wherein the hub encloses the mounting plate, the stator winding assembly, and the brake assembly;
a rotor magnet assembly mounted inside the radially outer wall of the hub, wherein the stator winding is radially inward of the rotor magnet;
a service actuator coupled to the brake assembly such that the service actuator radially moves a component of the brake assembly between an engaged position where said component engages an inside of the radially outer hub wall and a disengaged position where said component is radially spaced apart from the inside of the radially outer hub wall;

a release actuator coupled to the brake assembly, wherein the release actuator is moveable between a release position and a normal operation position;

wherein when the release actuator is moved to the release position, the release actuator moves said component of the brake assembly radially away from said inside of the radially outer hub wall and prevents said component of the brake assembly from moving to said engaged position;

wherein when the release actuator is in the normal operating position, the service actuator is able to radially move said component from the disengaged position to said engaged position; and first and second tires mounted to the hubs of the first and second motor and brake assemblies respectively.

* * * * *